United States Patent
Colossi et al.

(10) Patent No.: US 7,895,191 B2
(45) Date of Patent: Feb. 22, 2011

(54) IMPROVING PERFORMANCE OF DATABASE QUERIES

(75) Inventors: Nathan Gevaerd Colossi, San Jose, CA (US); Daniel Martin DeKimpe, La Selva Beach, CA (US); Jason Dere, Cupertino, CA (US); Steven Sit, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 10/410,793

(22) Filed: Apr. 9, 2003

(65) Prior Publication Data
US 2004/0215626 A1    Oct. 28, 2004

(51) Int. Cl.
     *G06F 7/00*    (2006.01)
(52) U.S. Cl. .................... 707/717; 707/600
(58) Field of Classification Search ............. None
See application file for complete search history.

(56) References Cited

U.S. PATENT DOCUMENTS

| | | |
|---|---|---|
| 5,537,524 A | 7/1996 | Aprile |
| 5,594,897 A | 1/1997 | Goffman |
| 5,692,107 A | 11/1997 | Simoudis et al. |
| 5,692,175 A | 11/1997 | Davies et al. |
| 5,706,494 A | 1/1998 | Cochrane et al. |
| 5,748,188 A | 5/1998 | Hu et al. |
| 5,767,854 A | 6/1998 | Anwar |
| 5,832,475 A | 11/1998 | Agrawal et al. |
| 5,832,496 A | 11/1998 | Anand et al. |
| 5,870,746 A | 2/1999 | Knutson et al. |
| 5,905,985 A | 5/1999 | Malloy et al. |
| 5,918,232 A | 6/1999 | Pouschine et al. |
| 5,926,815 A | 7/1999 | James, III |
| 5,926,818 A | 7/1999 | Malloy |
| 5,943,668 A | 8/1999 | Malloy et al. |
| 5,960,423 A | 9/1999 | Chaudhuri et al. |
| 5,978,788 A | 11/1999 | Castelli et al. |
| 5,991,754 A | 11/1999 | Raitto et al. |
| 6,003,024 A | 12/1999 | Bair et al. |
| 6,003,036 A | 12/1999 | Martin |

(Continued)

FOREIGN PATENT DOCUMENTS

JP      9106331      4/1997

(Continued)

OTHER PUBLICATIONS

Cheung, D.W., B. Zhou, B. Kao, H. Kan, & S.D. Lee. "Towards the Building of a Dense-Region-Based OLAP System", *Data and Knowledge Engineering*, vol. 36, Iss. 1, pp. 1-27, Jan. 2001.

(Continued)

*Primary Examiner*—Kavita Padmanabhan
(74) *Attorney, Agent, or Firm*—Janaki K. Davda; Konrad Raynes & Victor LLP

(57) ABSTRACT

A system, method, and program for improving the performance for SQL queries. Multidimensional metadata associated with a cube model metadata object is obtained. One or more summary tables to be built are automatically identified based on the obtained multidimensional metadata. One or more indexes to create are automatically identified based on the obtained multidimensional metadata.

57 Claims, 43 Drawing Sheets

U.S. PATENT DOCUMENTS

| | | | |
|---|---|---|---|
| 6,031,977 A | 2/2000 | Pettus | |
| 6,092,064 A | 7/2000 | Aggarwal et al. | |
| 6,115,547 A | 9/2000 | Ghatate et al. | |
| 6,122,636 A | 9/2000 | Malloy et al. | |
| 6,134,532 A | 10/2000 | Lazarus et al. | |
| 6,144,962 A | 11/2000 | Weinberg et al. | |
| 6,175,836 B1 | 1/2001 | Aldred | |
| 6,205,447 B1 | 3/2001 | Malloy | |
| 6,226,647 B1 | 5/2001 | Venkatasubramanian et al. | |
| 6,249,791 B1* | 6/2001 | Osborn et al. | 707/200 |
| 6,292,797 B1 | 9/2001 | Tuzhilin et al. | |
| 6,308,168 B1 | 10/2001 | Dovich et al. | |
| 6,317,750 B1 | 11/2001 | Tortolani et al. | |
| 6,324,533 B1 | 11/2001 | Agrawal et al. | |
| 6,327,574 B1 | 12/2001 | Kramer et al. | |
| 6,339,776 B2 | 1/2002 | Dayani-Fard et al. | |
| 6,362,823 B1 | 3/2002 | Johnson et al. | |
| 6,366,903 B1* | 4/2002 | Agrawal et al. | 707/2 |
| 6,374,234 B1 | 4/2002 | Netz | |
| 6,385,604 B1 | 5/2002 | Bakalash et al. | |
| 6,385,609 B1 | 5/2002 | Barshefsky et al. | |
| 6,408,292 B1 | 6/2002 | Bakalash et al. | |
| 6,418,428 B1 | 7/2002 | Bosch et al. | |
| 6,421,665 B1 | 7/2002 | Brye et al. | |
| 6,438,537 B1* | 8/2002 | Netz et al. | 707/3 |
| 6,449,609 B1 | 9/2002 | Witkowski | |
| 6,477,536 B1* | 11/2002 | Pasumansky et al. | 707/102 |
| 6,480,836 B1 | 11/2002 | Colby et al. | |
| 6,484,179 B1 | 11/2002 | Roccaforte | |
| 6,539,371 B1 | 3/2003 | Bleizeffer et al. | |
| 6,542,895 B1 | 4/2003 | DeKimpe et al. | |
| 6,546,381 B1 | 4/2003 | Subramanian et al. | |
| 6,546,395 B1 | 4/2003 | DeKimpe et al. | |
| 6,567,796 B1 | 5/2003 | Yost et al. | |
| 6,574,619 B1 | 6/2003 | Reddy et al. | |
| 6,574,791 B1 | 6/2003 | Gauthier et al. | |
| 6,581,054 B1 | 6/2003 | Bogrett | |
| 6,581,068 B1 | 6/2003 | Bensoussan et al. | |
| 6,604,110 B1 | 8/2003 | Savage et al. | |
| 6,609,123 B1 | 8/2003 | Cazemier et al. | |
| 6,615,201 B1 | 9/2003 | Seshadri et al. | |
| 6,628,312 B1 | 9/2003 | Rao et al. | |
| 6,633,882 B1 | 10/2003 | Fayyad et al. | |
| 6,633,885 B1 | 10/2003 | Agrawal et al. | |
| 6,636,845 B2 | 10/2003 | Chau et al. | |
| 6,636,853 B1 | 10/2003 | Stephens, Jr. | |
| 6,643,633 B2 | 11/2003 | Chau et al. | |
| 6,643,661 B2 | 11/2003 | Polizzi et al. | |
| 6,651,055 B1* | 11/2003 | Kilmer et al. | 707/3 |
| 6,654,764 B2 | 11/2003 | Kelkar et al. | |
| 6,665,682 B1 | 12/2003 | DeKimpe et al. | |
| 6,671,689 B2 | 12/2003 | Papierniak | |
| 6,681,223 B1 | 1/2004 | Sundaresan | |
| 6,684,207 B1 | 1/2004 | Greenfield et al. | |
| 6,694,322 B2 | 2/2004 | Warren et al. | |
| 6,697,808 B1 | 2/2004 | Hurwood et al. | |
| 6,707,454 B1* | 3/2004 | Barg et al. | 345/440 |
| 6,711,579 B2 | 3/2004 | Balakrishnan | |
| 6,711,585 B1 | 3/2004 | Copperman et al. | |
| 6,714,940 B2 | 3/2004 | Kelkar | |
| 6,768,986 B2 | 7/2004 | Cras et al. | |
| 6,775,662 B1 | 8/2004 | Witkowski et al. | |
| 6,801,992 B2 | 10/2004 | Gajjar et al. | |
| 6,823,334 B2 | 11/2004 | Vishnubhotla et al. | |
| 6,831,668 B2 | 12/2004 | Cras et al. | |
| 6,842,758 B1 | 1/2005 | Bogrett | |
| 6,865,573 B1 | 3/2005 | Hornick et al. | |
| 6,871,140 B1 | 3/2005 | Florance et al. | |
| 6,898,603 B1 | 5/2005 | Petculescu et al. | |
| 6,931,418 B1 | 8/2005 | Barnes | |
| 6,947,929 B2 | 9/2005 | Bruce et al. | |
| 6,957,225 B1 | 10/2005 | Zait et al. | |
| 6,996,556 B2 | 2/2006 | Boger et al. | |
| 7,007,039 B2 | 2/2006 | Chaudhuri et al. | |
| 7,051,038 B1 | 5/2006 | Yeh et al. | |
| 7,139,764 B2 | 11/2006 | Lee | |
| 7,149,983 B1 | 12/2006 | Robertson et al. | |
| 7,162,464 B1 | 1/2007 | Miller et al. | |
| 7,188,090 B2 | 3/2007 | Kim et al. | |
| 7,191,169 B1 | 3/2007 | Tao | |
| 7,203,671 B1 | 4/2007 | Wong | |
| 7,246,116 B2 | 7/2007 | Barsness et al. | |
| 7,266,565 B2 | 9/2007 | Diab | |
| 7,275,024 B2 | 9/2007 | Yeh et al. | |
| 7,346,601 B2 | 3/2008 | Chaudhuri et al. | |
| 7,430,562 B1 | 9/2008 | Bedell et al. | |
| 7,447,687 B2 | 11/2008 | Andersch et al. | |
| 7,472,127 B2 | 12/2008 | Malloy et al. | |
| 7,480,663 B2 | 1/2009 | Colossi et al. | |
| 2001/0026276 A1 | 10/2001 | Sakamoto et al. | |
| 2001/0037228 A1 | 11/2001 | Ito et al. | |
| 2001/0037327 A1 | 11/2001 | Haas et al. | |
| 2001/0047355 A1 | 11/2001 | Anwar | |
| 2001/0047364 A1 | 11/2001 | Proctor | |
| 2001/0051947 A1 | 12/2001 | Morimoto et al. | |
| 2001/0055018 A1 | 12/2001 | Yaginuma et al. | |
| 2002/0002469 A1 | 1/2002 | Hillstrom | |
| 2002/0029207 A1 | 3/2002 | Bakalash et al. | |
| 2002/0073088 A1 | 6/2002 | Beckmann et al. | |
| 2002/0078039 A1 | 6/2002 | Cereghini et al. | |
| 2002/0087516 A1 | 7/2002 | Cras et al. | |
| 2002/0091679 A1 | 7/2002 | Wright | |
| 2002/0091681 A1 | 7/2002 | Cras et al. | |
| 2002/0095430 A1 | 7/2002 | Egilsson et al. | |
| 2002/0122078 A1 | 9/2002 | Markowski | |
| 2002/0123993 A1 | 9/2002 | Chau et al. | |
| 2002/0124002 A1 | 9/2002 | Su et al. | |
| 2002/0129003 A1 | 9/2002 | Bakalash et al. | |
| 2002/0129032 A1 | 9/2002 | Bakalash et al. | |
| 2002/0138316 A1 | 9/2002 | Katz et al. | |
| 2002/0143783 A1 | 10/2002 | Bakalash et al. | |
| 2002/0188587 A1 | 12/2002 | McGreevy | |
| 2002/0188599 A1 | 12/2002 | McGreevy | |
| 2003/0004914 A1 | 1/2003 | McGreevy | |
| 2003/0004942 A1 | 1/2003 | Bird | |
| 2003/0014397 A1 | 1/2003 | Chau et al. | |
| 2003/0033277 A1 | 2/2003 | Bahulkar et al. | |
| 2003/0055813 A1 | 3/2003 | Chaudhuri et al. | |
| 2003/0055832 A1 | 3/2003 | Roccaforte | |
| 2003/0061207 A1 | 3/2003 | Spektor | |
| 2003/0071814 A1 | 4/2003 | Jou et al. | |
| 2003/0078852 A1 | 4/2003 | Shoen et al. | |
| 2003/0078913 A1 | 4/2003 | McGreevy | |
| 2003/0081002 A1 | 5/2003 | De Vorchik et al. | |
| 2003/0093424 A1 | 5/2003 | Chun et al. | |
| 2003/0101202 A1 | 5/2003 | Kelkar et al. | |
| 2003/0115183 A1 | 6/2003 | Abdo et al. | |
| 2003/0115207 A1 | 6/2003 | Bowman et al. | |
| 2003/0126144 A1 | 7/2003 | O'Halloran et al. | |
| 2003/0184588 A1 | 10/2003 | Lee | |
| 2003/0206201 A1 | 11/2003 | Ly | |
| 2003/0212667 A1 | 11/2003 | Andersch et al. | |
| 2003/0225768 A1 | 12/2003 | Chaudhuri et al. | |
| 2004/0006574 A1* | 1/2004 | Witkowski et al. | 707/104.1 |
| 2004/0010505 A1 | 1/2004 | Vishnubhotla | |
| 2004/0059705 A1 | 3/2004 | Wittke et al. | |
| 2004/0098415 A1 | 5/2004 | Bone et al. | |
| 2004/0122646 A1 | 6/2004 | Colossi et al. | |
| 2004/0122844 A1 | 6/2004 | Malloy et al. | |
| 2004/0128287 A1 | 7/2004 | Keller et al. | |
| 2004/0128314 A1 | 7/2004 | Katibah et al. | |
| 2004/0139061 A1 | 7/2004 | Colossi et al. | |
| 2004/0181502 A1 | 9/2004 | Yeh et al. | |
| 2004/0181538 A1 | 9/2004 | Lo et al. | |

| | | |
|---|---|---|
| 2004/0267774 A1 | 12/2004 | Lin et al. |
| 2005/0027754 A1 | 2/2005 | Gajjar et al. |
| 2005/0033730 A1 | 2/2005 | Chaudhuri et al. |
| 2005/0267868 A1 | 12/2005 | Liebl et al. |
| 2005/0278290 A1 | 12/2005 | Bruce et al. |
| 2005/0283494 A1 | 12/2005 | Colossi et al. |
| 2008/0133582 A1 | 6/2008 | Andersch et al. |

FOREIGN PATENT DOCUMENTS

| | | |
|---|---|---|
| JP | 9146962 | 6/1997 |
| JP | 10247197 | 9/1998 |
| JP | 2001243242 | 9/2001 |
| JP | 2001243244 | 9/2001 |
| JP | 2002123530 | 4/2002 |
| JP | 2002007435 | 11/2002 |
| WO | 0022493 | 4/2000 |
| WO | 0065479 | 11/2000 |
| WO | 0072165 | 11/2000 |
| WO | WO-01/09768 | 2/2001 |
| WO | 0129690 A2 | 4/2001 |

OTHER PUBLICATIONS

U.S. Appl. No. 09/356,647, filed Jul. 19, 1999, entitled "Improving Performance of Table Insertion by Using Multiple Threads," by DM DeKimpe, WE Malloy, SE Moore and G. Robinson.
Hyperion Solutions Corp., © 1998. "Providing OLAP to User-Analysts: An IT Mandate," by E.F. Codd & Associates, pp. 1-22, [online] [retrieved on Oct. 8, 2002]. Retrieved from http://www.hyperion.com/downloads/olap_to_useranalysts_wp.pdf.
Business Intelligence, Ltd., © 2002. "The OLAP Report: What is OLAP?," by N. Pendse, pp. 1-7, [online] [retrieved on Oct. 8, 2002]. Retrieved from http://www.olapreport.com/fasmi.
Microsoft Corp. & Hyperion Solutions Corp., "XML for Analysis Specification," Version 1.0, Updated on Apr. 24, 2001, pp. 1-107, [online] [retrieved on Oct. 8, 2002]. Retrieved from http://www.essbase.com/downloads/XML_Analysis_spec.pdf.
W3C® (MIT,INRIA, Keio), © 1999. "XML Path Language (Xpath)," Version 1.0, W3C Recommendation Nov. 16, 1999, pp. 1-37, [online] [retrieved on Oct. 8, 2002]. Retrieved from http://www.w3/prg/TR/xpath.
Colossi, N., W. Malloy and B. Reinwald. "Relational Extensions for OLAP." IBM Systems Journal, vol. 41, No. 4, 2002, pp. 714-731.
ACM Digital Library, 1998. "Simultaneous Optimization and Evaluation of Multiple Dimensional Queries," by Y. Zhao, P.M. Deshpande, J.F. Naughton and A. Shukla. SIGMOD Record, vol. 27, No. 2, pp. 271-282, Jun. 1998.
ACM Digital Library, 1998. An Alternative Storage Organization for ROLAP Aggregate Views Based on Cubetrees, by Y. Kotidis and N. Roussopoulos. SIGMOD Record, vol. 27, No. 2, pp. 249-258.
ACM Digital Library, 1998. "Requirement-Based Data Cube Schema Design," by D. Cheung, B. Zhou, B. Kao, H. Lu, T.W. Lam and H.F. Ting. Department of Computer Science and Information Systems, University of Hong Kong, pp. 162-169.
ACM Digital Library, 1999. "High Performance Multidimensional Analysis of Large Datasets," by S. Goil and A. Choudhary. Center for Parallel and Distributed Computing, Department of Electrical and Computer Engineering, Northwestern University, pp. 34-39.
"Towards the Building of a Dense-Region-Based OLAP System," by D.W. Cheung, B. Zhou, B. Kao, K. Hu and S.D. Lee, Department of Computer Science and Information Systems; Hong Kong Univ., China. Data and Knowledge Engineering, vol. 36, No. 1, pp. 1-27, Jan. 2001. (Abst).
"ScanChunk: an EfficientAlgorithm for Hunting Dense Regions in Data Cube," by B. Zhou. Department of Computer Science and Engineering, Hangzhou, China. Chinese Journal of Computers, vol. 22, No. 6, pp. 620-626, Jun. 1999. Science Press (Abst).
"TOPAZ: a Cost-Based, Rule-Driven, Multi-Phase Parallelizer," by C Nippl and B. Mitschang. Proceedings of the Twenty-Fourth International Conference on Very-Large Databases, pp. 251-262, 1998. San Francisco: Morgan Kaufmann Publishers, Inc., (Abst).

Amendment and Request for Preparation of International Preliminary Examination Report in PCT International Application No. PCT International Application No. PCT/GB2003/005490, filed Mar. 31, 2005, 3 pages.
Gray, J., S. Chaudhuri, A. Layman, D. Reichart, M. Venkatrao, F. Pellow, & H. Pirahesh, "Data Cube: A Relational Aggregation Operator Generalizing Group-By, Cross-Tab, and Sub-Totals", *Journal of Data Mining and Knowledge Discovery*, 1997, 29-53.
Mangisengi, O., A.M. Tjoa, & R.R. Wagner, "Metadata Management Concept for Multidimensional OLAP Data Based on Object-Oriented Concepts", *Proceedings of the First International Conference on Web Information Systems Engineering*, Jun. 2000, pp. 358-365.
PCT International Preliminary Examination Report for International Application No. PCT/GB03/05490, issued Apr. 11, 2005, 12 pages.
PCT International Search Report for International Application No. PCT/GB03/05490, issued Apr. 16, 2004, 5 pages.
PCT Written Opinion for International Application No. PCT/GB03/05490, issued Sep. 6 2004, 7 pages.
Raphaely, D., M. Cyran, J. Gibb, V. Krishnamurthy, M. Krishnaprasad, J. Melnick, R. Smith, & R. Urbano, "Oracle8i Application Developer's Guide—Findamentals", Release 8.1.5, Feb. 1999, pp. 20-1 to 20-22.
Reply to Written Opinion in PCT International Application No. PCT/GB03/05490, filed Nov. 24, 2004, 4 pages.
Schwarz, H., R. Wagner, & B. Mitschang, "Improving the Processing of Decision Support Queries: The Case for a DSS Optimizer", *Proceedings of the International Database Engineering and Applications Symposium*, Jul. 2001, pp. 177-186.
Stohr, T., R. Muller, & E. Rahm, "An Integrative and Uniform Model for Metadata Management in Data Warehousing Environments", *Proceedings of the International Workshop on Design and Management of Data Warehouse*, Jun. 1999, pp. 1-16.
Colliat, G., "OLAP, Relational, and Multidimensional Database Systems", SIGMOD, vol. 25, No. 3, Sep. 1996, pp. 64-69.
Office Action 1, Nov. 14, 2006, for U.S. Appl. No. 10/867,970, 37 pp.
Office Action 1, Mar. 14, 2007, for U.S. Appl. No. 10/874,397, 27 pp.
Office Action 1, Mar. 5, 2007, for U.S. Appl. No. 10/874,398, 33 pp.
Office Action 2, May 10, 2005, for U.S. Appl. No. 10/144,347, 14 pp.
Office Action 2, Oct. 4, 2007, for U.S. Appl. No. 10/874,397, 39 pp.
Office Action 3, Jul. 26, 2006, for U.S. Appl. No. 10/144,347, 8 pp.
Office Action 3, May 22, 2006, for U.S. Appl. No. 10/341,763, 15 pp.
Office Action 3, Sep. 11, 2007, for U.S. Appl. No. 10/867,970, 9 pp.
Office Action 3, Apr. 7, 2008, for U.S. Appl. No. 10/874,397, 26 pp.
Office Action 3, Mar. 3, 2008, for U.S. Appl. No. 10/874,398, 24 pp.
Office Action 4, Jan. 29, 2007, for U.S. Appl. No. 10/144,347, 12 pp.
Office Action 5, Jun. 27, 2007, for U.S. Appl. No. 10/144,347, 11 pp.
Office Action 5, May 5, 2008, for U.S. Appl. No. 10/867,970, 11 pp.
Office Action 6, Apr. 14, 2009, for U.S. Appl. No. 10/867,970, 31 pp.
Pokorny, J. and P. Sokolowsky, "A Conceptual Modelling Perspective for Data Warehouses", [online], 1999, [retrieved on Apr. 8, 2004], retrieved from the Internet at <URL: http://wi99.iwi.uni-sb.de/teilnehmer/pdf-files/EF_32_WiB082.pdf>, 20 pp.
Post, L.L. and J.J. Sydir, "Dynamically Configurable User Interface for the Manipulation of Data Objects", IBM TDB, vol. 37, No. 3, Mar. 1994, pp. 23-30.
Rabenhorst, D.A., "Many-Dimensional Visualization Technique", IBM TDB, vol. 35, No. 6, Nov. 1992, pp. 473-475.
Rai, A. and V. Storey, "Data Mining Multidimensional Databases, OLAP (Online Analytical Processing), & Data Warehousing", [online] 2001, [retrieved on Apr. 8, 2004], retrieved from the Internet at <URL: http://www.cis.gsu.edu/~dstraub/JMBA/MBA8473/2001/DataMine3-2ups.pdf>, 40 pp.
Sapia, C., M. Blaschka, G. Hofling, and B. Dinter, "Extending the E/R Model for the Multidimensional Paradigm", Proceedings of the Workshops on Data Warehousing and Data Mining: Advances in Database Technologies, 1998, pp. 105-116.
Sifer, M., "A Visual Interface Technique for Exploring OLAP Data with Coordinated Dimension Hierarchies", Proceedings of the Twelfth International Conference on Information and Knowledge Management, Nov. 2003, pp. 532-535.
Stewart, H.M., "OLAP/EIS Tops Off the Data Warehouse", Proceedings of the 1995 CAUSE Annual Conference, 1995, pp. 1-16.

Stolte, C., D. Tang, and P. Hanrahan, "Query, Analysis, and Visualization of Hierarchically Structured Data Using Polaris", Proceedings of the Eighth ACM SIGKDD International Conference on Knowledge Discovery and Data Mining, 2002, 10 pp.

Supplemental NOA, Sep. 21, 2006, for U.S. Appl. No. 10/325,245, 11 pp.

Tang, D., C. Stolte, and R. Bosch, "Design Choices when Architecting Visualizations", Information Visualization, vol. 3, Iss. 2, 2004, 10 pp.

Vassiliadis, P., "Modeling Multidimensional Databases, Cubes and Cube Operations", Proceedings of the 10th International Conference on Scientific and Statistical Database Management, 1998, 10 pp.

White, C.J., "The IBM Business Intelligence Software Solution", Version 3, DataBase Associates International, Inc., Mar. 2009, 22 pp.

Wolfram Research, Inc., "Hexagonal Prism", [online], 2004, [retrieved on Jun. 6, 2004], retrieved from the Internet at <URL: http://mathworld.wolfram.com/HexagonalPrism.html>, 2 pp.

Wolfram Research, Inc., "Polyhedron", [online], 2004, [retrieved on Jun. 6, 2004], retrieved from the Internet at <URL: http://mathworld.wolfram.com/Polyhedron.html>, 5 pp.

Wolfram Research, Inc., "Prism", [online], 2004, [retreived on Jun. 6, 2004], retrieved from the Internet at <URL: http://mathworld.wolfram.com/Prism.html>, 5 pp.

Wolfram Research, Inc., "Triangular Prism", [online], 2004, [retrieved on Jun. 6, 2004], retrieved from the Internet at <URL: http://mathworld.wolfram.com/TriangularPrism.html>, 2 pp.

Written Opinion, Sep. 6, 2004, for International Application No. PCT/GB03/05490, 7 pp.

Han, J, S. Nishio, H. Kawano, and W. Wang, "Generalization-Based Data Mining in Object-Oriented Databases Using an Object Cube Model", Data and Knowledge Engineering, vol. 25, 1998, pp. 55-97.

Kamber, M., J. Han, and J.Y. Chiang, "Metarule-Guided Mining of Multi-Dimensional Association Rules Using Data Cubes", In Proceedings of the 3rd International Conference on Knowledge Discovery and Data Mining, Aug. 1997, pp. 207-210.

Notice of Allowance 2, Nov. 25, 2009, for U.S. Appl. No. 10/867,970, 14 pp.

Notice of Allowance 4, Jul. 20, 2009, for U.S. Appl. No. 10/325,245, 28 pp.

Stefanovic, N., J. Han, and K. Koperski, "Object-Based Selective Materialization for Efficient Implementation of Spatial Data Cubes", IEEE Transactions on Knowledge and Data Engineering, vol. 12, No. 6, Nov./Dec. 2000, pp. 938-958.

Supplemental Notice of Allowability, Mar. 24, 2009, for U.S. Appl. No. 10/325,245, 3 pp.

Abstract and Machine Translation for JP2001243244, published on Sep. 7, 2001, 46 pp.

Abstract and Machine Translation for JP2001243242, published on Sep. 7, 2001, 55 pp.

Abstract for JP2003500741, published Jan. 7, 2003, 1 pp. [Abstract for corresponding case WO0072165].

Abstract for JP2003519418, published Jun. 17, 2003, 1 pp. [Abstract for corresponding case WO0109768].

Hedberg, S.R., "Parallelism Speeds Data Mining", IEEE Parallel & Distributed Technology, vol. 3, No. 4, Winter 1995, pp. 3-6.

IDS Report, Jun. 16, 2009, from the Jun. 2, 2009 Office Action for JP2004-566154, 2 pp.

Japanese Office Action, Jun. 2, 2009, for Application No. JP2004-566154, 7 pp.

Japanese Office Action, Jun. 2, 2009, for Application No. JP2004-566154, 6 pp. [Translation].

Notice of Allowance 2, May 29, 2009, for U.S. Appl. No. 10/874,397, 10 pp.

Albrecht, J., W. Hummer, W. Lehner, and L. Schlesinger, "Query Optimization By Using Derivability In a Data Warehouse Environment", DOLAP 2000, 2000 ACM, pp. 49-56.

Alcorn, M.H., "Seeing is Believing", [online], 2004, [Retrieved on Jun. 28, 2007], retrieved from the Internet at <URL: http://www.db2mag.com/story/showArticle.jhtml?articleID=17602307>, DB2 Magazine, Quarter 1, vol. 9, No. 1, 2004, 15 pp.

Andres, F., M. Noureddine, K. Ono, and A. Zhang, "Metadata Model, Resource Discovery, and Querying on Large Scale Multidimensional Datasets—The GEREQ Project", Proceedings 2000 Kyoto International Conference on DigitalLibraries: Research and Practice, 2000, pp. 312-319.

Hedberg S.R., "Parallelism Speeds Data Mining", IEEE Parallel & Distributed Technology, vol. 3, No. 4, Winter 1995, pp. 3-6.

Huynh, T.N., O. Mangisengi, A.M., Tjoa, "Metadata for Object-Relational Data Warehouse", Proceedings of the International Workshop on Design and Management of Data Warehouses, Jun. 2000, 9 pp.

IBM, "IBM QMF for Windows for DB2 Workstation Databases, V7.2—Business Intelligence Starts Here!", [online], 2002 IBM, [Retrieved on Feb. 26, 2002]. Retrieved from the Internet at <URL: http://www-01.ibm.com/cgi-bin/common/ssi/ssialias?infotype=an&subtype=ca&htmlfid=897/ENUS202-045&appname=isource&language=enus>.

IBM Query Management Facility, "QMF High Performance Option User's Guide for z/OS and OS/390", IBM Corp., 2002, Version 7, Release 2, 338 pp.

Lumpkin, G. and H. Jakobsson, "Query Optimization in Oracle9i, an Oracle White Paper", [online], Feb. 2002, retrieved from the Internet at <URL: http://www.oracle.com/technology/products/bi/pdf/o9i_optimization_twp.pdf>, 29 pp.

Mullins, C.S., "Get Your Business Where it Needs to Go", [online], 2003, [Retrieved on Jan. 29, 2008], retrieved from the Internet at <URL: http://www.craigmullins.com/db2infra.htm>, 4 pp.

Oracle, "Chapter 4: Discovering the Available Metadata", [online], 2000-2003, [Retrieved on Jun. 28, 2007], retrieved from the Internet at <URL: http://www.stanford.edu/dept/itss/docs/oracle/10g/olap.101/b10335/discover.htm>, 16 pp.

Oracle, "Oracle OLAP Analytic Workspace Java API Reference", [online], 2003, [Retrieved on Jan. 29, 2008], retrieved from the Internet at <URL: http://www.acs.ilstu.edu/docs/oracle/olap.101/b12180/overview-summary.html>, 4 pp.

Oracle, "Oracle9i OLAP Services: Concepts and Administration Guide, Release 9.0.1", [online], Jun. 2001, Oracle Corporation. Retrieved from the Internet at <URL: http://www.peacetech.com/flipper/oracle9i/901_doc/olap.901/a88755/basics3.htm#1007569>, 126 pp.

Pederson, D., K. Riis, and T.B. Pederson, "A Powerful and SQL-Compatible Data Model and Query Language For OLAP", vol. 24, No. 2, Jan.-Feb. 2002, Australian Computer Society, Inc., pp. 121-130.

Pires, C. and J.C. Machado, "Database Query Optimizer with Rule Based Search Engine", [online], 2002. Retrieved from the Internet at <URL: http://lens.cos.ufrj.br/sugarloafplop/2002/papers/Paper1A.pdf>, pp. 158-160.

Poelman, J., "How to Build a Metadata Bridge for DB2 Cube Views", [online], May 2003, [Retrieved on Jan. 29, 2008]. Retrieved from the Internet at <URL: http://www.ibm.com/developerworks/db2/library/techarticle/0305poelman/0305poelman.html>, 15 pp.

Poole, J.D., "Model-Driven Architecture: Vision, Standards and Emerging Technologies", [online], Apr. 2001. Retrieved from the Internet at <URL: http://java.sun.com/products/jmi/pdf/arch.pdf>, 15 pp.

SAP America, Inc., "Mutli-Dimensional Modeling with BW", SAP America white paper, 2000, pp. 1-68.

Shukla, A., P.M. Deshpande, and J.F. Naughton, "Materialized View Selection fro Multi-cube Data Models", vol. 1777, Proceedings of the 7th International Conference on Extending Database Technology: Advances in Database Technology, 2000. EDBT 2000. Springer-Verlag London, UK, pp. 269-284.

Toyama, M., "SuperSQL: An Extended SQL for Database Publishing and Presentation", vol. 27, No. 2, Proceedings of the 1998 ACM SIGMOD International Conference on Management of Data, 1998. Seattle, Washington Jun. 1-4, 1998, 3 pp.

U.S. Appl. No. 09/602,490, filed Jun. 23, 2000, entitled "System and Method for Web Based Sharing of Search Engine Queries", invented by R. Kraft, 47 pp.

Warshaw, L.B. and D.P. Miranker, "Rule-Based Query Optimization, Revisited", Proceedings of the Eighth International Conference on Information and Knowledge Management, 1999 ACM, pp. 267-275.

Rundensteiner, A.E., A. Koeller, and X. Zhang, "Maintaining Data Warehouses Over Changing Information Sources", Communications of the ACM, Jun. 2000, ACM, vol. 43, No. 6, pp. 57-62.

Chen, Q., "Mining Exceptions and Quantitative Association Rules in OLAP Data Cube", Dissertation, Jul. 1999, Department of Computer Science, University of Science and Technology of China, Simon Fraser University, 113 pp.

Hammer, J. and L. Fu., "CubiST++: Evaluating Ad-Hoc CUBE Queries Using Statistics Trees", © 2003 Kluwer Academic Publishers, 113 pp.

Hess, J.T. and J.D. Wells, "Understanding How Metadata and Explanations Can Better Support Data Warehousing and Related Decision Support Systems: An Exploratory Case Study", Proceedings of the 35th Annual Hawaii International Conference on System Sciences, © 2002 IEEE, 10 pp.

Shah, K. and A. Sheth, "Infoharness: Managing Distributed, Heterogeneous Information", IEEE Educational Activities Department, Nov. 1999, vol. 3, No. 6, pp. 18-28.

Patent Abstract for JP9106331, published on Apr. 22, 1997, 1 p.

Patent Abstract for JP9146962, published on Jun. 6, 1997, 1 p.

Patent Abstract for JP10247197, published on Sep. 14, 1998, 1 p.

Patent Abstract for JP2002007435, published on Nov. 1, 2002, 1 p.

Pendse, N., "The OLAP Report: What is OLAP?", [online], Updated Jul. 27, 2002, [retrieved on Oct. 8, 2002], retrieved from the Internet at <URL: http://www.olapreport.com/fasmi>, 7 pp.

Amendment, Nov. 24, 2004, for International Application No. PCT/GB03/005490, 4 pp.

Amendment, Jun. 12, 2006, for U.S. Appl. No. 10/325,245, 9 pp.

Bird, C.L. and S.G. Chapman, "Viewing Data Within a Three-Dimensional Space by Two-Dimensional Devices", IBM TDB, vol. 34, No. 12, May 1992, pp. 83-84.

Bito, Y., R. Kero, H. Matsuo, Y. Shintani, and M. Silver, "Interactively Visualizing Data Warehouses", Journal of Healthcare Information Management, vol. 15, No. 2, 2001, pp. 133-142.

Eick, S.G., "New Visualization Techniques", SIGGRAPH Computer Graphics Newsletter, vol. 34, No. 1, [online] Feb. 2000, [retrieved on Apr. 8, 2004], retrieved from the Internet at <URK: http://www.siggraph.org/publications/newsletter/v34n1/contributions/Eick.html>, 11 pp.

Final Office Action 1, Jan. 5, 2006, for U.S. Appl. No. 10/323,131, 14 pp.

Final Office Action 1, Jan. 5, 2006, for U.S. Appl. No. 10/341,763, 18 pp.

Final Office Action 1, Mar. 27, 2007, for U.S. Appl. No. 10/867,970, 21 pp.

Final Office Action 1, Oct. 4, 2007, for U.S. Appl. No. 10/874,398, 32 pp.

Final Office Action 2, Nov. 1, 2006, for U.S. Appl. No. 10/341,763, 24 pp.

Final Office Action 2, Feb. 4, 2008, for U.S. Appl. No. 10/867,970, 13 pp.

Goil S. and A. Choudhary, "A Parallel Scalable Infrastructure for OLAP and Data Mining", Proceedings of the International Symposium on Database Engineering and Applications, Aug. 1999, 10 pp.

Howard, J., "DB2 Newsletter", [online], Jun. 2003 [retrieved on Apr. 1, 2009], retrieved from the Internet at <URL: http://txmq.com/resources/newsletter_archive/db2news_jun03.htm>, 12 pp.

IBM Corp., "IBM DB2 Information Integrator V8.1", Software Announcement, May 20, 2003, 19 pp.

Kenan Systems Corporation, "An Introduction to Multidimensional Database Technology", [online], 1995, [retrieved on Apr. 8, 2004], retrieved from the Internet at <URL: http://www.fing.edu.uy/inco/grupos/csi/esp/Cursos/cursos_act/2003DAP_SistDW/Material/ken96.pdf>, pp. 1-29.

Maniatis, A.S., P. Vassiliadis, S. Skiadopoulos, and Y. Vassiliou, "Advanced Visualization for OLAP", Proceedings of the 6th ACM International Workshop on Data Warehousing and OLAP, Nov. 2003, pp. 9-16.

Morgan, R., "Web-Based Interactive Database Query Builder", Dissertation submitted to the University of Bristol, Sep. 2002, 101 pp.

Notice of Allowance 1, Nov. 4, 2005, for U.S. Appl. No. 10/144,347, 8 pp.

Notice of Allowance 1, Apr. 19, 2005, for U.S. Appl. No. 10/144,540, 11 pp.

Notice of Allowance 1, May 19, 2006, for U.S. Appl. No. 10/323,131, 9 pp.

Notice of Allowance 1, Aug. 22, 2006, for U.S. Appl. No. 10/325,245, 11 pp.

Notice of Allowance 1, Nov. 4, 2008, for U.S. Appl. No. 10/867,970, 11 pp.

Notice of Allowance 1, Dec. 11, 2008, for U.S. Appl. No. 10/874,397, 17 pp.

Notice of Allowance 1, Sep. 3, 2008, for U.S. Appl. No. 10/874,398, 16 pp.

Notice of Allowance 2, Oct. 18, 2007, for U.S. Appl. No. 10/144,347, 13 pp.

Notice of Allowance 2, Sep. 20, 2006, for U.S. Appl. No. 10/323,131, 13 pp.

Notice of Allowance 2, Feb. 8, 2007, for U.S. Appl. No. 10/325,245, 8 pp.

Notice of Allowance 3, Jun. 25, 2008, for U.S. Appl. No. 10/144,347, 16 pp.

Notice of Allowance 3, Jan. 29, 2009, for U.S. Appl. No. 10/325,245, 11 pp.

Office Action 1, Sep. 24, 2004, for U.S. Appl. No. 10/144,347, 18 pp.

Office Action 1, Oct. 13, 2004, for U.S. Appl. No. 10/144,540, 15 pp.

Office Action 1, Jul. 5, 2005, for U.S. Appl. No. 10/323,131, 15 pp.

Office Action 1, Mar. 10, 2006, for U.S. Appl. No. 10/325,245, 9 pp.

Office Action 1, Jul. 21, 2005, for U.S. Appl. No. 10/341,763, 27 pp.

Patent Abstract & Translation for JP2002123530, published on Apr. 26, 2002, 27 pp.

BPAI Decision, Dec. 2, 2009, for U.S. Appl. No. 10/341,763, Total 8 pp.

Examiner's Answer, Aug. 7, 2007, for U.S. Appl. No. 10/341,763, Total 19 pp.

Kenan Systems Corporation, "An Introduction to Multidimensional Database Technology", [online], 1993-1995, [retrieved on Apr. 8, 2004], retrieved from the Internet at <URL: http://www.fing.edu.uy/inco/grupos/csi/esp/Cursos/cursos_act/2003DAP_SistDW/Material/ken96.pdf>, Total 29 pp.

Notice of Allowance 5, Dec. 17, 2009, for U.S. Appl. No. 10/325,245, Total 69 pp.

Notice of Allowance 1, Sep. 13, 2010, for U.S. Appl. No. 11/971,157, Total 5 pp.

Office Action 5, Mar. 30, 2010, for U.S. Appl. No. 10/341,763, Total 55 pp.

Pederson, D., K. RIIS, and T.B. Pederson, "A Powerful and SQL-Compatible Data Model and Query Language For OLAP", (c) 2001, Australian Computer Science Communications, vol. 24, Iss. 2, 2002, Total 10 pp.

White, C.J., "The IBM Business Intelligence Software Solution", Version 3, DataBase Associates International, Inc., Mar. 1999, Total 22 pp.

U.S. Appl. No. 09/602,490, filed on Jun. 23, 2000, entitled "System and Method for Web Based Sharing of Search Engine Queries", invented by R. Kraft, Total 48 pp.

Office Action 1, Jun. 3, 2010, for U.S. Appl. No. 11/971,157, Total 46 pp.

* cited by examiner

Cube Model:

| Property | Value |
|---|---|
| Name | LocationProduct |
| Facts | SalesFacts |
| Set of Dimensions | (Location, LocationFacts), (Product, ProductFacts) |

1800

Cube:

| Property | Value |
|---|---|
| Name | LocationProduct |
| Cube Model | LocationProduct |
| Cube Facts | SalesCFacts |
| List of Cube Dimensions | LocationCD, ProductCD |

1802

Facts:

| Property | Value |
|---|---|
| Name | SalesFacts |
| Set of Measures | Revenue, Profit |
| Set of Attributes | ProductID_Facts, LocationID_Facts |
| Set of Joins | <no joins used> |

1804

Cube Facts:

| Property | Value |
|---|---|
| Name | SalesCFacts |
| Facts | SalesFacts |
| Set of Measures | Revenue, Profit |

1806

Measure:

| Property | Value |
|---|---|
| Name | Revenue |
| List of SQL Expression Template | "{$$1}" |
| List of Columns and Measures | *Column*: Facts.SalesDollar |
| List of Aggregations | (SUM, <empty>) |
| Datatype | DOUBLE |

1808

| Property | Value |
|---|---|
| Name | Profit |
| List of SQL Expression Template | "{$$1} - {$$2}" |
| List of Columns and Measures | *Measure*: Revenue, *Column*: Facts.SalesCost |
| List of Aggregations | (SUM, <empty>) |
| Datatype | DOUBLE |

Dimension:

1812

| Property | Value |
|---|---|
| Name | Location |
| Set of Attributes | LocationID, Country, State, City |
| Set of Joins | <no joins used> |
| Set of Hierarchies | LocDetail, LocOverview |
| Type | REGULAR |

1814

| Property | Value |
|---|---|
| Name | Product |
| Set of Attributes | ProductID, GroupName, ProdName |
| Set of Joins | <no joins used> |
| Set of Hierarchies | Product |
| Type | REGULAR |

Cube Dimension:

1816

| Property | Value |
|---|---|
| Name | LocationCD |
| Dimension | Location |
| Cube Hierarchy | LocOverviewCH |

1818

| Property | Value |
|---|---|
| Name | ProductCD |
| Dimension | Product |
| Cube Hierarchy | ProductCH |

Hierarchy:

1820

| Property | Value |
|---|---|
| Name | Loc Detail |
| List of Attributes | Country, State, City |
| Set of Attribute Relationships | <no attribute relationships used> |
| Type | BALANCED |
| Deployment | STANDARD |

1822

| Property | Value |
|---|---|
| Name | LocOverview |
| List of Attributes | Country, State |
| Set of Attribute Relationships | <no attribute relationships used> |
| Type | BALANCED |
| Deployment | STANDARD |

FIG. 18B

| | Property | Value |
|---|---|---|
| 1824 | Name | Product |
| | List of Attributes | GroupName, ProdName |
| | Set of Attribute Relationships | <no attribute relationships used> |
| | Type | BALANCED |
| | Deployment | STANDARD |

Cube Hierarchy:

| | Property | Value |
|---|---|---|
| 1826 | Name | LocOverviewCH |
| | Hierarchy | LocOverview |
| | List of Attributes | Country, State |
| | Set of Attribute Relationships | <no attribute relationships used> |

| | Property | Value |
|---|---|---|
| 1828 | Name | ProductCH |
| | Dimension | ProductCD |
| | Hierarchy | Product |
| | List of Attributes | GroupName, ProdName |
| | Set of Attribute Relationships | <no attribute relationships used> |

Join:

| | Property | Value |
|---|---|---|
| 1830 | Name | LocationFacts |
| | Join Triplets | (LocationID, LocationID_Facts, =) |
| | Type | INNER |

| | Property | Value |
|---|---|---|
| 1832 | Name | ProductFacts |
| | Join Triplets | (ProductID, ProductID_Facts, =) |
| | Type | INNER |

FIG. 18C

Attribute:

| Property | Value |
|---|---|
| 1834 Name | City |
| List of Columns and Attributes | *Column*: Location.City |
| SQL Expression Template | "{$$1}" |
| Datatype | VARCHAR(40) |
| Role | LEVEL |

| Property | Value |
|---|---|
| 1836 Name | State |
| List of Columns and Attributes | *Column*: Location.State |
| SQL Expression Template | "{$$1}" |
| Datatype | VARCHAR(40) |
| Role | LEVEL |

| Property | Value |
|---|---|
| 1838 Name | ProdName |
| List of Columns and Attributes | *Column*: Product.Name |
| SQL Expression Template | "{$$1}" |
| Datatype | VARCHAR(40) |
| Role | LEVEL |

| Property | Value |
|---|---|
| 1840 Name | GroupName |
| List of Columns and Attributes | *Column*: Product.GroupName |
| SQL Expression Template | "{$$1}" |
| Datatype | VARCHAR(40) |
| Role | LEVEL |

| Property | Value |
|---|---|
| 1842 Name | ProductID |
| List of Columns and Attributes | *Column*: Product.ProductID |
| SQL Expression Template | "{$$1}" |
| Datatype | INTEGER |
| Role | DIMKEY |

| Property | Value |
|---|---|
| 1844 Name | ProductID_Facts |
| List of Columns and Attributes | *Column*: Facts.ProductID |
| SQL Expression Template | "{$$1}" |
| Datatype | INTEGER |
| Role | DIMKEY |

FIG. 18D

| | Property | Value |
|---|---|---|
| 1846 | Name | LocationID |
| | List of Columns and Attributes | *Column*: Location.LocationID |
| | SQL Expression Template | "{$$1}" |
| | Datatype | INTEGER |
| | Role | DIMKEY |

| | Property | Value |
|---|---|---|
| 1848 | Name | LocationID_Facts |
| | List of Columns and Attributes | *Column*: Facts.LocationID |
| | SQL Expression Template | "{$$1}" |
| | Datatype | INTEGER |
| | Role | DIMKEY |

FIG. 18E

IMPROVING PERFORMANCE OF DATABASE QUERIES

CROSS-REFERENCE TO RELATED APPLICATIONS

This application is related to commonly owned and co-pending application Ser. No. 10/341,763 entitled "METHOD, SYSTEM, AND PROGRAM FOR SPECIFYING MULTIDIMENSIONAL CALCULATIONS FOR A RELATIONAL OLAP ENGINE," by N. Colossi, et al., filed on Jan. 13, 2003, and which is incorporated by reference herein in its entirety.

BACKGROUND OF THE INVENTION

1. Field of the Invention

The present invention is directed to creating a consistent copy of data.

The present invention is related to improving the performance of database queries.

2. Description of the Related Art

On-line analytical processing (OLAP) has become increasingly popular. Instead of reviewing piles of static reports printed on green-bar paper, an OLAP analyst can explore business results interactively, dynamically adjusting the view of the data and asking questions and getting answers almost immediately. This freedom from static answers to fixed questions on a fixed schedule allows business analysts to operate more effectively and to effect improvements in business operations.

Nigel Pendse introduced the term "FASMI" to characterize OLAP systems. The FASMI characteristics are: Fast, Analysis, Shared, Multidimensional, and Information. For further information, see N. Pendse, "What Is OLAP?" The OLAP Report.

As for fast, in keeping with the spirit of the "0" in OLAP, such systems need to provide results very quickly usually in just a few seconds, and seldom in more than 20 or 30 seconds. This level of performance is key in allowing analysts to work effectively without distraction.

As for analysis, considering the "A" in OLAP, OLAP systems generally provide rich analytic functions appropriate to a given application, with minimal programming.

As for shared, an OLAP system is usually a shared resource. This means that there is a requirement for OLAP systems to provide appropriate security and integrity features. Ultimately, this can mean providing different access controls on each cell of a database.

As for multidimensional, multidimensionality is the primary requirement for an OLAP system. OLAP products present their data in a multidimensional framework. Dimensions are collections of related identifiers, or attributes (product, market, time, channel, scenario, or customer, for example) of the data values of the system. The identifiers ("The Lord of the Rings-DVD," "San Jose, Calif.," "2002," "Retail Rental," and "John Q. Public," for example) belonging to the collection for a particular dimension generally have some sort of structure, such as hierarchical. Sometimes there is more than one natural structure for these identifiers.

The multidimensional characteristic means that an OLAP system can quickly switch among various orientations of dimensions, as well as among various subsets and structural arrangements of a dimension. Because of the multidimensional nature of OLAP systems, the collections of data that they implement are referred to as cubes. As for information, OLAP systems store and calculate information. Data for OLAP systems often come from one or more operational systems. Analytical models are applied to these data, and the results are either stored in the system or generated at query time. The quantity of information that a particular OLAP system can manage is one characteristic of that system.

Enterprises have been storing multidimensional data, using a star or snowflake schema, in relational databases for many years. Over time, relational database vendors have added optimizations that enhance query performance on these schemas. During the 1990s many special purpose databases were developed that could handle added calculational complexity and that generally performed better than relational engines.

OLAP systems perform analysis of data that typically comes from relational databases. There are different types of OLAP systems: relational OLAP (ROLAP), hybrid OLAP (HOLAP), and multidimensional OLAP (MOLAP). The different types of OLAP systems vary in the degree to which they use relational databases. ROLAP systems issue queries directly against relational databases and analyze the results. MOLAP products have a proprietary data store, which they populate by reading from a relational database. Then, the MOLAP product responds to queries by reading from the data store. HOLAP products route selected queries to the relational database to obtain data that does not fit in the limited MOLAP data store.

Multidimensional OLAP (MOLAP) refers to the family of OLAP systems in which special-purpose file systems or indexes are used to store cube data. Express Web Publisher, Essbase™, TM1, and Pilot Suite are a few examples of products based on special-purpose storage and indexing technology. Microsoft's OLAP offering also includes a MOLAP engine. These systems are often read-only systems that are loaded with base data periodically, then derived results are calculated, stored, and indexed. Scalability of MOLAP systems is often limited by the size of the batch window within which derived results are calculated and stored. To improve scalability, such systems often have a means for deferring calculation of some derived results until query time.

For relational OLAP (ROLAP), star schemas have been used for many years as a means for representing multidimensional data in a relational database. Many commercial software development companies, such as MicroStrategy, Brio, Business Objects, Metacube, Hyperion, and Metaphor, have developed batch or interactive multidimensional reporting and exploration interfaces for relational star schemas. These systems were all designed and implemented before super aggregate operators were added to the Structured Query Language (SQL) language definition.

In particular, until a few years ago, relational databases allowed the calculation of aggregates at only a single level per query. For example, one SELECT statement with a GROUP BY clause would be used to retrieve a result set at a quarter level (i.e., for a set of quarters), while another SELECT statement with a GROUP BY clause would be used to retrieve a result set at a month level (i.e., for a set of months). This forced relational OLAP systems to run multiple queries against the database in order to calculate cells at varying levels.

To facilitate OLAP-type query creation and provide more advanced optimizations, a DB2® Relational Database Management System (RDBMS), available from International Business Machines Corporation, implemented three new super aggregate operators that were added to the SQL standard to allow a single query to generate multiple aggregates: ROLLUP, CUBE, and GROUPING SETS. These super aggregate operators are extensions to the GROUP BY clause and specify that aggregates be generated at multiple levels.

For example, one SELECT statement may be used to obtain a result set of calculations of aggregates at multiple levels (e.g., both quarter and month).

Note that these super aggregate operators are more than mere shorthand for generating multiple grouping sets. Because multiple grouping sets are requested in a single statement, the DB2® RDBMS can build an execution plan that generates the grouping sets in such a way that each input row needed for the calculation is referenced only once. This can result in performance improvements of orders of magnitude, especially when the set of input rows does not fit in the buffer pool (i.e., cache).

Prior art systems are designed to produce multidimensional reports showing results with different levels of granularity by issuing multiple queries. Multiple result sets are obtained for the multiple queries, and the result sets are merged to form a single report. Such systems depend on some sort of description (metadata) of the roles for the tables and columns in a star schema for generating the necessary SQL to retrieve the data to produce the multidimensional reports. The precise metadata varies from product to product.

Multidimensional on-line analytical processing (OLAP) systems (e.g., from companies such as Hyperion, Cognos, and Microsoft) are designed to return multidimensional result sets naturally, when given sets of members for each edge of a multidimensional cube. The multidimensional OLAP systems are also designed to compute some or all of the results in advance of any query.

Multidimensional analysis has been done using SQL since the introduction of relational databases, but relational OLAP systems have not been able to return multidimensional results sets naturally or compute some or all of the results in advance of a query.

OLAP systems issue multidimensional queries. These queries may request data to be aggregated at various levels of the dimension hierarchies. The relational database system reads the data and aggregates the data to the appropriate level. In some cases, most of the time spent in responding to a query is spent reading and aggregating data rather than in returning the data. Relational databases provided materialized views in which data can be aggregated at particular levels and made persistent. A materialized view is a table that represents a view and that is generated prior to receiving a query referencing the view. If a query requests data from that level, the RDBMS can directly read the data from the materialized view rather than reading and aggregating large quantities of lower level data. If queries refer to data that is in higher levels of the hierarchies than that already aggregated, the RDBMS may be able to make use of the existing aggregation. The use of materialized views to store pre-calculated aggregates improves performance.

Determining the most cost effective materialized views to be created is based on several factors (e.g., overhead in terms of storage vs. query performance improvement) and is a complex and time consuming task.

Thus, there is a need in the art to improve the performance of a relational database management system (RDBMS) used by an OLAP system.

SUMMARY OF THE INVENTION

Provided are a method, system, and program improving the performance for SQL queries. Multidimensional metadata associated with a cube model metadata object is obtained. One or more summary tables to be built are automatically identified based on the obtained multidimensional metadata. One or more indexes to create are automatically identified based on the obtained multidimensional metadata.

BRIEF DESCRIPTION OF THE DRAWINGS

Referring now to the drawings in which like reference numbers represent corresponding parts throughout:

FIGS. 18A-18E illustrate a possible set of metadata object instances and some properties of metadata objects that may be generated for a star schema in accordance with certain implementations of the invention.

DETAILED DESCRIPTION

In the following description, reference is made to the accompanying drawings which form a part hereof and which illustrate several implementations of the present invention. It is understood that other implementations may be utilized and structural and operational changes may be made without departing from the scope of the present invention.

A. Multidimensional Metadata Introduction

In certain implementations, the invention provides multidimensional metadata objects and techniques for using the multidimensional metadata objects. For ease of reference, the invention will be referred to as an "OLAP multidimensional metadata system 100" herein, and multidimensional metadata objects will be referred to as "metadata objects."

In certain implementations, the OLAP multidimensional metadata system 100 is implemented in a DB2® Universal Database (UDB) relational database management system (RDBMS), available from International Business Machines Corporation. Although the present specification describes the use of IBM's DB2® UDB RDBMS software, those skilled in the art will recognize that the present invention can use other RDBMS software, such as RDBMS software available from Oracle, IBM Informix, Sybase. Additionally, the present invention can run on computers using various operating systems, such as IBM z/OS®, IBM AIX®, Microsoft Windows® 2000, Microsoft Windows® XP, or Linux, Solaris, HP-UX.

Figure 1:
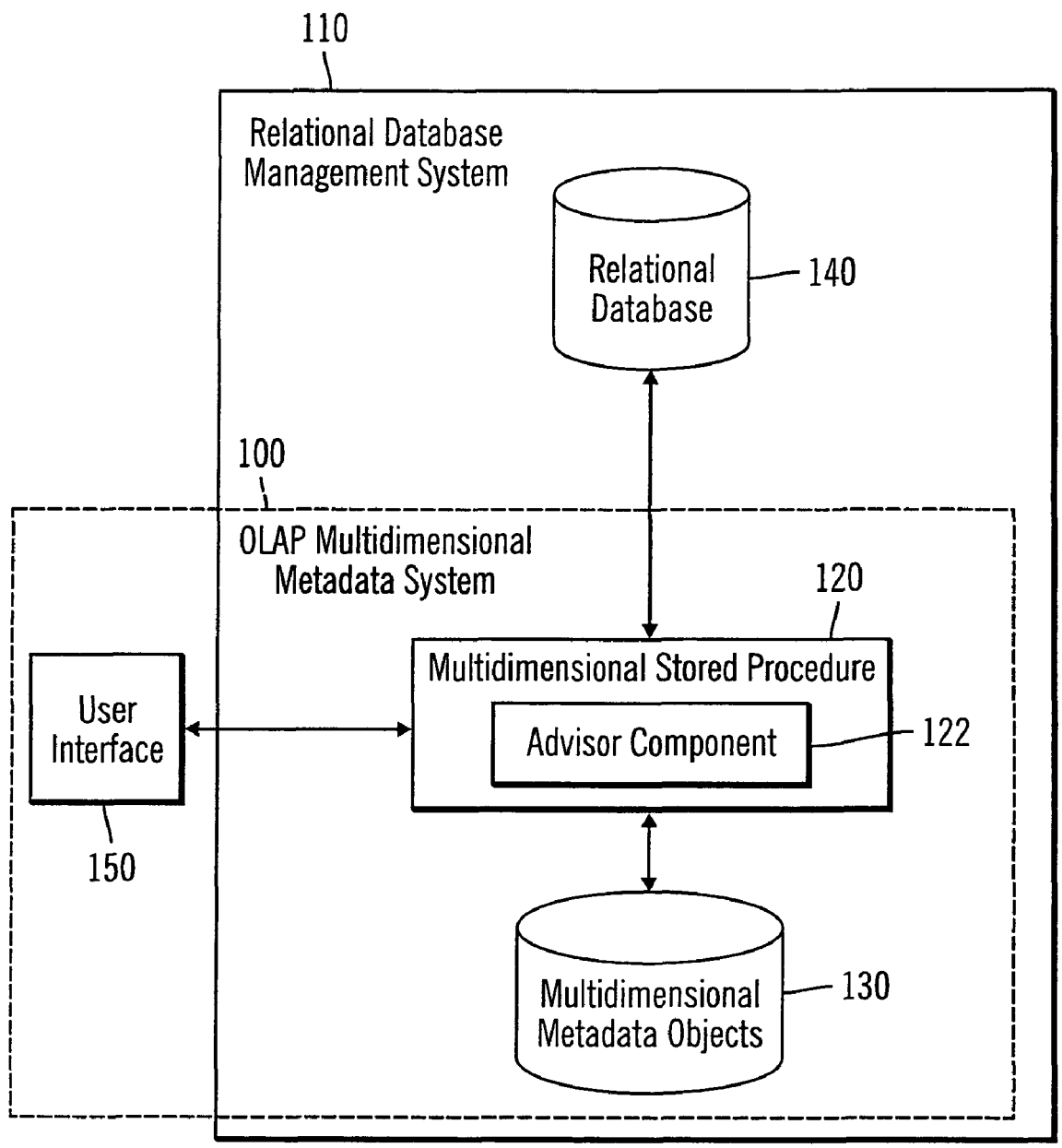
FIG. 1 illustrates, in a block diagram, a computing environment in accordance with certain implementations of the invention.

FIG. 1 illustrates, in a block diagram, a computing environment in accordance with certain implementations of the invention. A Relational Database Management System (RDBMS) 110 includes a multidimensional stored procedure 120 (e.g., a stored procedure application programming interface (API)). The RDBMS 110 accesses multidimensional metadata objects 130 ("metadata objects 130") and a relational database 140. In certain implementations, the data in multidimensional metadata objects 130 and relational database 140 may be stored in a single database.

An OLAP multidimensional metadata system 100 includes the multidimensional stored procedure 120, which includes advisor component 122 (e.g., a stored procedure application programming interface (API)), a user interface 150, and multidimensional metadata objects 130. The advisor component 122 makes recommendations for optimization of database queries. In particular, the advisor component 122 reads metadata from metadata objects 130, analyzes the metadata, and outputs recommended SQL for summary tables.

Note that summary tables may also be referred to as "automated summary tables" (ASTs). A summary table is a particular type of materialized view in which aggregations are used. Moreover, a summary table is a hybrid of a view and a table. A summary table is defined like a view, but is physical like a table. Just like regular tables, a summary table can be optimized. A summary table can have indexes, be partitioned, and exist in a tablespace. The process of populating a summary table may be a lengthy process and, in certain implementations, is integrated with other data warehouse maintenance. In certain implementations, when data is added to a warehouse (e.g., the latest sales data), then the summary tables will be updated also. There are two ways to update summary tables. The first is to rebuild the entire summary table. The second mechanism is to incrementally maintain summary tables. In this approach, the RDBMS 110 will automatically update the summary table based on modifications being made to the warehouse. In certain implementations, the RDBMS 110 supports incremental maintenance if the analytic used is SUM.

Components of the multidimensional stored procedure 120 (other than the advisor component 122) create, describe, alter, drop, rename, validate, and import metadata objects 130. Optionally, a user interface 150 may be provided for a user or administrator to send commands to the advisor component 122.

In certain implementations, the OLAP multidimensional metadata system 100 provides an add-on feature for an RDBMS 110, such as DB2® Universal Database (referred to herein as DB2® UDB), that improves the ability of the RDBMS 110 to perform OLAP processing.

An OLAP system accesses data from the RDBMS 110 by generating SQL queries. In certain implementations, the OLAP system can either be a client system used directly by an end user or a server system that interacts with the end users systems. The invention streamlines the deployment and management of OLAP solutions, and improves the performance of OLAP tools and applications.

In particular, the OLAP multidimensional metadata system 100 provides new metadata objects 130. The new metadata objects 130 are stored in, for example, a database catalog (e.g., the DB2® UDB catalog) that describes the dimensional model and OLAP constructs of existing relational data. The database catalog provides a single repository from which OLAP applications can capture multidimensional metadata. In certain implementations, the metadata objects 130 may reside on a data store other than the database catalog or may reside across multiple data stores. With the information in the central repository, a database optimizer is able to use techniques specific to star schemas for optimizing the execution of queries.

With the metadata objects 130, the invention can optimize OLAP query performance by aggregating data in summary tables and by creating indexes. The OLAP multidimensional metadata system 100 also provides a metadata programming interface. In particular, the OLAP multidimensional metadata system 100 provides a SQL-based and extensible mark-up language (XML)-based application programming interface (API) for OLAP tools and application developers. Through, for example, Command Line Interface (CLI), Open Database Connectivity (ODBC), or Java Database Connectivity (JDBC™) connections or by using, for example, embedded SQL to DB2® UDB, applications and tools can use a single stored procedure to create, modify, and retrieve metadata objects 130. In certain implementations, multiple stored procedures may provide the functionality for creating, modifying, and retrieving multidimensional metadata objects 130.

Metadata objects 130 describe relational information as intelligent OLAP structures, but the metadata objects 130 of the OLAP multidimensional metadata system 100 provided by the invention are different from traditional OLAP objects. The metadata objects 130 store metadata, meaning the metadata objects 130 store information about the data in the base tables. Metadata objects describe where pertinent data is located and can also describe relationships within the base data. For example, a facts metadata object is a specific metadata object that stores information about related measures, attributes and joins, but does not include the data specifically from the base fact table.

Metadata provides a new perspective from which to understand data. Without metadata objects 130, a database catalog only knows about metadata describing tables and column names and cannot store information about the meanings of the tables and columns or how the tables and columns relate to each other. With metadata objects 130, this information may be stored.

Each metadata object completes a piece of the big picture showing what the relational data means. Some metadata objects 130 act as a base to directly access relational data by aggregating data or directly corresponding to particular columns in relational tables. Other metadata objects 130 describe relationships between the base metadata objects 130 and link these base metadata objects 130 together. Ultimately, all of the metadata objects 130 can be grouped together by their relationships to each other, into a metadata object called a cube model. A cube model represents a particular grouping and configuration of relational tables. The purpose of a cube model is to describe OLAP structures to a given application or tool. A cube model groups dimensions and facts, and offers the flexibility of multiple hierarchies for dimensions. A cube model conveys the structural information needed by query design tools and applications that generate complex queries on star schema databases.

The multidimensional metadata object model is designed to describe the schemas used in relational databases to represent multidimensional data. One way to organize such data is by using a star or snowflake schema (in snowflake schemas the dimension tables are normalized). However, the model is flexible enough to handle any type of schema (e.g., more normalized schemas).

A.1 Multidimensional Metadata Overview

The multidimensional metadata enables maintenance of metadata about OLAP structures stored in data warehouses. This information was not previously available in the database catalog and frequently is not documented by data warehouse metadata repositories. Multidimensional metadata helps the data warehouse designer represent the structural relationship among tables and their columns. Once this metadata exists in the database catalog, other components of the RDBMS 110, such as a database optimizer (e.g., a DB2® UDB optimizer), can take advantage of the structural information and perform queries, against data described by these new metadata objects 130, faster. The metadata objects 130 can also assist business intelligence tools by providing the base structural information needed to generate multidimensional queries against the data warehouse. In order to capture OLAP structural information, the OLAP multidimensional metadata system 100 defines several new metadata objects 130. These metadata objects 130 are able to describe key aspects of schemas frequently used to model OLAP data, such as star-join and snowflake schemas.

Adding the metadata objects 130 to a database catalog provides full functionality and integration with other database components. The new metadata objects 130 are owned by a schema, in the same way as regular tables. Another design point for the metadata objects 130 is that most of them are independently useful. That is, the metadata objects 130 provide information about the underlying relational schema, whether or not the metadata objects 130 are included in a more complex multidimensional structure.

Figure 2:
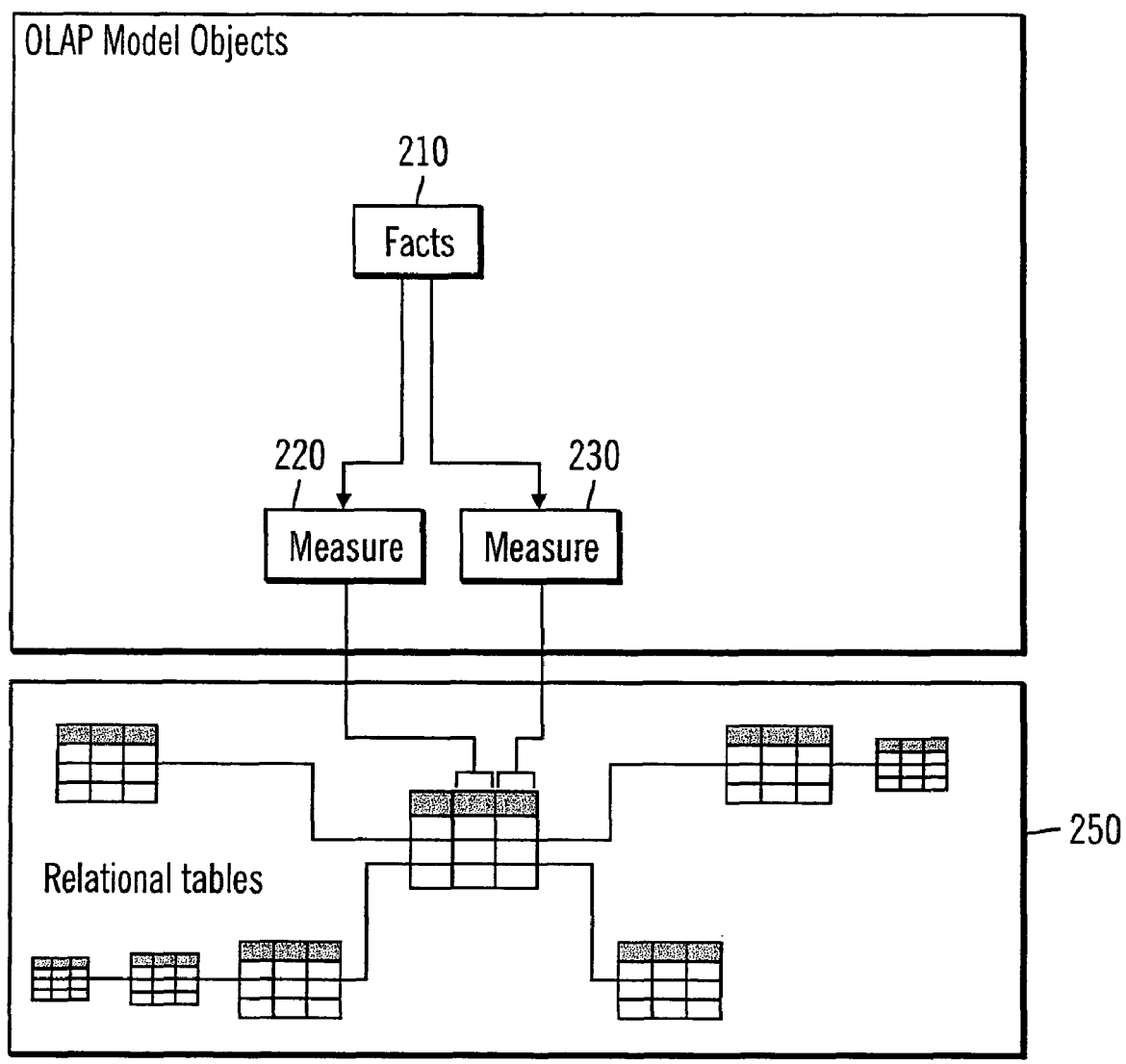
FIG. 2 illustrates that a facts metadata object and measures metadata objects relate to relational data in accordance with certain implementations of the invention.

A cube model can be constructed in many ways, but is often built to represent a relational star schema or snowflake schema. A cube model based on a simple star schema is built around a central facts metadata object that describes aggregated relational data from a fact table. Measure metadata objects describe data calculations from columns in a relational table and are joined together to create the facts metadata object. FIG. 2 illustrates that a facts metadata object 210 and measure metadata objects 220, 230 relate to relational data 250 in accordance with certain implementations of the invention.

Dimension metadata objects are connected to the facts metadata object in a cube model just as the dimension tables are connected to the fact table in a star schema. Columns of data from relational tables are represented by attribute metadata objects that are joined together to make up a dimension metadata object.

Figure 3:
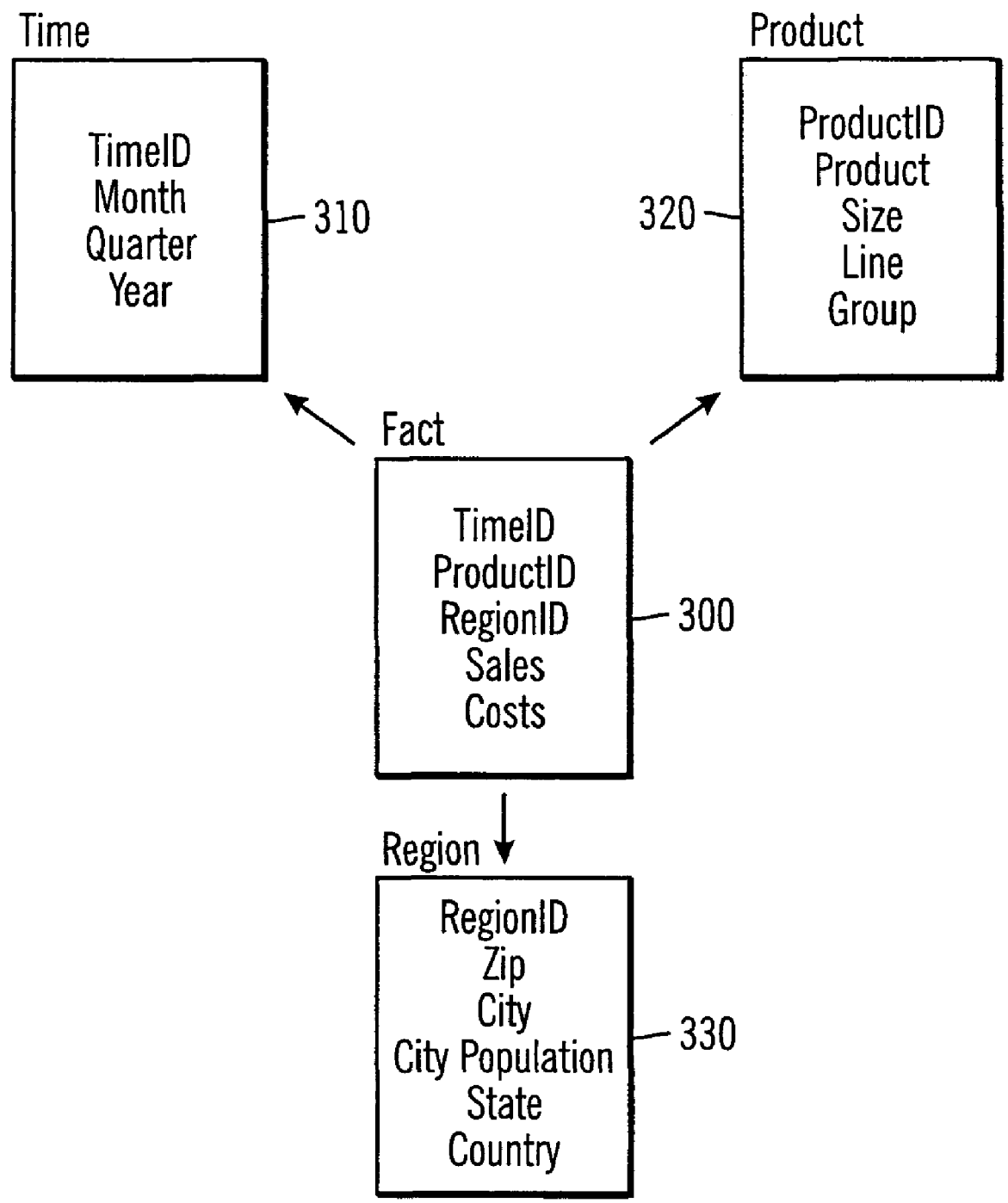
FIG. 3 illustrates a sample star-join schema in accordance with certain implementations of the invention.

FIG. 3 illustrates a sample star-join schema in accordance with certain implementations of the invention. The star-join schema has Time 310, Product 320, and Region 330 dimension tables joined to a central Sales facts table 300. Attributes are created for the relevant dimension and fact table 300, 310, 320, 330 columns in a relational table. Each dimension table 310, 320, 330 has a dimensional key attribute such as TimeID, ProductID, or RegionID. The region dimension table 330 also has City and City_Population attributes and an attribute relationship named CityPop AR. The attribute relationship expresses the functional dependency that every value in the City attribute determines a corresponding value in the City_Population attribute. Within the facts table, there are two measures for Sales and Costs and the three dimensional key attributes TimeID, ProductID, and RegionID.

Three joins join each dimension table 310, 320, 330 to the central facts table 300 on the corresponding dimensional key attributes. In this example, the dimension tables 310, 320, 330 are joined with the facts table 300 based on either the TimeID, ProductID, or RegionID attributes.

Figure 4:
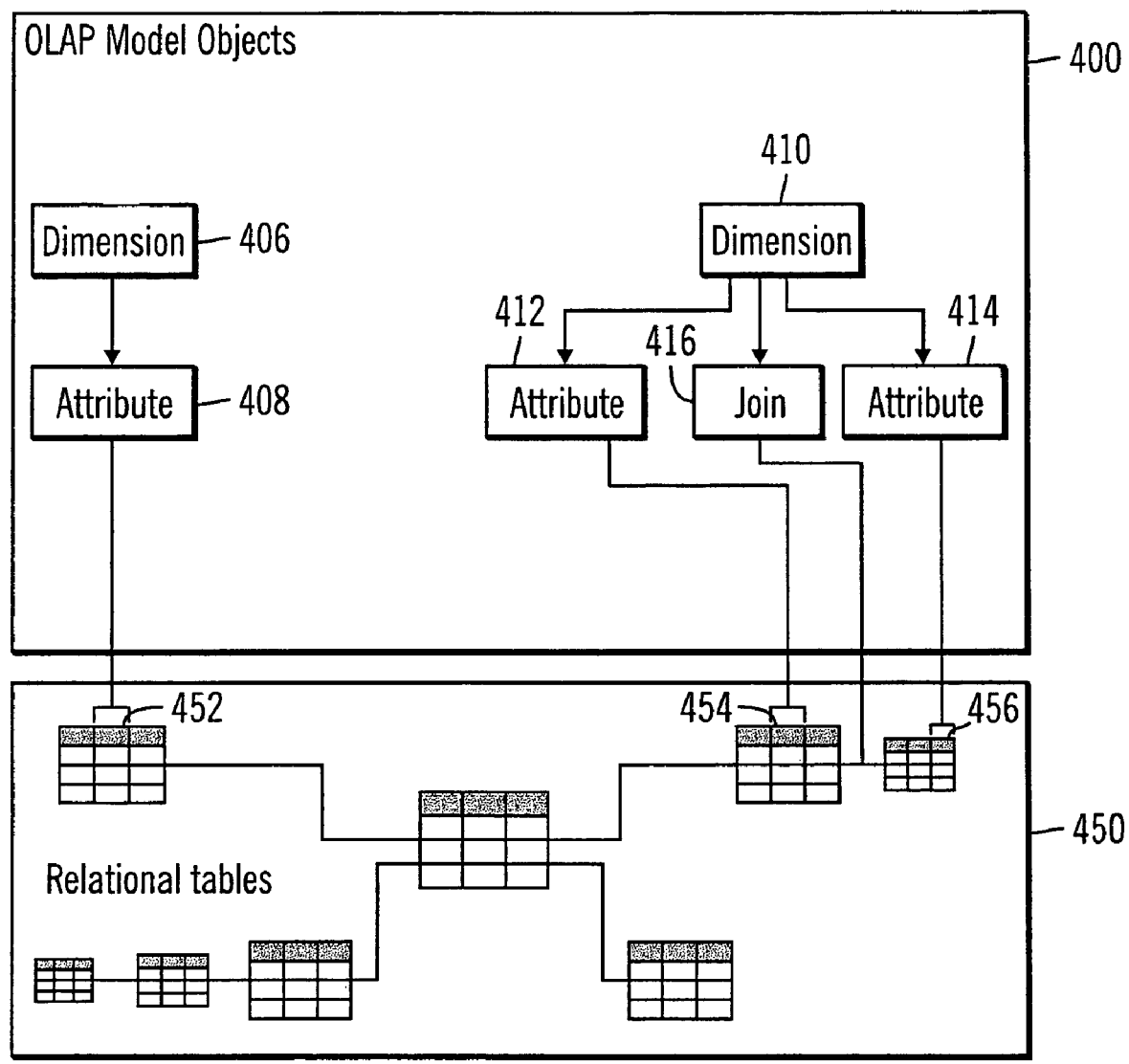
FIG. 4 illustrates that dimension metadata objects are built from relational tables in accordance with certain implementations of the invention.

FIG. 4 illustrates that dimension metadata objects 406, 410 are built from relational tables 450 in accordance with certain implementations of the invention. For example, among the metadata objects, dimension metadata object 406 is built on attribute metadata object 408, and attribute metadata object 408 is connected to an attribute 452 in a relational table. Dimension metadata object 410 is built on attribute metadata objects 412, 414 and a join metadata object 416. The attribute metadata objects are connected to attributes 454 and 456 in the relational tables 450.

Hierarchies store information about how the attributes within a dimension are related to each other and structured. As a metadata object, a hierarchy provides a way to calculate and navigate a dimension. Each dimension has a corresponding hierarchy with levels defined for each member attribute. For example, the Region dimension has a RegionH hierarchy with levels defined for the State and City attributes, and also references the CityPop AR attribute relationship. In a cube model, each dimension can have multiple hierarchies, but the example star schema has one hierarchy defined for each dimension.

In a star schema, all of the dimension metadata objects are connected in a star shape to a central facts metadata object to create a cube model. Join metadata objects can join tables to create a facts metadata object or a dimension metadata object. Join metadata objects can also act as glue within the cube model by joining facts metadata objects to dimension metadata objects. The dimension metadata objects have information about all of their component hierarchies, attributes, attribute relationships and related joins. Facts metadata objects have information about all of their component measures, attributes, and related joins.

Figure 5:
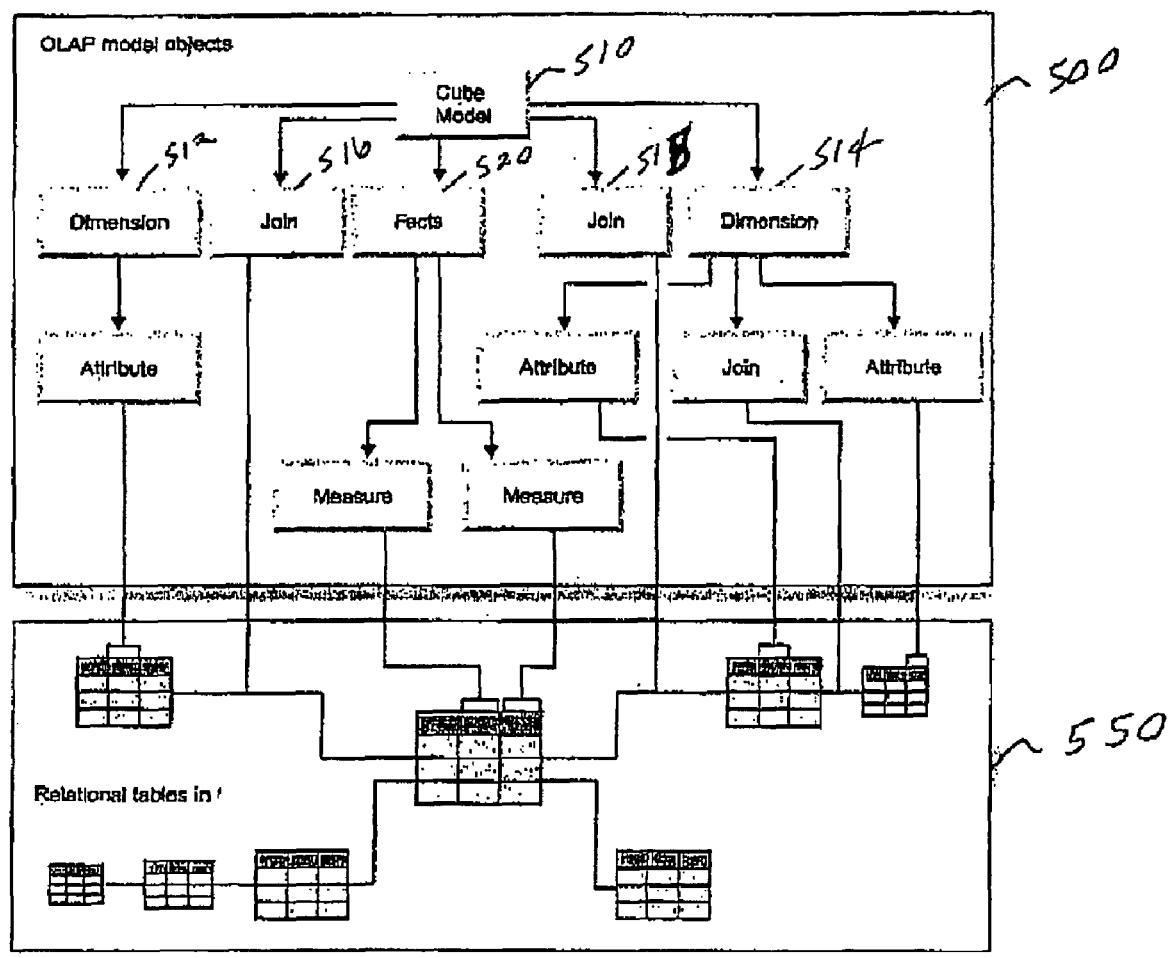
FIG. 5 illustrates that metadata objects fit together in a cube model and map to a relational star schema of relational tables in accordance with certain implementations of the invention.

FIG. 5 illustrates that metadata objects 500 fit together in a cube model and map to a relational star schema of relational tables 550 in accordance with certain implementations of the invention. A cube model metadata object 510 is built on dimension metadata objects 512, 514, join metadata objects 516, 518, and a facts metadata object 520.

Cube model metadata objects are flexible metadata objects whose components may be reused to create more precise cube metadata objects for specific applications. For example, a cube model metadata object may have 37 facts, but one cube metadata object generated from the cube model metadata object may eliminate one or more dimension metadata objects, one or more levels of a dimension metadata object, and/or one or more measures metadata objects.

In addition to cube model metadata objects, there is a more specific metadata object called a cube metadata object. A cube metadata object is the closest metadata object to an OLAP conceptual cube. A cube metadata object is a specific instance or subset of a cube model metadata object. A cube metadata object has a specific set of similar but more restrictive metadata objects derived from the parent cube model metadata object including: cube dimensions, cube hierarchies, and cube facts. For example, a RegionCubeDim is a cube dimension that is a subset of attributes derived from the Region dimension. RegionCubeDim references the State and City attributes, but does not reference the City_Population attribute or CityPop AR attribute relationship. The RegionCubeDim references the Region dimension that it scopes and all of the structural information, including the join information, stays with the cube model Region dimension.

In certain implementations, a cube metadata object has one cube hierarchy defined per cube dimension, while a dimension metadata object can have many hierarchies defined for the cube model metadata object. This structural difference between a cube metadata object and a cube model metadata object allows retrieval of a cube metadata object with a single SQL statement.

Figure 6:
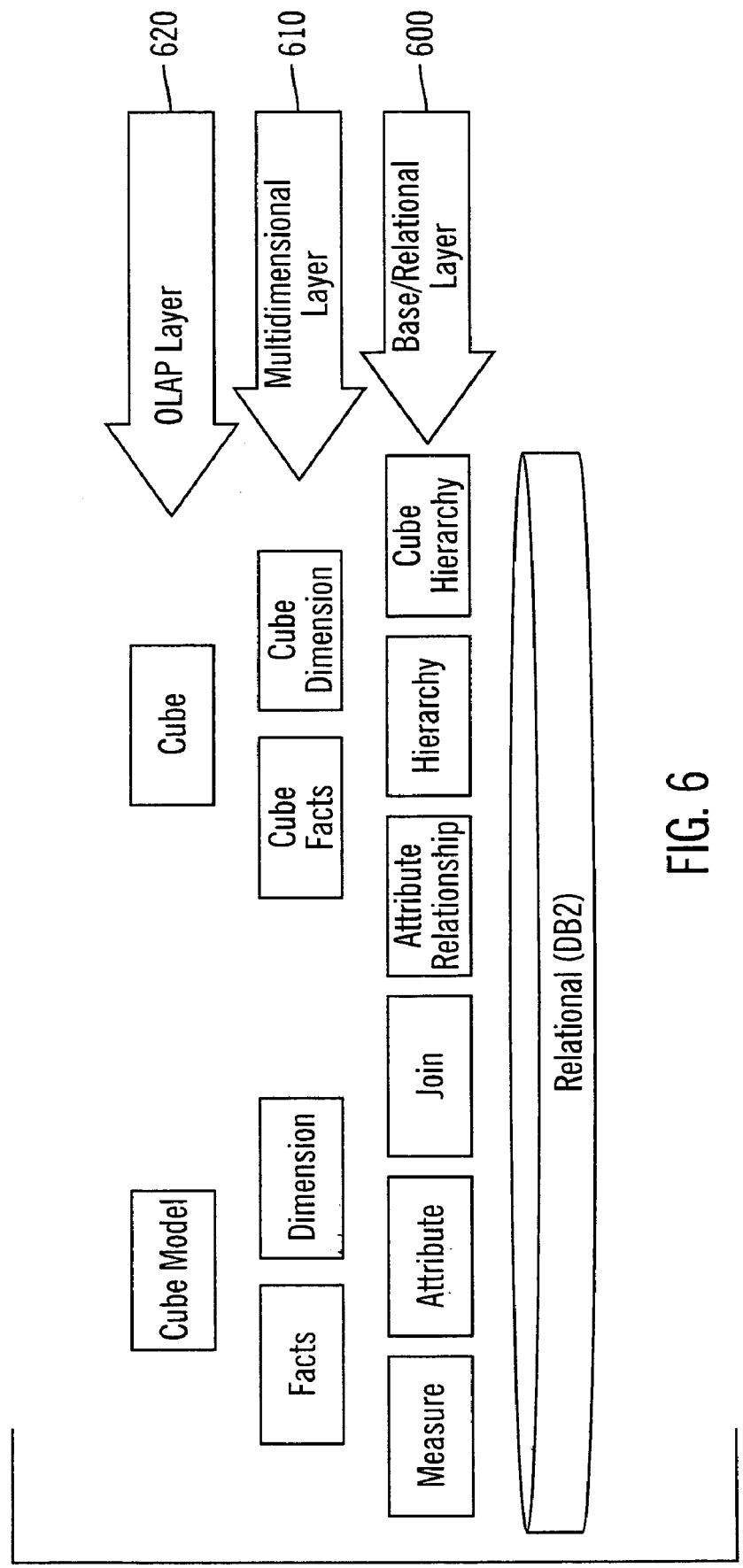
FIG. 6 illustrates that conceptual metadata objects are categorized in three layers in accordance with certain implementations of the invention.

FIG. 6 illustrates that conceptual metadata objects are categorized in three layers in accordance with certain implementations of the invention. These layers are a Base/Relational layer 600, a Multidimensional layer 610, and an OLAP layer 620. The Base/Relational layer 600 provides base infrastructure to other metadata objects and encapsulates concepts of the relational database. The Multidimensional layer 610 includes metadata objects that reference metadata objects in the Base/Relational layer 600 to provide a multidimensional abstraction over the relational database. The OLAP layer 620 contains high-level metadata objects that represent OLAP structures. By grouping metadata objects from other layers, the OLAP layer 620 provides OLAP cubes with different degrees of complexity.

An example is provided for better understanding of the invention. The example is based on a common structure used in data marts, a star-join schema. For the star join schema, instances of the metadata objects are created based on the Base/Relational, Multidimensional, and OLAP layers. FIG. 3 illustrates a simple star-join schema consisting of a fact table 300, Fact, and three dimension tables Time 310, Product 320, and Region 340 in accordance with certain implementations of the invention.

Existing database catalogs typically store table and column names. The information about what roles these tables and columns play, and how the tables and columns relate to each other is lost. However, with the OLAP multidimensional metadata system 100, this information is captured by creating metadata objects.

Figure 7:
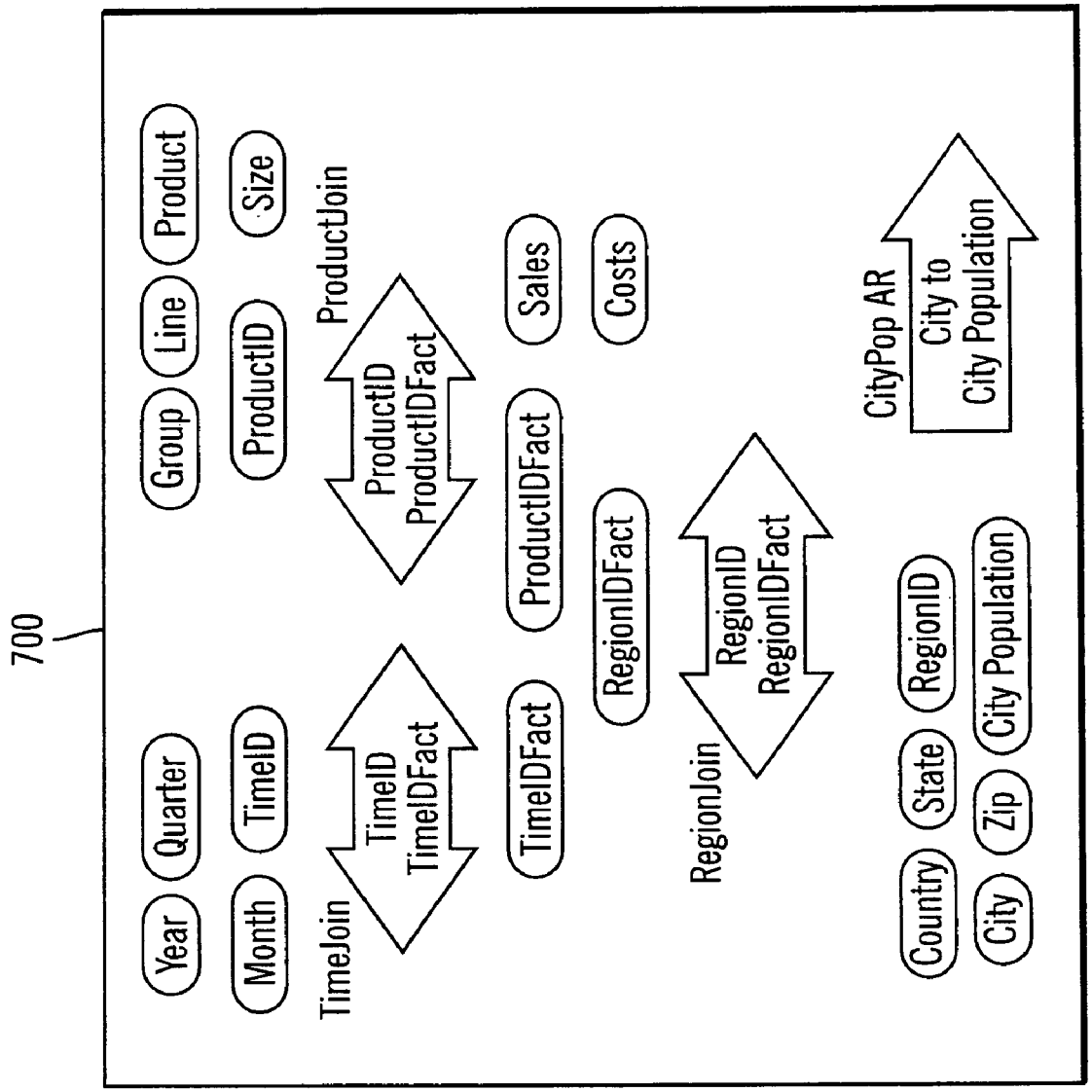
FIG. 7 illustrates that metadata objects corresponding to a Base/Relational layer are created in accordance with certain implementations of the invention.

FIG. 7 illustrates that metadata objects 700 corresponding to a Base/Relational layer are created in accordance with certain implementations of the invention. Attributes are created for all the dimension tables columns, and fact table columns used in joins. One measure metadata object is created for each fact column in the fact table. The joins used in this star-join schema are captured by the three join metadata objects. The join metadata objects specify how to join corresponding attributes of the fact table and dimension tables. One attribute relationship in the Region dimension table is created to represent the relationship between City and City_Population, and the fact that every value in the City attribute determines a value in the City_Population attribute.

Figure 8:
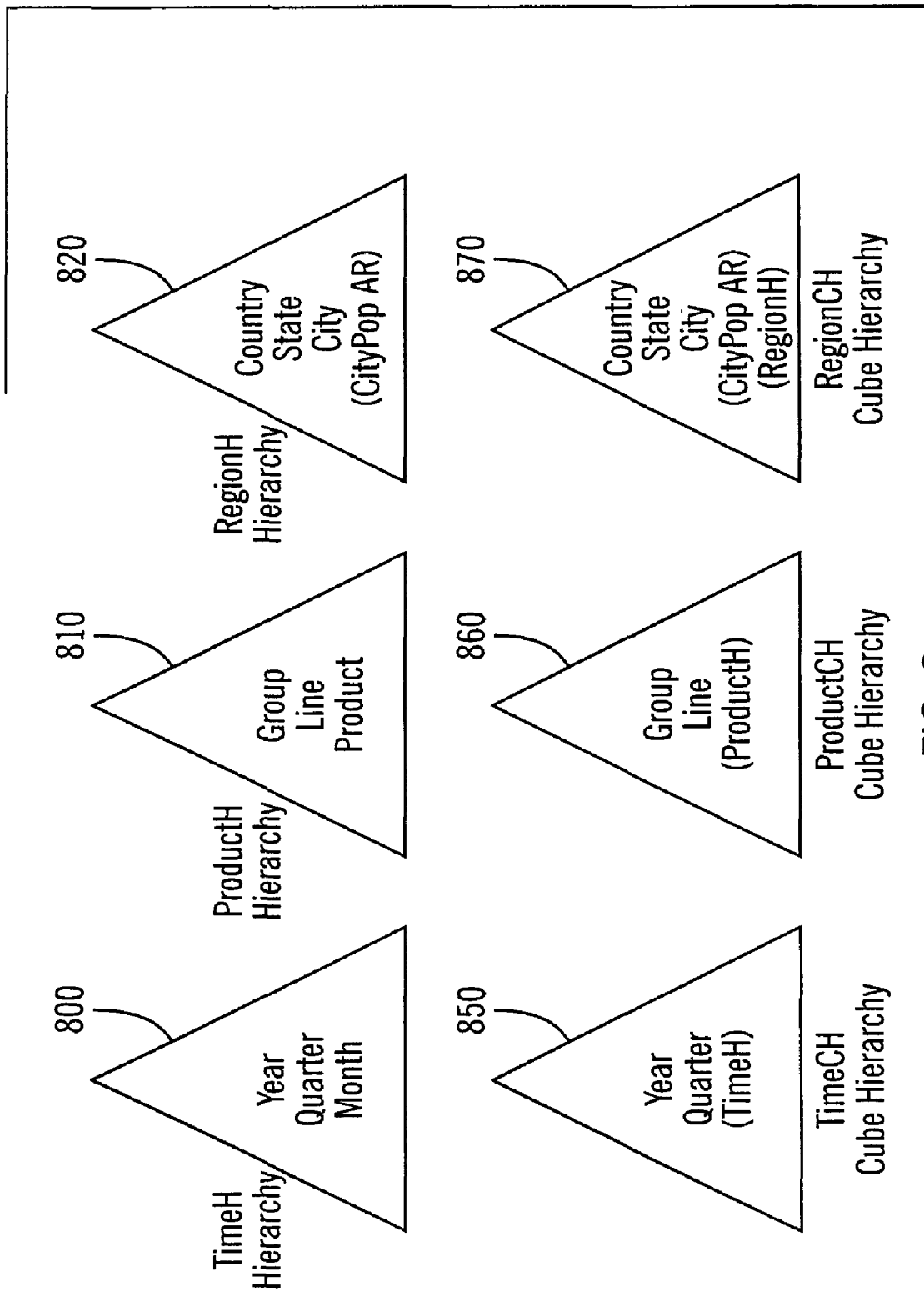
FIG. 8 illustrates additional metadata objects from the Base/Relational layer in accordance with certain implementations of the invention.

FIG. 8 illustrates additional metadata objects from the Base/Relational layer in accordance with certain implementations of the invention. Three hierarchies 800, 810, 820 are created, indicating the relationships among related attributes. These hierarchies 800, 810, 820 are used in the multidimensional layer by dimensions in order to create a means to calculate and navigate the dimension. In the RegionH hierarchy 820, the CityPop AR attribute relationship is referenced. All attribute relationships that apply to a given hierarchy are captured. One cube hierarchy 850, 860, 870 per hierarchy is also created in order to be used in a cube context. The cube hierarchies 850, 860, 870 are used to scope the levels of a hierarchy that are interesting for a given cube. A cube hierarchy 850, 860, 870 also captures attribute relationships that apply to it.

Figure 9:
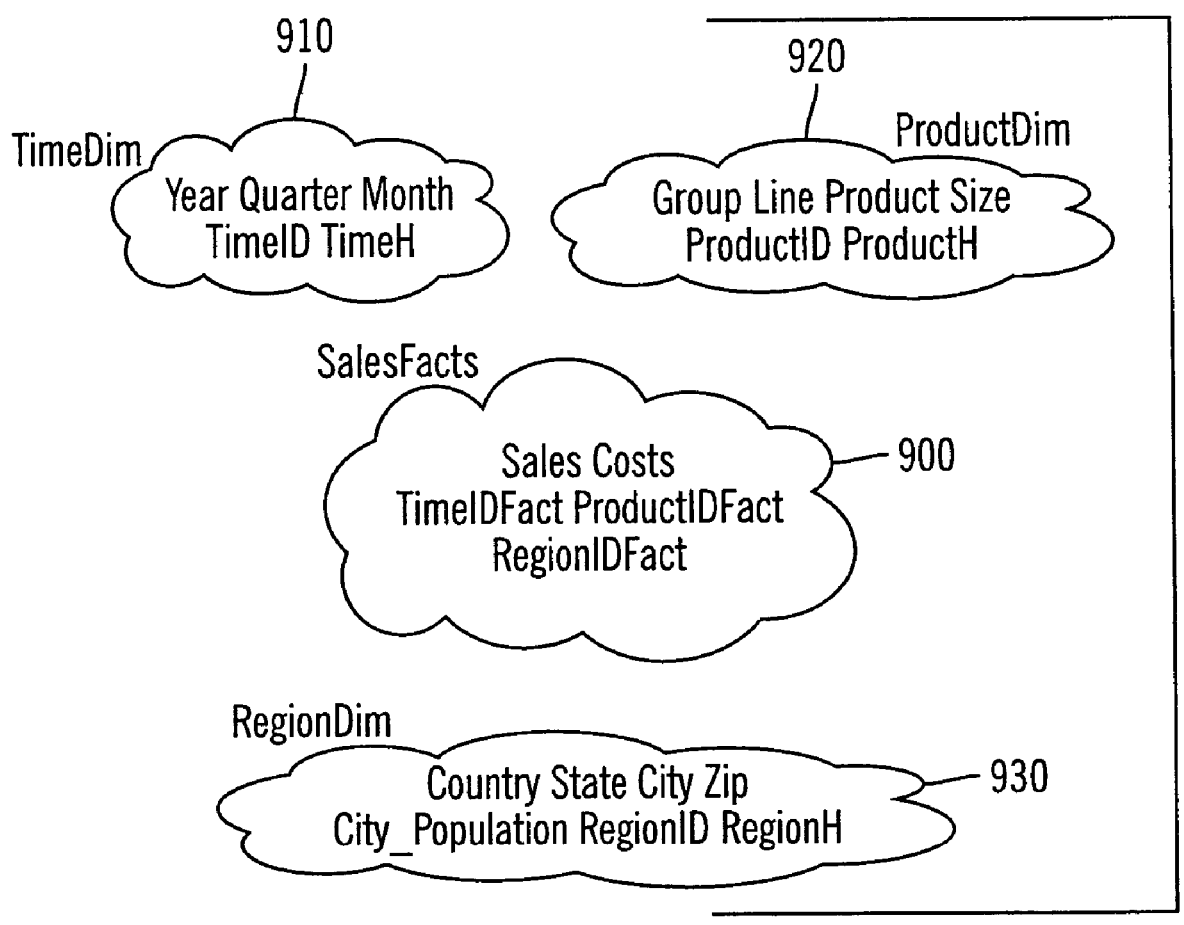
FIG. 9 illustrates multidimensional layer metadata objects created based on a star-join schema in accordance with certain implementations of the invention.

FIG. 9 illustrates multidimensional layer metadata objects created based on a star-join schema in accordance with certain implementations of the invention. One Facts metadata object 900 is created for the fact table Fact. The SalesFacts metadata object 900 includes the measures available and the attributes needed in the facts to dimension joins. One dimension metadata object 910, 920, 930 is created for each dimension table that is part of the star-join schema. A dimension metadata object groups attributes that are highly correlated, coming from a single dimension table in this example. A dimension metadata object also references hierarchies that apply on attributes of a dimension. Dimensions can have multiple hierarchies defined, however, in the example, only one hierarchy is defined per dimension.

Figure 10:
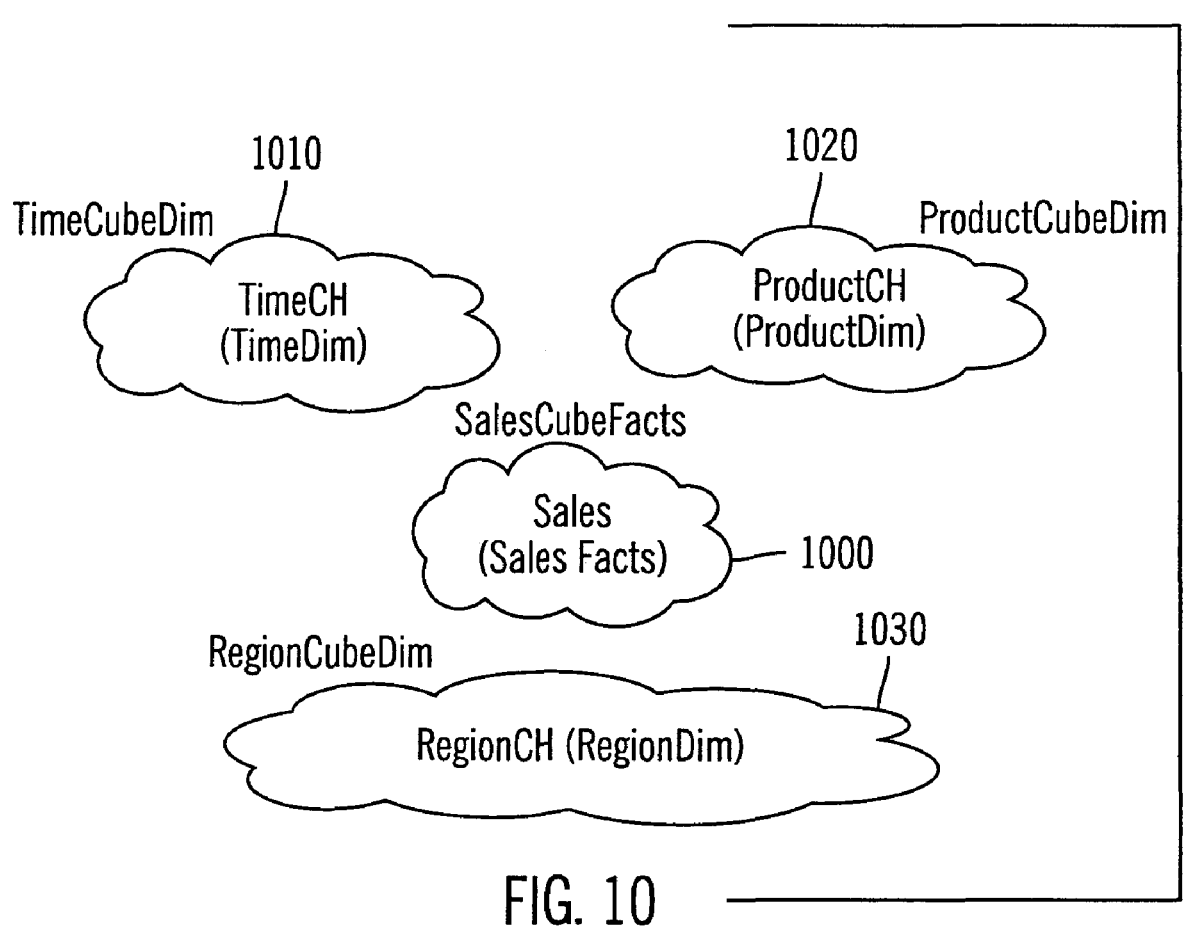
FIG. 10 illustrates instances of metadata objects used to define a cube in accordance with certain implementations of the invention.

FIG. 10 illustrates instances of metadata objects 1000, 1010, 1020, 1030 used to define a cube in accordance with certain implementations of the invention. A cube facts, cube dimension, and cube hierarchy metadata objects are used to scope the attributes and measures that are part of a cube. Each of these metadata objects references the metadata object that is being scoped, and all structural information, such as joins, is kept in the main (i.e., parent) metadata object. All cube specific objects hold a reference to a main object from which they were defined. For example, the cube hierarchy metadata object has a reference to the hierarchy metadata object from which the cube hierarchy metadata object was defined. In certain implementations, for cube dimensions, one hierarchy is assigned. In the example, a cube fact SalesCubeFacts 1000 is created and lists the measure (Sales) that is used in the cube.

The OLAP layer is composed by cube model and cube metadata objects. A cube model metadata object describes the facts and dimensions that are interesting to a given application. The dimensions of a cube model metadata object can have multiple hierarchies defined, which makes a cube model metadata object a very flexible structure. A cube metadata object is derived from a cube model metadata object, and so all cube dimensions, cube hierarchies, and cube facts metadata objects are derived from the cube model metadata object. A difference between a cube model metadata object and a cube metadata object is that in a cube metadata object one hierarchy is defined per dimension, which makes it possible to retrieve a cube metadata object with a single SQL statement.

Figure 11:
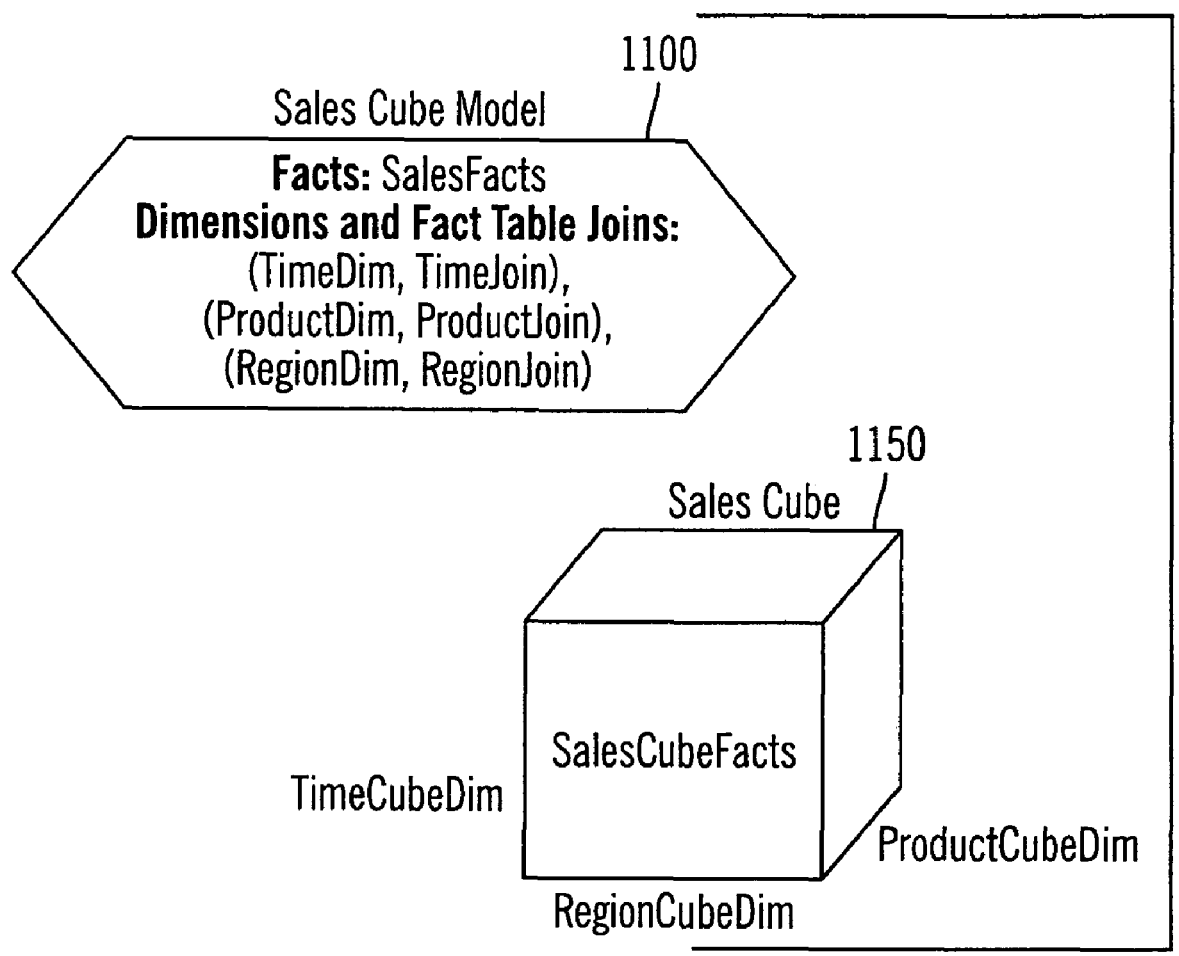
FIG. 11 illustrates that one instance of each metadata object in an on-line analytical processing (OLAP) layer is created in accordance with certain implementations of the invention.

FIG. 11 illustrates that one instance of each metadata object in an OLAP layer is created in accordance with certain implementations of the invention. The cube model created in the example captures one possible cube model 1100 generated from the example star-join schema of FIG. 3. A cube 1150 is created based on the cube dimensions TimeCubeDim, ProductCubeDim, RegionCubeDim and cube facts SalesCubeFacts.

A.2 Metadata Object Properties

Each metadata object has a set of general properties in addition to metadata object-specific properties. The general properties are used to identify the metadata object instances, to describe the usage or role of the metadata object instances, and to track metadata object instance changes. In certain implementations, the metadata objects are named using a schema in the same way that other database metadata objects are named. Full qualifications of the metadata object may be required when the default user name schema is not desired.

Table 1 describes the general properties that exist for all metadata objects in accordance with certain implementations of the invention.

TABLE 1

| Property | Description |
| --- | --- |
| Name | Name of the metadata object. |
| Schema | Schema that owns the metadata object. |
| Business name | Name presented to the end user. This name may be used in graphic user interfaces as a name more meaningful to the end user. |
| Comments | Textual description or comment on the nature or usage of the metadata object. |
| Create time | Time the metadata object was created. |
| Creator | User (schema) that defined the metadata object. |
| Modify time | Time the metadata object was last modified. |
| Modifier | User (schema) that performed the modification. |

In addition to a common set of general properties shared by all metadata objects, each metadata object has a set of metadata object specific properties. These metadata object specific properties describe the components and qualities that define the metadata object.

The cube model is a representation of a logical star schema. The cube model is a grouping of relevant dimension metadata objects around a central facts metadata object. Each dimension can have multiple hierarchies, which increases the flexibility of the cube model. The structural information about how to join the tables used by the facts and dimension metadata objects is stored in the cube model. Also stored in the cube model is enough information to retrieve OLAP data. Other reporting and OLAP tools that understand the cube model and can handle multiple hierarchies of a specific dimension can benefit from the use of a cube model.

Cube models define a complex set of relationships and can be used to selectively expose relevant facts and dimensions to an application. Each join metadata object connecting a dimension to the central facts metadata object is stored with the corresponding dimension as a set. Subsets of cube model components can be used by many cubes for different analysis purposes.

An empty cube model may be created that does not have a facts metadata object or any dimensions. However, the cube model is completed before creating a corresponding cube. The OLAP multidimensional metadata system 100 validates a cube model by ensuring that the cube model includes a facts metadata object, at least one dimension, and joins between the existing facts and dimensions, and that all of the attributes reference valid tables. A hierarchy is not required to consider a cube model complete, however, to be able to define a cube from a cube model, at least one hierarchy per dimension is defined.

Each metadata object has a set of metadata object-specific properties that describe the components and qualities that define the metadata object. The metadata object specific properties of a cube model are described Table 2 in accordance with certain implementations of the invention.

TABLE 2

| Property | Description |
| --- | --- |
| Facts | Facts used in the cube model. |
| Set of (dimension, join) | Dimensions that are used in the cube model and their corresponding joins. |

The facts metadata object groups related measures which are interesting to a given application. Multiple relational fact tables can be joined on specific attributes to map additional related measures. The facts metadata object stores information about the attributes used in fact to dimension joins, and the attributes and joins used to map the additional measures across multiple database tables. Therefore, in addition to a set of measures, a facts metadata object stores a set of attributes and a set of joins. A facts metadata object is used in a cube model as the center of a star schema.

The facts metadata object plays the role of a fact table in a star schema. Just as a fact table does, a facts metadata object gathers measurement entities, represented in the database catalog by measures. These need not come from the same table, allowing the designer to group measures as required for any OLAP application.

The metadata object specific properties of a facts metadata object are described in Table 3 in accordance with certain implementations of the invention.

TABLE 3

| Property | Description |
| --- | --- |
| Set of measures | Set of all related measures in the facts metadata object. |

TABLE 3-continued

| Property | Description |
| --- | --- |
| Set of attributes | Set of all attributes used in the facts metadata object. |
| Set of joins | Set of all joins needed to join all of the specified measures and attributes. |

The dimension metadata object plays the role of a dimension table in a star schema. Dimensions group related attributes, which together describe some aspect of one or more measures. Thus, the dimension metadata object provides a way to categorize a set of related attributes that together describe one aspect of a measure. Dimensions are used in cube models to organize the data in the facts metadata object according to logical categories such as Region, Product, or Time. Related attributes and the joins needed to group these attributes together are defined in the dimension metadata object specific properties.

Dimensions reference one or more hierarchies. Hierarchies describe the relationship and structure of the dimensional attributes and can be used to drive navigation and calculation of the dimension.

Dimensions also have a type that describes whether the dimension is time oriented. For example, a dimension called Time might contain attributes such as Year, Quarter, and Month, and would be a time type. Another dimension called Region might contain attributes such as Country, State, City, and Population and would be a regular type. Type information can be used by applications to intelligently and appropriately perform time related functions.

The metadata object specific properties of dimension metadata objects are described in the following Table 4 in accordance with certain implementations of the invention.

TABLE 4

| Property | Description |
| --- | --- |
| Set of attributes | Set of all attributes used in the dimension. |
| Set of joins | Set of all joins needed to join all of the specified attributes. The joins needed to join the dimension tables are specified here. |
| Set of hierarchies | Set of hierarchies that apply to the dimension. |
| Type [REGULAR, TIME] | Dimension type. |

A hierarchy defines relationships among a set of one or more attributes within a given dimension of a cube model. Defining these relationships provides a navigational and computational means of traversing a given dimension. Multiple hierarchies can be defined for a dimension of a cube model. The hierarchy metadata object also references a set of attribute relationships that link attributes in the hierarchy to other related attributes. The attributes that are directly related by an attribute relationship can be queried as part of the hierarchy. For example, a hierarchy for a Region dimension can have a City attribute, and an attribute relationship can link City to a City_Population attribute. This hierarchy can include City_Population information in a query that includes City.

A hierarchy describes parent-child relationships among attributes. This information is referred to by a dimension to indicate how dimension members can be browsed, and how to aggregate data in the dimension.

The hierarchy type describes the relationship among the attributes within the hierarchy. The following four hierarchy types are supported: balanced, unbalanced, ragged, and network.

Figure 12:
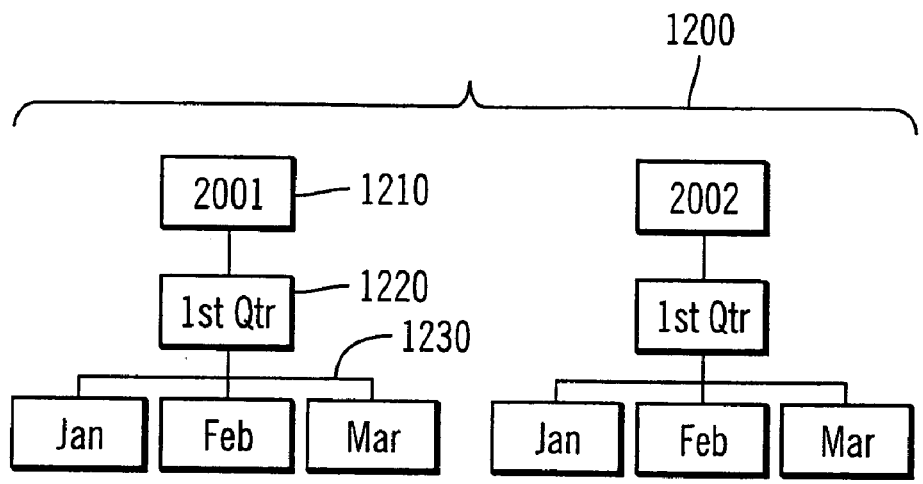
FIG. 12 illustrates an example of a balanced hierarchy in accordance with certain implementations of the invention.

FIG. 12 illustrates an example of a balanced hierarchy 1200 in accordance with certain implementations of the invention. A balanced hierarchy is one with meaningful levels and branches that have a consistent depth. The logical parent of each attribute is in the level directly above that attribute. The balanced hierarchy 1200 represents time where the meaning and depth of each level, such as Year 1210, Quarter 1220 and Month 1230 is consistent.

Figure 13:
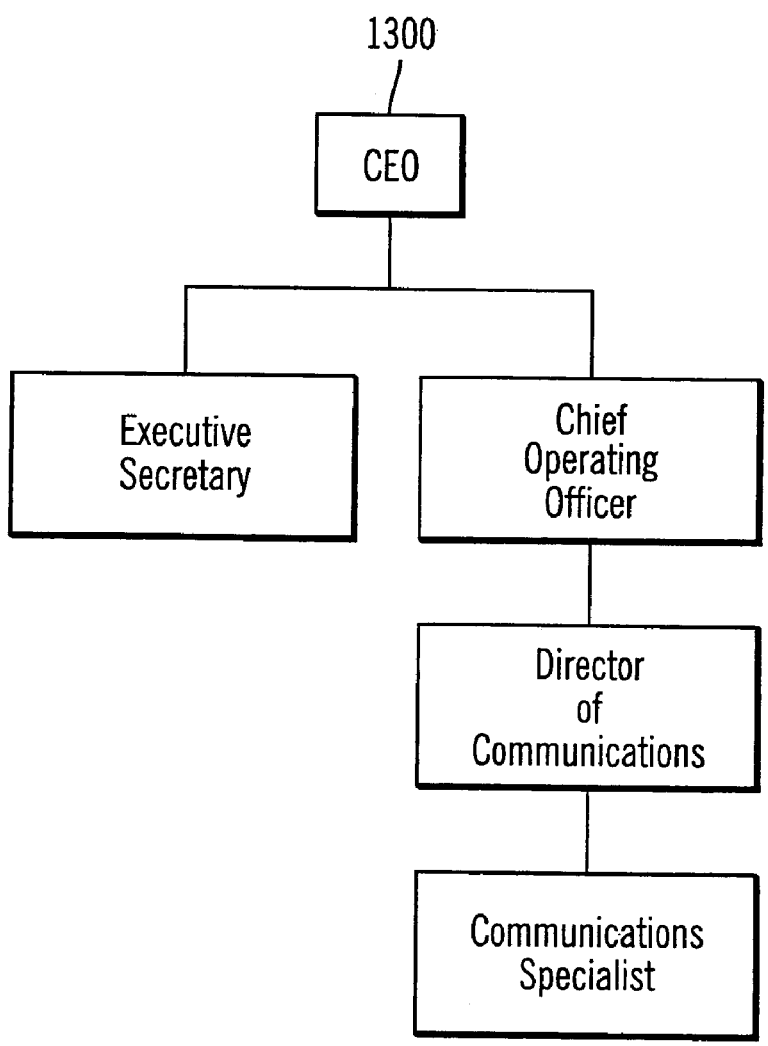
FIG. 13 illustrates an example of an unbalanced hierarchy in accordance with certain implementations of the invention.

FIG. 13 illustrates an example of an unbalanced hierarchy 1300 in accordance with certain implementations of the invention. An unbalanced hierarchy is one with levels that have a consistent parent-child relationship, but have an inconsistent semantic meaning for all members in a particular level. Also, the hierarchy branches have inconsistent depths. An unbalanced hierarchy can represent an organization chart. For example, the unbalanced hierarchy 1300 shows a CEO on the top level of the hierarchy and at least two of the people that might branch off below, including the chief operating officer and the executive secretary. The chief operating officer has many more people branching off also, but the executive secretary does not. There is a consistent parent-child relationship between the CEO and all of the people who report to the CEO. However the semantic meaning of the level directly below the CEO is inconsistent because of the different types of employees in that level.

Figure 14:
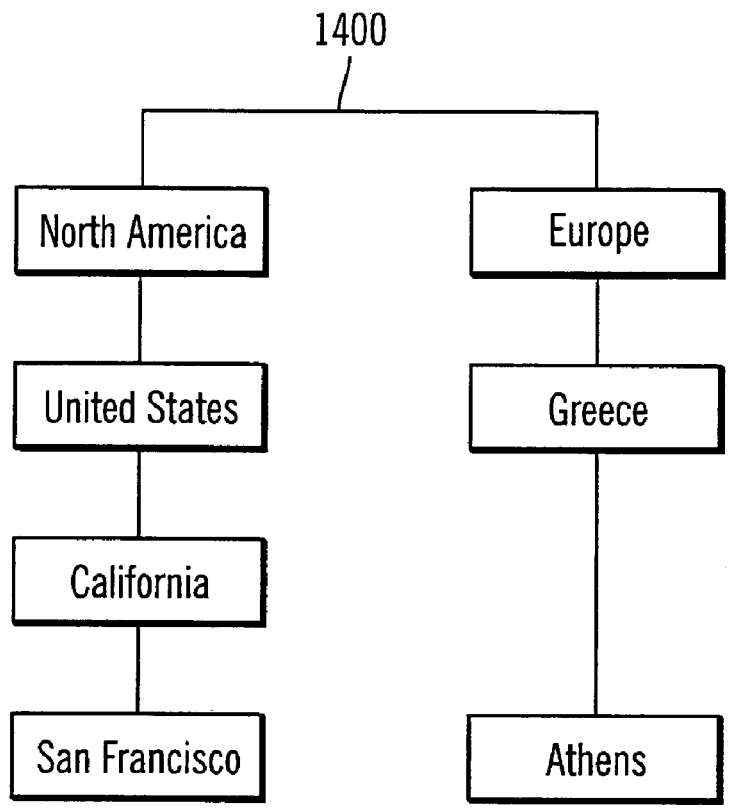
FIG. 14 illustrates a ragged hierarchy in accordance with certain implementations of the invention.

A ragged hierarchy is one in which each level has a consistent meaning, but the branches have inconsistent depths because at least one member attribute in a branch level is unpopulated. A ragged hierarchy can represent a geographic hierarchy in which the meaning of each level such as city or country is used consistently, but the depth of the hierarchy varies. FIG. 14 illustrates a ragged hierarchy 1400 in accordance with certain implementations of the invention. The ragged hierarchy 1400 shows a geographic hierarchy that has Continent, Country, Province/State, and City levels defined. One branch has North America as the Continent, United States as the Country, California as the Province/State, and San Francisco as the City. However the hierarchy 1400 becomes ragged when one member does not have an entry at all of the levels. For example, another branch has Europe as the Continent, Greece as the Country, and Athens as the City, but has no entry for the Province/State level because this level is not applicable to Greece. In this example, the Greece and United States branches descend to different depths, creating a ragged hierarchy 1400.

Figure 15:
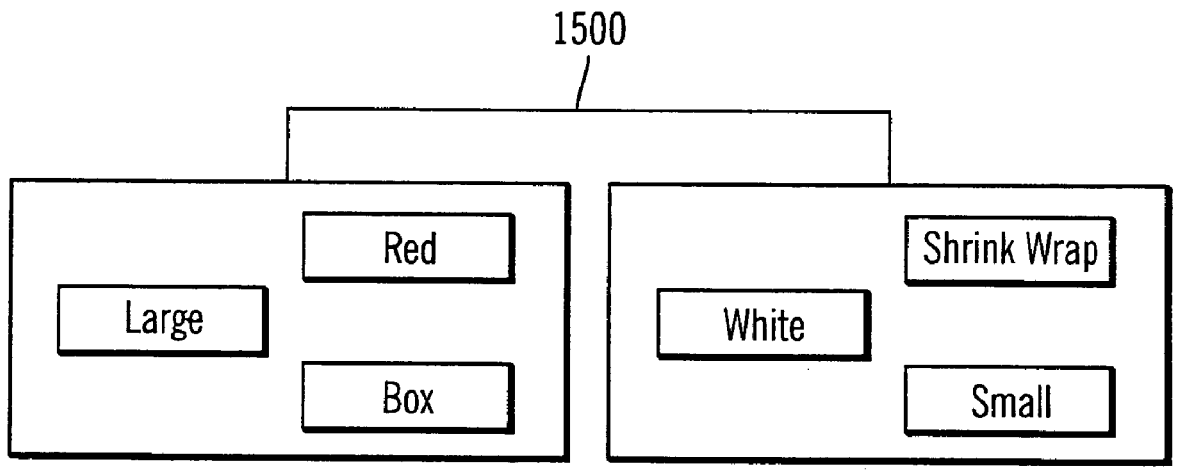
FIG. 15 illustrates a network hierarchy in accordance with certain implementations of the invention.

A network hierarchy is one in which the order of levels is not specified, but in which levels do have semantic meaning. FIG. 15 illustrates a network hierarchy 1500 that describes product attributes such as Color, Size, and PackageType in accordance with certain implementations of the invention. Because the attribute levels do not have an inherent parent-child relationship, the order of the levels may vary. A widget company might have member entries, such as white for Color, small for Size, and shrink wrap for PackageType. A second member entry might have red for Color, large for Size, and box for PackageType.

A hierarchy (balanced, unbalanced, ragged, or network) also specifies deployment mechanisms for the hierarchy. A deployment mechanism defines how to interpret the attributes of a hierarchy. The following two deployment mechanisms are supported: standard and recursive.

The standard deployment mechanism uses the level definitions of the hierarchy, where each attribute in the hierarchy defines one level. For example, a balanced hierarchy for a Time dimension would be organized by each defined level including Year, Quarter, and Month. Standard deployment can be used with all four hierarchy types. Table 5 shows how some of the balanced hierarchy attributes for a Time dimension are organized using a standard deployment in accordance with certain implementations of the invention.

TABLE 5

| Year | Quarter | Month |
|---|---|---|
| 2001 | 1$^{st}$ quarter | January |
| 2001 | 1$^{st}$ quarter | February |
| 2001 | 1$^{st}$ quarter | March |
| 2002 | 1$^{st}$ quarter | January |
| 2002 | 1$^{st}$ quarter | February |
| 2002 | 1$^{st}$ quarter | March |

The recursive deployment mechanism uses the inherent parent-child relationships between the attributes of the hierarchy. An unbalanced hierarchy using a recursive deployment is represented as parent-child attribute pairs. For example, Table 6 shows the attribute pairs for the unbalanced hierarchy describing an organization chart shown in FIG. 13 in accordance with certain implementations of the invention. The parent-child attribute pairs include: chief executive officer and executive secretary, chief executive officer and chief operating officer, chief operating officer and director of communications, director of communications and communications specialist. Recursive deployment may be used with an unbalanced hierarchy.

TABLE 6

| Parent Attribute | Child Attribute |
|---|---|
| Chief executive officer | Executive secretary |
| Chief executive officer | Chief operating officer |
| Chief operating officer | Director of communications |
| Director of communications | Communications specialist |

The metadata object specific properties of a hierarchy metadata object are described in the following Table 7 in accordance with certain implementations of the invention.

TABLE 7

| Property | Description |
|---|---|
| List of attributes | Ordered list of attributes from the top to the bottom of a hierarchy. In the case of a recursive hierarchy, two attributes are used as parent and child. |
| Set of attribute relationships | Set of all attribute relationships that link hierarchy attributes to other attributes. |
| Type [BALANCED, UNBALANCED, RAGGED, NETWORK] | Hierarchy type. |
| Deployment [STANDARD, RECURSIVE] | Hierarchy deployment. |

A measure metadata object defines a measurement entity and is used in facts metadata objects. Measures become meaningful within the context of a dimension. For example, a revenue of 300 is not meaningful by itself. When a revenue measure is put in the context of a dimension, such as Region, the measure becomes meaningful. For example, the revenue for Vermont is 300. Common examples of measure metadata objects are Revenue, Cost, and Profit.

The measure object makes explicit the existence of a measurement entity. Measures are defined by one or more SQL expression which can be as simple as a mapping to a table column, or can involve multiple columns and other measures or attributes. For each measure, a list of aggregations is defined for calculations in the context of a cube model, or cube. Each aggregation in the list specifies a aggregation function, such as SUM, COUNT, MIN, MAX, and a list of dimension in which the aggregation function is applied. An empty list of dimensions in an aggregation indicates that all remaining dimensions, non-explicitly referenced in the measure, are to be used. A measure will have more than one SQL expression template when the first aggregation function used requires more than one input, such as CORRELATION. A measure can have an empty list of aggregations when it has a single SQL expression template, and it only refers to other measures. In this case, the aggregation of the referenced measures take place. Measures and attributes share the same name space, meaning that the names, when fully qualified by a schema, have to be unique among measures and attributes. Common examples for measures are Sales, Costs, Profit, etc.

Measures are defined by the aggregation of SQL expressions. Table columns, attributes and measures are mapped to a template to build SQL expressions (i.e., a "SQL expression template"). The resulting SQL expressions are then used as input for the first aggregation function of the measure. If a measure has more than one aggregation, the aggregation functions are performed in the order they are listed, with each subsequent aggregation taking the result of the previous aggregation as input. If the SQL expression of the measure metadata object only references other measures, the aggregation function is optional. The aggregation function is optional because the referenced measures provide the aggregation.

A SQL expression of a measure is created by the combination of two properties: a SQL expression template and a list of columns, attributes, and measures. The SQL expression template uses a token notation where {$$n} is the token and n references a specific column, attribute, or measure from the list. The list of columns, attributes, and measures is ordered, and the position in the list of a column, attribute or measure corresponds to the token "n" value.

SQL expressions are used as input to the first aggregation. Each aggregation specifies a function that is applied to a corresponding list of dimensions. The aggregation function can be any aggregation function supported by the underlying database, including, for example, SUM, COUNT, MIN, MAX, and CORRELATION. In certain implementations, each dimension is aggregated once by the measure metadata object. If the list of dimensions is empty, the aggregation function is applied to all dimensions in the cube or cube model that are not specifically being used by another aggregation in the list.

An example of a simple measure is Revenue. The Revenue measure can be created for a cube model with three dimensions: Product, Market and Time. Revenue has a SQL expression template (template="{$$1}"), which represents a simple mapping to the column specified in the one item list of columns, attributes, and measures, where list="Column Fact.Rev". The aggregation list is (SUM, <NULL>) where SUM is the aggregation function, and <NULL> is an empty list of dimensions. The SQL expression is used as input for the SUM aggregation function, resulting in the SQL: SUM(Fact.Rev).

A more complicated measure, Profit, might have a SQL expression template (template="{$$1}-{$$2}"), where the list of attributes, columns, and measures is list="Measure Revenue, Column Fact.Cost". Replacing the tokens with the correct references, the SQL expression becomes: "Revenue—Fact.Cost". Expanding the revenue measure reference to its column reference, the SQL expression becomes: "Fact.Rev—Fact.Cost". The aggregation list of the Profit measure is: (SUM, <NULL>). Using the profit SQL expression as input for the SUM aggregation function, the SQL for the Profit measure is: SUM(Fact.Rev—Fact.Cost).

If the measure has an aggregation function, such as CORRELATION, that requires two or more parameters, the measure will have two or more SQL expressions.

Measures also have a data type that is based on SQL data types. The OLAP multidimensional metadata system 100 automatically determines the data type of the measure. Additionally, measures and attributes share the same name space. Therefore, each name, when fully qualified by a schema, is unique among measures and attributes. The metadata object specific properties of a measure metadata object are described in the following Table 8 in accordance with certain implementations of the invention.

TABLE 8

| Property | Description |
| --- | --- |
| List of SQL expression templates | List of SQL expression templates used as input for the first aggregation function of the measure. The templates reference columns, attributes, and measures by using a '{$$n}' notation. In the template, n is an ordinal number corresponding to the list of columns, attributes, and measures. |
| List of columns, attributes, and measures | For each SQL expression template, an ordered list of columns, attributes, and measures is supplied. These columns, attributes, and measures are applied as specified in the SQL expression template. |
| List of aggregations (function, list of dimensions) | List of aggregations that specify how a measure is calculated. Each aggregation is composed by a SQL aggregation function and an optional list of dimensions to apply the function to. |
| Data type (schema, name, length, scale) | Determines the data type of the attribute. Based on SQL data types, and composed by data type schema, name, length, and scale. |

An attribute represents the basic abstraction of the database table columns. An attribute is defined by a SQL expression that can be a simple mapping to a table column, can involve multiple columns and other attributes, and can involve all functionalities of the underlying database, such as user-defined functions. In certain implementations, when other attributes are used in the defining SQL expression, the other attributes cannot form attribute reference loops. For example, if Attribute A references Attribute B, then Attribute B cannot reference Attribute A.

A SQL expression definition of an attribute is created by the combination of two properties: a SQL expression template and a list of columns and attributes. The SQL expression template uses a token notation where {$$n} is the token with n referencing a specific column or attribute from the list. The list of columns and attributes is ordered, and position in the list of a column, attribute or measure corresponds to the token "n" value.

For example, the SQL expression template (template="{$$1} ||' '|| {$$2}") can be used with a corresponding list such as list="Column CUSTOMER.FIRSTANME, Attribute LastName" to concatenate customers' first and last names with a space between them. Replacing the SQL expression template tokens with the correct list references, the SQL expression is: "Customer.FirstName ||' '|| LastName". The attribute reference is further expanded to a column reference to form the SQL expression: "Customer.FirstName ||' '|| Customer.LastName".

An attribute can serve multiple roles in the design of a data warehouse or data mart. The roles that an attribute can serve are: level, description, dimensional attribute, dimensional key, or key.

A level attributed is used in hierarchies. Examples of common level attributes are: Year and Quarter, State and City. A description attribute is used in a description type of attribute relationship and associates additional descriptive information to another attribute. For example, a table called Product might have an attribute with a product code and a description attribute with a textual description. The dimensional attribute is used in a dimensional type of attribute relationship and defines specific characteristics and qualities of another attribute. Examples of common dimensional attributes are: Population, Size, and Weight. The dimensional key attribute is used to join facts and dimension metadata objects and represents the primary key in a dimension table, or a foreign key from a dimension table to be used in a fact table. The key attribute is used to join tables within a facts or dimension metadata object. Key attributes are often used in a snowflake schema.

Attributes and measures share the same name space. Therefore, each name, when fully qualified by a schema, is unique among attributes and measures. Attribute and measure metadata objects are abstractions of a relational database column. However, they are defined by an SQL expression that can include multiple columns. Measures are more specialized than attributes-they include aggregation functions (column functions) that are used to calculate higher-level summaries from lower-level data.

Table 9 describes the metadata object specific properties that define an attribute metadata object in accordance with certain implementations of the invention.

TABLE 9

| Property | Description |
| --- | --- |
| SQL expression template | SQL expression that defines the attribute. The SQL expression template references columns and attributes by using a{$$n} notation, where n is an ordinal number corresponding to the list of columns and attributes. |
| List of columns and attributes for SQL expression | Ordered list of all columns and attributes composing the attribute. These columns and attributes are applied as specified in the SQL expression template. |
| Data type (schema, name, length, scale) | Determines the data type of the attribute. Based on SQL data types, and composed by data type schema, name, length, and scale. |
| Role [LEVEL, DESCRIPTION, DIMATTR, DIMKEY, KEY] | Roles that the attribute serves. |

An attribute relationship describes relationships of attributes in general. The relationships are described by a left and a right attribute, a type, a cardinality, and whether or not the relationships determine a functional dependency. The type describes what the role of the right attribute is with respect to the left attribute. For example, a ProductName right attribute describes a ProductCode left attribute. The relationship type between ProductName and ProductCode is DESCRIPTION. The cardinality describes how the instances of the left and right attributes are related and it is interpreted based on cardinality. In a 1:1 cardinality, there is at most one left attribute instance for each right attribute instance, and at most one right attribute instance for each left attribute instance. In a 1:N cardinality, there is at most one left attribute instance for each right attribute instance, and any number of right attribute instances for each left attribute instance. In a N:1 cardinality, there is any number of left attribute instances for each right attribute instance, and at most one right attribute instance for each left attribute instance. In a N:N cardinality, there is any number of left attribute instances for each right attribute instance, and any number of right attribute instances for each left attribute instance.

The functional dependency property tells whether the attribute relationship can also be used as a functional dependency. A functional dependency defines a functional relationship between two attributes. For example, a functional dependency can be defined between attributes such as City and Mayor or Product and Color. The functional dependency tells that every City value determines a Mayor value or that every Product value determines a Color value. This means that the cardinality described in the relationship is set by the designer, which is useful for query optimizations.

One use of an attribute relationship is within the context of a hierarchy in a dimension. Attributes that are directly related to the hierarchy attributes can be queried as part of the hierarchy. This allows each level of the hierarchy to define attributes that complement the information of a given level. For example, a hierarchy can have a City attribute. The City attribute can be related to a City_Population attribute with an attribute relationship. With the attribute relationship information, City_Population information can be included in a query that includes City.

The metadata object specific properties defining an attribute relationship metadata object are described in the following Table 10 in accordance with certain implementations of the invention.

TABLE 10

| Property | Description |
| --- | --- |
| Left attribute | Left attribute used in the relationship. |
| Right attribute | Right attribute used in the relationship. |
| Type [DESCRIPTION, ASSOCIATED] | Type of relationship described by the attribute relationships. The type is used to determine what role an attribute plays. |
| Cardinality [1:1, 1:N, N:1, N:N] | Cardinality expected in the join. |
| Functional dependency [YES, NO] | Determines if the attribute relationship is also a functional dependency. |

The join metadata object joins relational tables that are referenced by two metadata objects. Two metadata objects can be joined on one or more pairs of attribute metadata objects mapping to relational table columns. In a facts to dimension join, a join metadata object joins attributes from the facts metadata object and attributes from the dimension metadata object. In a composite join, the set of attribute pairs is from the same set of tables. For example, to join relational Table1 with a compound key of FirstName and LastName, with a relational Table2 that has a compound key of FName and Lname, one relational join with two join predicates is used; one join predicate for Table1.FirstName and Table2.FName, a second join predicate for Table1.LastName and Table2.LName. The information about this composite join is stored in one join metadata object.

The join metadata object is defined by a list of the left attribute, right attribute, and join operator. Also, the join type and expected cardinality are specified. Joins can be used between two facts, two dimensions, or a fact and a dimension. Join metadata objects are referred to by cube model, facts, and dimension objects.

The metadata object specific properties that define a join metadata object are described in the following Table 11 in accordance with certain implementations of the invention.

TABLE 11

| Property | Description |
| --- | --- |
| List of (left attribute, right attribute, operator) | Left attribute: The attribute on the left side of the join. Right attribute: The attribute on the right side of the join. Operator: Operator expected in the join [=, <, >, < >, >=, <=]. |
| Type [INNER, FULL OUTER, LEFT OUTER, RIGHT OUTER] | Type of join expected. |
| Cardinality [1:1, 1:N, N:1, N:N] | Cardinality expected in the join. |

A cube is a very precise definition of an OLAP cube that can be delivered using a single SQL statement. Each cube is derived from a single cube model. The cube facts and list of cube dimensions are subsets of those in the referenced cube model. A cube view name is also defined which represents the cube in the database. Cubes are appropriate for tools and applications that do not use multiple hierarchies because cube dimensions allow one cube hierarchy per cube dimension.

The purpose of a cube is to define a standard relational view of an OLAP structure. In addition to the relational view, a cube provides an extended describe (e.g., XML document) that describes the roles of its columns in multidimensional terms. In the process of defining a cube, the designer selects a subset of the possible elements, choosing a single hierarchy for each dimension. This ensures that the cube unambiguously defines a single relational result set. The simplicity of a cube makes the cube useful to less sophisticated OLAP applications, such as portable devices powered by World Wide Web ("Web") services.

The metadata object specific properties of a cube metadata object are described in the following Table 12 in accordance with certain implementations of the invention.

TABLE 12

| Property | Description |
| --- | --- |
| Cube model | Cube model from which the cube is derived. |
| Cube facts | Cube facts used in the cube. The cube facts is derived from the facts metadata object in the cube model. |
| List of cube dimensions | Ordered list of cube dimensions used in the cube. The cube dimension is derived from the dimensions in the cube model. One cube hierarchy is associated with each cube dimension. |
| Cube view | View in the database that represents the cube. |
| Extended Describe | XML document describing roles of columns and their relationships in terms of a multidimensional model |

A cube facts metadata object has a subset of measures in an ordered list from a specific facts metadata object. A cube facts metadata object gives a cube the flexibility to scope facts of a cube model. The structural information, such as the joins and attributes, is referenced from the parent facts metadata object. The metadata object specific properties that define a cube facts metadata object are described in the following Table 13 in accordance with certain implementations of the invention.

TABLE 13

| Property | Description |
| --- | --- |
| Facts | Facts from which the cube facts is derived. |
| List of measures | Ordered list of measures used in a cube. All measures are part of the facts from which the cube facts is derived. |

A cube dimension metadata object is used to scope a dimension for use in a cube. The cube dimension metadata object references the dimension from which it is derived and the relevant cube hierarchy for the given cube. In certain implementations, one cube hierarchy can be applied to a cube dimension. The joins and attributes that apply to the cube dimension are referenced from the dimension definition. The metadata object specific properties that define a cube dimension metadata object are described in the following Table 14 in accordance with certain implementations of the invention.

TABLE 14

| Property | Description |
| --- | --- |
| Dimension | Dimension from which the cube dimension is derived. |
| Cube hierarchy | Cube hierarchy that applies to the cube dimension |

A cube hierarchy metadata object is a scoped version of a hierarchy and is used in a cube. A cube hierarchy references the hierarchy from which it is derived and can have a subset of the attributes from the parent hierarchy. Additionally, a cube hierarchy metadata object references the attribute relationships that apply on the cube. In certain implementations, one cube hierarchy can be defined for a cube dimension of a cube. A cube hierarchy metadata object has the same hierarchy types and deployment mechanisms as the hierarchy from which the cube hierarchy metadata object is derived.

A cube hierarchy is very similar to a hierarchy; however, a cube dimension refers to a single cube hierarchy. This allows a single SELECT statement to calculate the cells of a cube.

The metadata object specific properties that define a cube hierarchy metadata object are described in the following Table 15 in accordance with certain implementations of the invention.

TABLE 15

| Property | Description |
| --- | --- |
| Hierarchy | Hierarchy from which the cube hierarchy is derived. |
| Lists of attributes | Ordered list of all attributes from the top to the bottom of the cube hierarchy. The order of the attributes should be the same as in the parent hierarchy. |
| Set of attribute relationships | Set of all attribute relationships that link cube hierarchy attributes to other attributes. |

Figure 16:
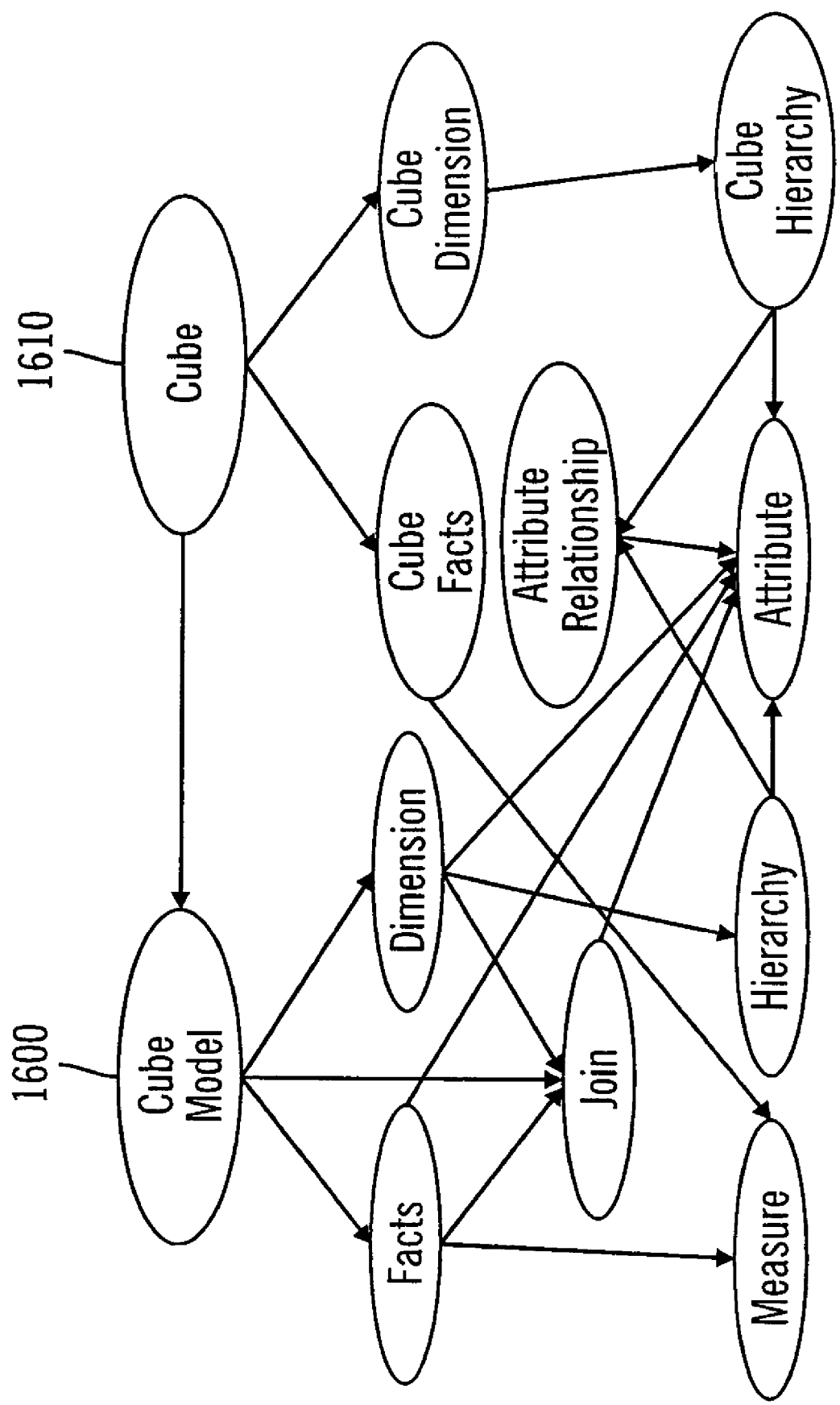
FIG. 16 illustrates some relationships among some metadata objects in accordance with certain implementations of the invention.

FIG. 16 illustrates some relationships among some metadata objects in accordance with certain implementations of the invention. The arrows indicate that a metadata object references another metadata object. For example, a cube metadata object 1610 references a cube model metadata object 1600. A more detailed relationship description of the metadata objects is illustrated in Table 16 in accordance with certain implementations of the invention.

TABLE 16

| Metadata object 1 | References | Metadata Metadata object 2 |
| --- | --- | --- |
| Cube Model | zero or one | Facts |
| Cube Model | zero or more | Dimension/Join |
| Cube | one | Cube model |
| Cube | one | Cube Facts |
| Cube | one or more | Cube Dimension |
| Facts | one or more | Measure |
| Facts | zero or more | Attribute |
| Facts | zero or more | Join |
| Dimension | one or more | Attribute |
| Dimension | zero or more | Join |
| Dimension | zero or more | Hierarchy |
| Cube Facts | one | Facts |
| Cube Facts | one or more | Measure |
| Cube Dimension | one | Dimension |
| Cube Dimension | one or more | Attribute |
| Cube Dimension | one | Cube Hierarchy |
| Hierarchy | one or more | Attribute |
| Hierarchy | zero or more | Attribute Relationship |
| Cube Hierarchy | one | Hierarchy |
| Cube Hierarchy | one or more | Attribute |
| Cube Hierarchy | zero or more | Attribute Relationship |
| Measure | zero or more | Measure |
| Measure | zero or more | Attribute |
| Measure | zero or more | Dimension |
| Attribute | zero or more | Attribute |
| Attribute Relationship | two | Attribute |
| Join | multiple of two (minimum of two) | Attribute |

In accordance with certain implementation, there is a metadata object naming convention and rules for naming. Naming conventions and rules other than those described herein may be used without departing from the scope of the invention. There are two different naming conventions to name objects: ordinary and delimited. For the metadata objects, due to its flexibility, the delimited convention is used when naming objects and referring to database tables and columns. The delimited convention allows mixed case names, spaces, and special characters, such as national language characters. The complete set of characters is determined by the codepage of the database in which the objects reside.

Besides the naming conventions, some rules apply to the different identifiers in the objects in certain implementations. For example, a schema has a length of 1-30 bytes and schema names do not begin with 'SYS'; a name has a length of 1-128 bytes; a business name has a length of 1-128 bytes; comments have a length of 0-254 bytes; a table schema (used in referencing columns) has a length of 1-128 bytes; a table name (used in referencing columns) has a length of 1-128 bytes; and a column name (used in referencing columns) has a length of 1-128 bytes.

In addition to the relationships that are enforced, additional rules are described for each metadata object. That is, every metadata object has its own set of rules, and an instance of a metadata object is valid if the metadata object follows all of the metadata object rules for that metadata object. The rules are separated in three categories: Base Rules, Cube Model Completeness Rules, and Optimization Rules. The following discussion of specific rules provides a set of rules for certain implementations of the invention. In other implementations, the set of rules for one or more metadata objects may be modified without departing from the scope of the invention.

The base rules for a cube model metadata object are: (1) the cube model metadata object refers to zero or one facts metadata object; (2) the cube model metadata object refers to zero or more dimension(s); (3) dimension-join pairs have both a dimension and a join; (4) a join associated with a dimension is valid if all attributes of one side of a join are found in the facts attribute list and all other side attributes are found in the attribute list of the dimension; and (5) for each measure referenced in the facts of the cube model facts, all the explicit dimension references in the aggregations of the measure are referenced by the cube model. When the cube model references at least one dimension, an aggregation with an empty list of dimensions matches to at least one dimension from the cube model that was not previously referenced.

The base rules for a cube metadata object are: (1) the cube metadata object refers to one cube facts; (2) the cube metadata object refers to at least one cube dimension; (3) cube facts is derived from the facts used in the cube model; and, (4) cube dimensions are derived from the dimensions used in the cube model.

The base rules for a facts metadata object are: (1) a facts metadata object refers to at least one measure; (2) all attributes and measures referenced by a facts are joinable; (3) in a facts metadata object context, a single join can be defined between two given tables; (4) there are no join loops in a facts metadata object; and, (5) all joins referenced by a facts metadata object refer to fact metadata object attributes.

The base rules for a dimension metadata object are: (1) the dimension metadata object refers to at least one attribute; (2) attributes referenced by a dimension are joinable; (3) there are no join loops; (4) in a dimension context, a single join is defined between any two given tables; (5) hierarchies referenced by a dimension refer to the attributes of the dimension; (6) attribute relationships that are referenced by hierarchies of a dimension refer to the attributes of the dimension; and (7) joins referenced by a dimension refer to the attributes of the dimension.

The base rules for a cube facts metadata object are: (1) the cube facts metadata object refers to at least one facts; (2) the cube facts metadata object refers to at least one measure; and, (3) measures referenced by a cube facts metadata object are part of the facts metadata object.

The base rules for a cube dimension metadata object are as follows: (1) the cube dimension metadata object refers to one dimension; (2) the cube dimension metadata object refers to a cube hierarchy; and, (3) the cube hierarchy referenced by the cube dimension metadata object is derived from a hierarchy that is referenced dimension by the dimension of the cube dimension metadata object.

The base rules for a hierarchy metadata object are: (1) the hierarchy metadata object refers to at least one attribute; (2) two attributes are required for a recursive deployment; (3) every attribute relationship within a hierarchy has a left attribute as part of the hierarchy; (4) every attribute relationship within the hierarchy has a cardinality of 1:1 or N:1; and, (5) certain combinations of hierarchy types and hierarchy deployments are allowed as indicated in Table 17 in accordance with certain implementations of the invention:

TABLE 17

| Type/Deployment | Standard | Recursive |
| --- | --- | --- |
| Balanced | X | |
| Ragged | X | |
| Unbalanced | X | X |
| Network | X | |

The base rules for a cube hierarchy metadata object are: (1) the cube hierarchy metadata object refers to one hierarchy; (2) the cube hierarchy metadata object refers to at least one attribute; (3) attributes referenced by the cube hierarchy metadata object are part of the hierarchy; (4) the order of the attributes in the cube hierarchy metadata object are the same as in the hierarchy (with the exception of hierarchies defined as a network); (5) every attribute relationship within a hierarchy has a left attribute as part of the hierarchy; and, (6) attribute relationships referenced in the cube hierarchy metadata object are also referenced in the hierarchy that defines the cube hierarchy.

The base rules for a measure metadata object are: (1) a measure metadata object can have, as parameters for each SQL expression template, attributes, columns, measures, or none of them; (2) attributes and measures, used as SQL template parameters, can not generate a dependency loop among attributes and/or measures; (3) every SQL template defined in the measure metadata object is not an empty string; (4) the SQL template does not use aggregation functions; (5) aggregation is not required if at least one measure and only measures are referenced; (6) the number of SQL templates matches the number of parameters of the first aggregation function, if an aggregation is present; (7) a measure metadata object with multiple SQL templates defines at least one step in an aggregation script; (8) if measure metadata object A refers to measure metadata object B, which defines multiple SQL templates, then measure metadata object A does not have an aggregation script; this rule applies for all levels in a measure reference tree; (9) a multi-parameter aggregation function is used as the first aggregation; (10) if a measure metadata object defines one or more aggregations, one aggregation may have an empty list of dimensions; (11) within a measure metadata object, a dimension may not be referenced more than once either within an aggregation or across aggregations; (12) within a SQL expression template, token indicators (i.e., {$$#}) begin numbering with 1 and are consecutive with no numbering gaps; and, (13) within a SQL expression, every column, attribute and measure is referenced at least once.

The base rules for an attribute metadata object are: (1) an attribute metadata object can have, as parameters for the SQL template, attributes, columns, or none of them; (2) the attributes, used as parameters for SQL template, can not generate a dependency loop among attributes; (3) the SQL template can not be an empty string or blank string; (4) no aggregation function is allowed to be part of the SQL template; (5) within a SQL expression template, token indicators (i.e., {$$#}) begin numbering with 1 and are consecutive with no numbering gaps; and, (6) within a SQL expression, every column, attribute and measure is referenced at least once.

The base rules for an attribute relationship metadata object are: (1) the attribute relationship metadata object refers to two attributes; and, (2) the attribute relationship metadata object cannot be defined as having a cardinality=N:N and a functional dependency-YES.

The base rules for the join metadata object are: (1) the join metadata object refers to at least one triplet of left attribute, right attribute, and operator; (2) all left attributes in the join metadata object resolve into one or more columns of a single table; (3) all right attributes in the join metadata object resolve into one or more columns of a single table; and, (4) each triplet of the join metadata object defines a valid operation; the datatypes of left and right attributes, as well as the operation defined for them, are compatible.

The cube model completeness rules extend the base rules in order to ensure that a cube model has the required links to other metadata objects to allow effective warehouse SQL queries to be formed. The cube model completeness rules for a cube model metadata object are: (1) a cube model metadata object refers to one facts; (2) a cube model metadata object refers to one or more dimensions.

The optimization rules extend the cube model completeness rules in order to ensure that optimization of warehouse SQL queries can be performed.

The optimization rules for a cube model metadata object is: (1) the join used in the facts to dimension has a cardinality of 1:1 or N:1 and joins a facts table to a primary table of a dimension.

The optimization rules for a dimension metadata object is: (1) considering the join network formed by the joins of the dimension, there is at least one table, primary table, in which all joins radiating from this table have cardinality of N: 1 or 1:1.

The optimization rules for a join metadata object are: (1) there is a constraint defined on the columns that participate in the join; if the join is a self-join, i.e. the same set of columns is used in both sides of the equality, a primary key is defined matching the set of columns; in all other cases, when the set of columns of one side are different from the other side of the join, a primary key matches the columns of one side of the join, and a foreign key matches the other set of columns as well as references the primary key; (2) the join cardinality is 1:1, N:1 or 1:N; if the join is a self-join, the cardinality is 1:1; in all other join cases, the cardinality is 1 on the side in which a primary key is defined and N on the side in which a foreign key is defined; if the foreign key side has also a primary key defined on it, a 1 is used as cardinality; (3) all attributes used in the join resolve to non-nullable SQL expressions; and, (4) the join type is INNER JOIN.

A.3 Metadata Object Example

Figure 17:
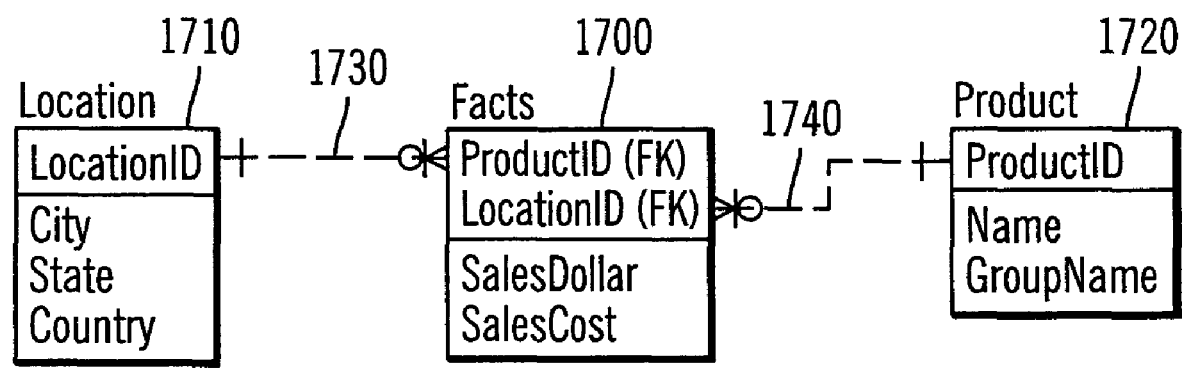
FIG. 17 illustrates a star schema composed of two dimension tables and a fact table in accordance with certain implementations of the invention.

FIG. 17 illustrates a star schema composed of two dimension tables 1710, 1720 and a fact table 1700 in accordance with certain implementations of the invention. Two lines 1730, 1740 represent joins between the fact table 1700 and the dimension tables 1710, 1720. In certain implementations, a database designer, using a modeling tool or user interface 150, may create metadata object instances for metadata objects 130. Most metadata objects 130 defined during the generation of the multidimensional metadata can be reused for a new model if the metadata objects overlap with the new model. FIGS. 18A-18E illustrate a possible set of metadata object instances, and, for simplicity, some properties of metadata objects, that may be generated for the star schema of FIG. 17 in accordance with certain implementations of the invention. In particular, some of the omitted properties in FIGS. 18A-18E are common properties. For example, FIGS. 18A-18E illustrate a cube model metadata object instance 1800, a cube metadata object instance 1802, a facts metadata object instance 1804, a cube facts metadata object instance 1806, measure metadata object instances 1808, 1810, dimension metadata object instances 1812, 1814, cube dimension metadata object instances 1816, 1818, hierarchy metadata object instances 1820, 1822, 1824, cube hierarchy metadata object instances 1826, 1828, join metadata object instances 1830, 1832, and attribute metadata object instances 1834-1848.

A user may use the user interface 150 to create metadata objects. After creating an empty cube model metadata object, a facts metadata object and dimension metadata objects are created and joined to the cube model metadata object by creating appropriate join metadata objects.

The properties of the metadata objects discussed herein may be modified without departing from the scope of the invention.

B. Improving the Performance of Relational Database Management System (RDBMS) Processing Queries Issued by an On-line Analytical Processing (OLAP) System Implementations of the invention automatically recommend summary tables and indexes to be created. In certain implementations, the invention improves the performance of OLAP queries issued by OLAP systems against relational databases. Furthermore, traditional non-OLAP systems that issue aggregation style queries to the RDBMS 110 against a traditional normalized schema also see performance improvement with the techniques of the invention. In particular, implementations of the invention exploit multidimensional metadata, database statistics, sampling, query type, diskspace limitations, time limitations, and multidimensional regions to be optimized to make recommendations about which summary tables and indexes should be created.

B.1 Overview of Optimization Techniques

This section provides an overview to concepts used in this invention. In particular, this section describes the metadata objects and the type of SQL queries for which optimization is performed.

In certain implementations, the advisor component 122 recommends summary tables based on the cube model metadata. As discussed in Section A above, a cube model represents a particular grouping and configuration of relational tables. The purpose of a cube model is to describe multidimensional structures to a given application or tool. A cube model groups dimensions and facts, and offers the flexibility of multiple hierarchies for dimensions.

The front end query systems and applications can generate complex SQL queries against the relational tables based on the structural information in the cube model. Some front end systems and applications generate SQL queries based on their own metadata. In that case, a bridge can be used to import the cube model and populate the metadata repository managed by the front end systems and applications. Furthermore, a designer can construct the cube model metadata based on existing metadata or queries from the front end systems and applications. Since the summary tables recommended by the advisor component 122 are based on the structural information of the cube model, the summary tables also match the SQL queries generated by the front end systems. As a result, the relational database engine can improve query performance by using the full or partial results pre-aggregated in the summary table.

Also as discussed in Section A above, a cube metadata object (i.e., a "cube") consists of a subset of the dimensions and facts in a cube model. Cubes can be used to describe multidimensional regions of the cube model to be optimized. In addition, some simple and pervasive applications (e.g. Web based analytical applications) generate SQL queries based on the structure information in the cube object. The performance of these queries can also be improved by the summary tables recommended based on the cube model metadata.

Cube models are a conceptual object based on top of a set of database tables. For some SQL queries, the RDBMS 110 can simply read a subset of data from database tables. Other SQL queries require the RDBMS 110 to dynamically calculate results. For example, suppose there is a cube model with dimensions for time and product. The base tables may contain daily sales figures by product, but a typical query might aggregate the sales by month. While this query is written against the base table, the query matches the logical structure of the cube model. For example, a hierarchy in the time dimension may contain day, month, and quarter attributes, which defines the aggregation for the daily sales data. For large tables, this process of aggregating data can be time consuming. Therefore, RDBMS 110 provides summary tables, in which aggregations of data can be calculated and stored into physical tables. Subsequent queries that refer to these aggregations will be automatically rerouted to the summary tables, thereby improving performance significantly.

Queries are optimized by exploiting the summary tables. In certain implementations, the process starts with, for example, a database administrator (DBA) defining a cube model using either a user interface 150 or by importing metadata from other products via bridges. In certain implementations, a bridge is a piece of software that connects two products. In the OLAP multidimensional metadata system 100 context, bridges map metadata between the metadata objects 130 and other products that have multidimensional metadata. By using a bridge that maps metadata from an existing OLAP metadata repository to the metadata objects 130, the metadata catalog of the OLAP multidimensional metadata system 100 may be filled without requiring users to manually enter the information. In either case, the OLAP multidimensional metadata system 100 understands the relationship between the aggregations and base data. In particular, applications will generate SQL that matches the structural information in the cube model object. For example, a generated SQL that might specific that aggregations be by month maps to the month level within a time dimension hierarchy. Knowing the structure of the summary tables, applications may also see performance improvements by issuing a SQL query directly against the summary table.

If the DBA knows how the data in the star schema will be accessed, the DBA may be able to provide optimization hints. For example, for a spreadsheet based application that generates OLAP-style queries, the user may start at the top of the cube (e.g., total revenue for the year) and drill down into quarterly and monthly aggregations. Since the users are less likely to drill down deeply into the data, the DBA may recommend that the optimization be concentrated at the top of the cube model.

Once the summary tables and indexes to be built are identified, the OLAP multidimensional metadata system 100 generates a set of SQL statements to build summary tables and indexes to improve query performance. In particular, the advisor component 122 provides a SQL script that creates one or more summary tables, creates indexes on the summary tables, reorganizes the tables, etc. In certain implementations, the DBA executes the SQL that was provided by the OLAP multidimensional metadata system 100 to actually create the summary tables and indexes.

A cube model is defined on top of a relational database. In certain implementations, the database may be a data warehouse or datamart, but it may be another type of database, such as a transaction database. Detailed data is contained in tables and aggregations of this detailed data can be calculated. One sample cube may be generated with sales data for a line of products. The data that exists shows the sales for each product, customer and store by day. For example, John Doe spent $600 on a particular digital camera in the TechMart store in San Jose on Jan. 1, 2002. The dimensions are time, store, customer and product. Hierarchies define how data is aggregated within the dimensions.

Figure 19:
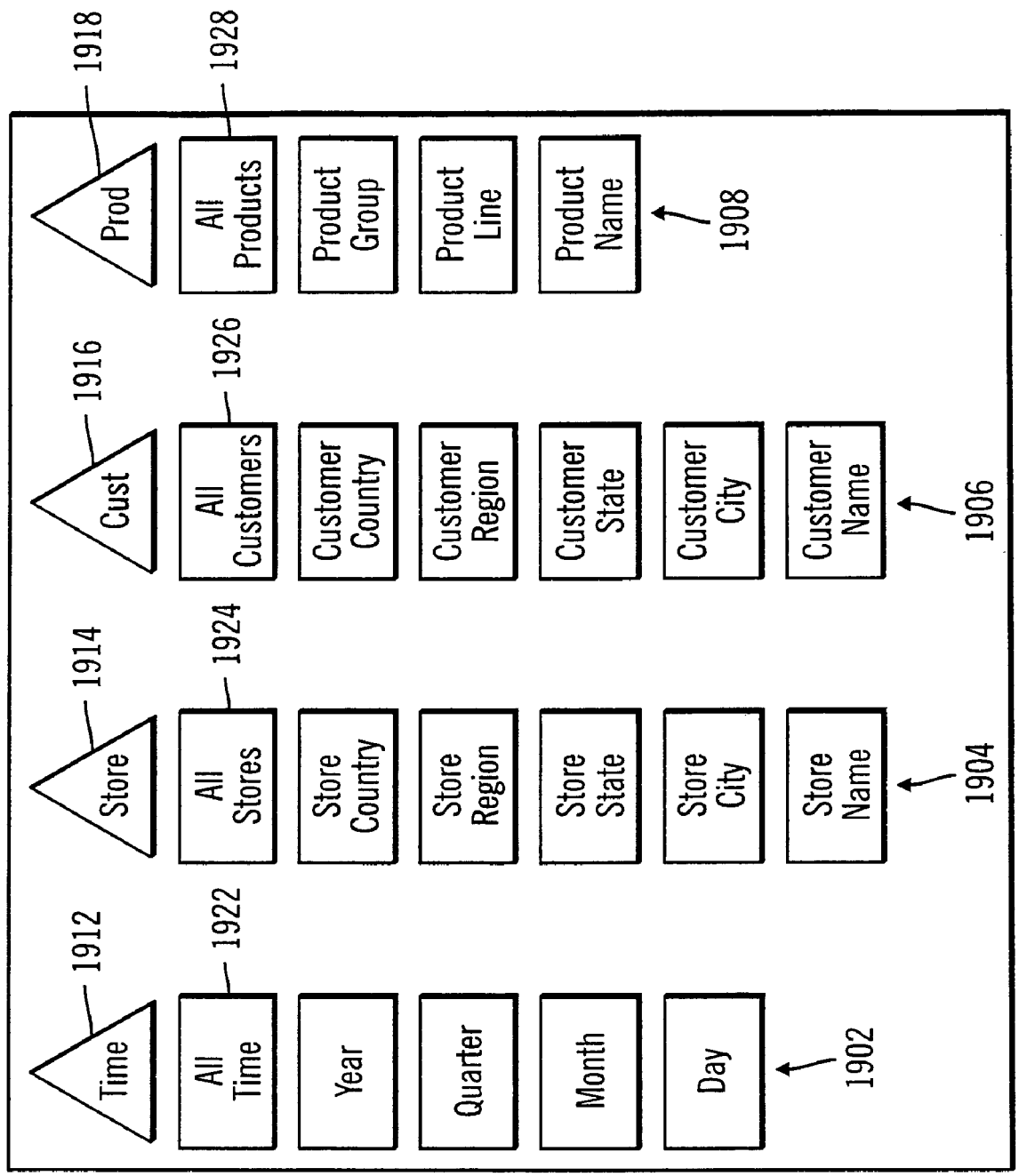
FIG. 19 illustrates a representation of a cube model in accordance with certain implementations of the invention.

Although multidimensional data is difficult to represent in a 2-dimensional diagram, FIG. 19 attempts to represent a cube model in accordance with certain implementations of the invention. In FIG. 19, each column of boxes 1902, 1904, 1906, 1908 represents a hierarchy in a dimension. Each triangle 1912, 1914, 1916, 1918 contains the dimension name. The top box 1922, 1924, 1926, 1928 in each column represents all the data for that dimension. The top box 1922, 1924, 1926, 1928 appears different than the boxes below it to indicate there is not a corresponding level attribute for this box 1922, 1924, 1926, 1928. The remaining boxes in each column 1902, 1904, 1906, 1908 represent level attributes. For example, the time dimension has year, quarter, month and day level attributes.

The order of the boxes reflects how the aggregations are done. For example, in the time hierarchy, daily data is aggregated to obtain monthly data, monthly data aggregates to quarter, quarter to year and year to all time.

The data that actually exists is for the bottom box in each hierarchy—data by customer and store and product and day. All other data is calculated.

SQL queries can refer to data from any combination of boxes (i.e., levels). For example, a query could obtain monthly sales data for a particular product line sold in a particular state and purchased by customers from a particular region.

Some simple queries will be described to show how they map to the cube model diagram and to show how a summary table could improve performance. Query (1) shows the most detailed sales data available for a particular customer. Query (1) goes against the grain of the warehouse, the lowest level of each hierarchy. The resulting data from executing query (1) is illustrated in Table 18 in accordance with certain implementations of the invention.

select Year, Month, Day, StoreName, ProductName, Revenue (1)
from
   Sales, Time, Store, Customer, Product
where
   Sales.TimeId=Time.TimeId
and Sales.StoreId=Store.StoreId
and Sales.CustomerId=Customer.CustomerId
and Sales.ProductId=Product.ProductId
and Customer.CustomerName='John Galt';

TABLE 18

| Year | Month | Day | Store Name | Product Name | Revenue |
|---|---|---|---|---|---|
| 2000 | 1 | 1 | TechMart | TurboPhone 2001 | 3500 |
| 2000 | 1 | 5 | Cowabunga Mart | Turbo Quadrophonic 5000 | 9000 |
| 2000 | 1 | 31 | Tech Mart | Blaster Speakers 45C | 2200 |
| 2000 | 1 | 31 | Slug Mart | Blaster Speakers 45C | 4000 |
| 2000 | 5 | 17 | Snow Mart | Blaster Speakers 45C | 8000 |
| 2001 | 1 | 1 | Tech Mart | TurboPhone 2001 | 1600 |
| 2001 | 12 | 1 | Cowabunga Mart | Blaster Speakers 45C | 8000 |

Query (2) shows the sales of electronics products for each state in the western United States, and the resulting data from executing query (2) is listed in Table 19 in accordance with certain implementations of the invention. Query (2) subsets the data using a where clause to restrict the data to electronics products in the western USA. The data is grouped by store state and product line since we wanted aggregated revenue rather than detailed data for each store and product. Also, the sum aggregation function is applied to the revenue column.

select StoreState, ProductLine, sum(revenue) as "revenue" (2)

from sales, store, product
where sales.storeid=store.storeId
 and sales.productid=product.productId
 and StoreCountry='USA'
 and StoreRegion='West'
 and ProductGroup='Electronics'
group by StoreState, ProductLine;

TABLE 19

| StoreState | ProductLine | Revenue |
|---|---|---|
| Alaska | Stereo | 3800 |
| California | Radio | 11300 |
| California | Stereo | 17699 |
| California | TV | 12100 |
| Hawaii | Stereo | 17000 |
| Nevada | Stereo | 5100 |

Figure 20:
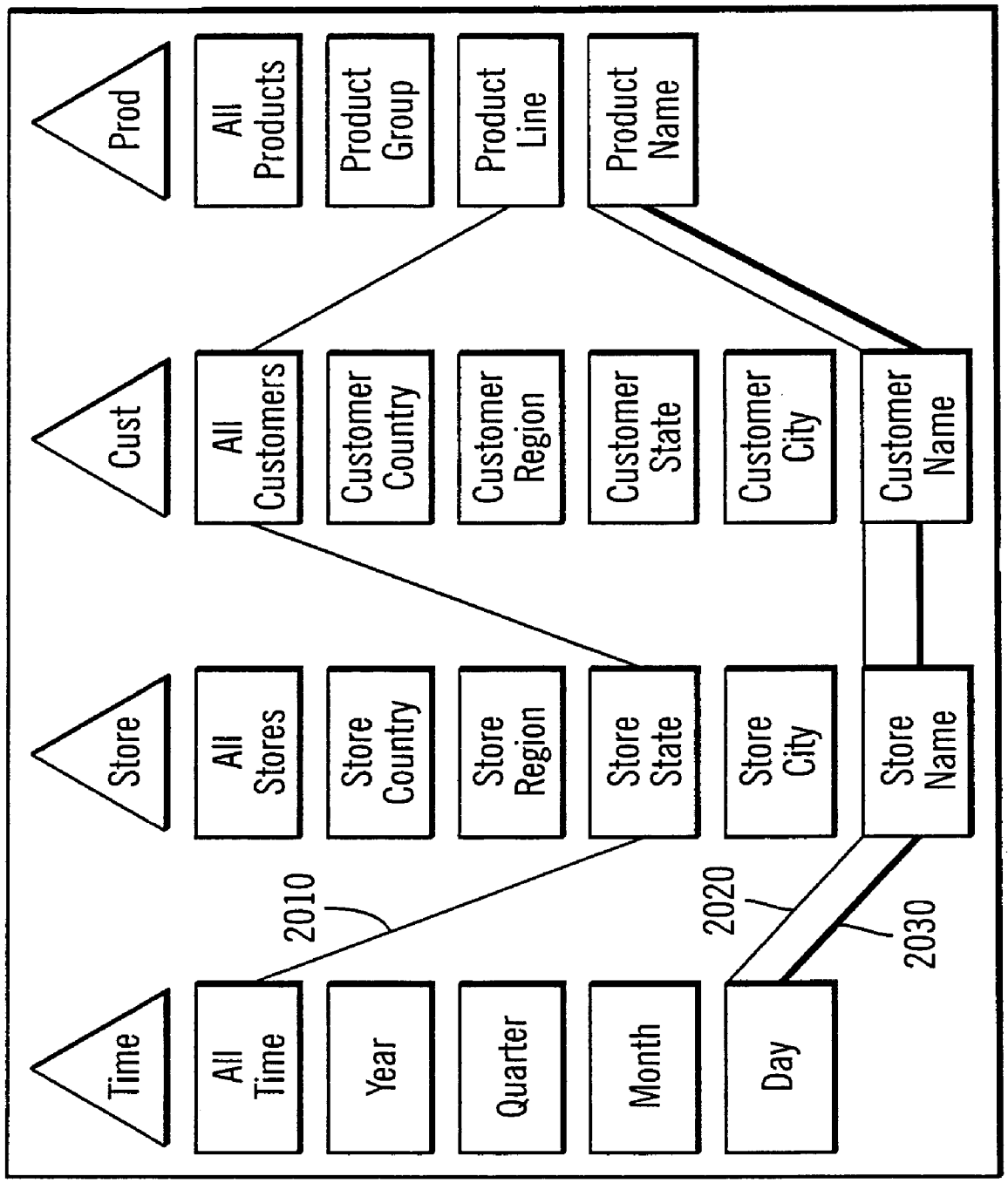
FIG. 20 illustrates queries submitted against the base tables that match the hierarchy structures in a cube model in accordance with certain implementations of the inventions.

FIG. 20 illustrates queries submitted against the base tables that match the hierarchy structures in a cube model in accordance with certain implementations of the inventions. Lines have been added to reflect the queries and data. The thin lines 2010, 2020 represent data the queries are accessing. The thick line 2030 represents data that actually exists. This technique will be used in subsequent diagrams to illustrate other queries.

The first line 2010 represents query (2) that showed revenue by product line and store state. Note the line 2010 connects the boxes for "All Time"—"Store State"—"All Customers"—"Product Line". This reflects that query (2) displays data aggregated by store state and product line for all time and all customers. In other words, since no grouping was done on either time or customers, the data shown is for all of them. This result is a slice of the cube model, the intersection of one level from each hierarchy.

The second line 2020 represents query (1) that obtained detailed sales data for a particular customer. The line 2020 connects the lowest box in each hierarchy because query (1) does not aggregate data. An aggregator was not applied to the revenue measures. Query (1) simply reads a subset of the data from the actual table.

The third line 2030 represents actual data. The detailed sales data is stored in the relational database. This data is the actual sales figures by customer and product for each store and day. While more detailed data may be available in a transaction database, this is the most detailed data available in the warehouse.

When RDBMS 110 processes query (1) requesting the non-aggregated data, the RDBMS 110 simply reads the requested subset of data. The RDBMS 110 does not need to aggregate the data since the RDBMS 110 already has data at the appropriate level of aggregation. In order to process query (2) requesting the data aggregated by store and product, the RDBMS 110 reads data from the base tables (the thick line 2030) and dynamically aggregates the data. Any query that references a combination of boxes above the thick line 2030 will require the RDBMS 110 to perform additional processing.

Figure 21:
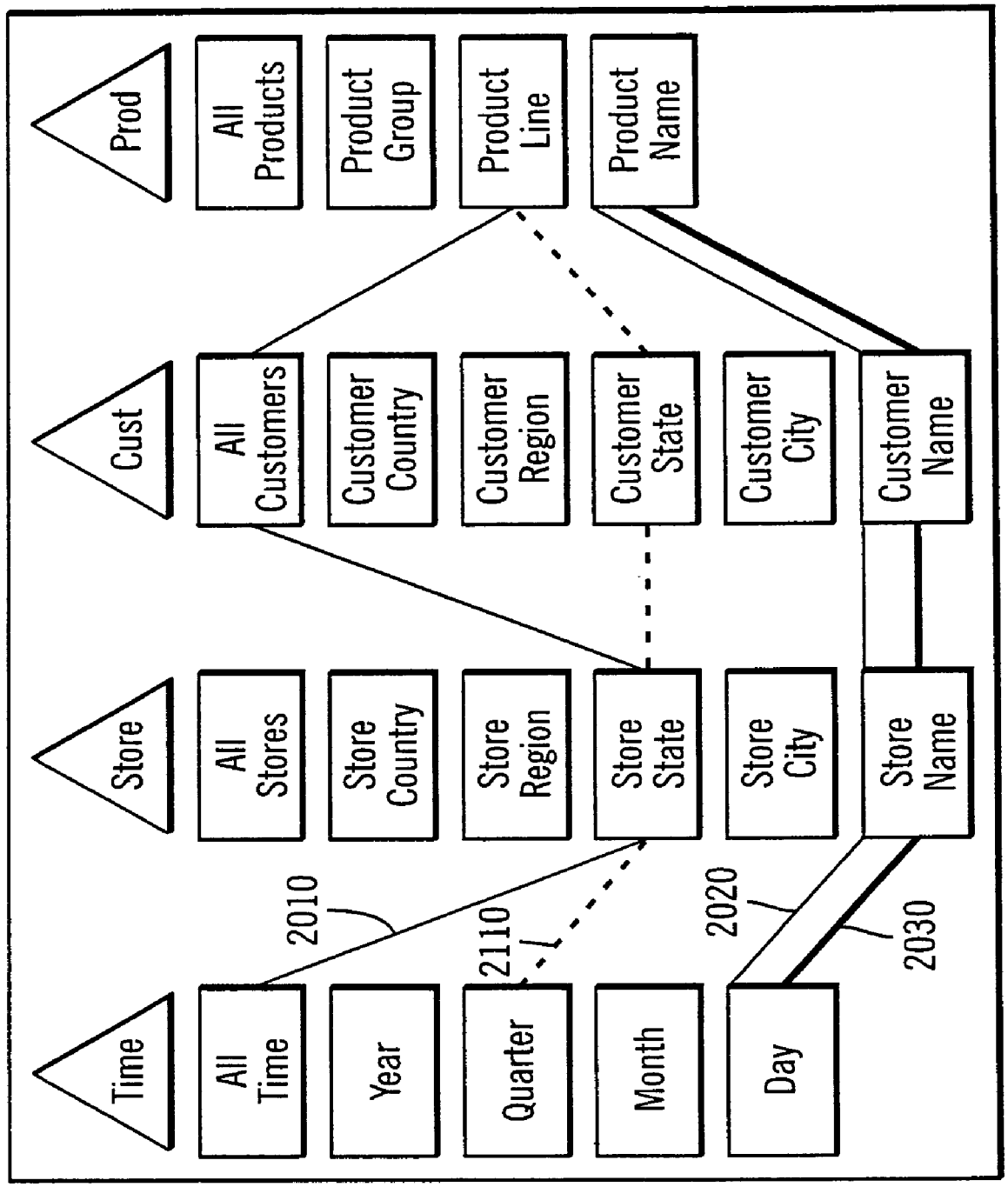
FIG. 21 illustrates a representation of a cube model in accordance with certain implementations of the invention.

Performance of query (2) that does aggregation could be improved by creating a summary table at a higher level of aggregation. FIG. 21 illustrates a representation of a cube model in accordance with certain implementations of the invention. In particular, in FIG. 21 line 2110 represents a summary table at the quarter—store state—customer state—product line aggregation level. If this summary table existed when the query was run, then the RDBMS 110 would read from the summary table instead of from the warehouse. This would save the RDBMS 110 work because the RDBMS 110 would need to aggregate less data, as the data will have already been aggregated several levels.

A summary table could be built containing the exact slice that the query specified. This would improve the performance the most because the RDBMS 110 would read data, but would not need to perform any calculations. However, there are some tradeoffs involved. The more slices that are preaggregated, then the odds of an exact match increase. However, this increases the time to build and maintain the summary table. On the other hand, having fewer slices at the right levels of each of the hierarchies can lower the cost of maintaining the summary table. Queries that do not have an exact match to the slices in the summary table can be aggregated at runtime. This also improves the query performance.

Imagine a slice built for [Year, Store Country, Customer Country, Product Group]. If a query refers to [Year, All Stores, Customer Country, Product Group], then the RDBMS 110 aggregates the data from store country to all stores. If there are stores in 32 countries, then 32 rows are read and calculated. In order for the RDBMS 110 to use a summary table, the query slice should be at or above the slice in the summary table. For example, a query that accessed [Quarter, All Stores, Customer City, All Products] would not be able to use the summary table slice 2110 shown in FIG. 21 with a dashed line because Customer City is below Customer State.

Tables 20-24 provide details of the fact and dimension tables for which the cube model illustrated in FIGS. 19-21 in accordance with certain implementations of the invention. The following hierarchies exist in the cube model:

Time: [Year, Quarter, Month, Day], [Year, Week, Day]

Store: [StoreCountry, StoreRegion, StoreState, StoreCity, StoreName]

Customer: [CustomerCountry, CustomerRegion, CustomerState, CustomerCity, CustomerName]

Product: [ProductGroup, ProductLine, ProductName]

TABLE 20

Sales

| Measure Name | Measure Description | Sample Values |
|---|---|---|
| Revenue | How much money was received by selling products. | 12000, 8500 |
| Cost | How much it cost to produce products. | 11000, 7400 |

TABLE 21

Time

| Attribute Name | Attribute Description | Sample Values |
|---|---|---|
| Year | The year. | 2000, 2001 |
| Quarter | The quarter of the year. There are 4 quarters per year. Each quarter has 3 months and 13 weeks. | Quarter 1, Quarter 2, Quarter 3, Quarter 4 |
| Month | The month of the year. | 1-12 |
| Week | The week of the year. | 1-52 |
| Day | The day of the month. There are 28–31 days per month. | 1-31 |

TABLE 22

Store

| Attribute Name | Attribute Description | Sample Values |
|---|---|---|
| Store Country | The name of the country the store is in. | USA, Canada, Mexico |
| Store Region | The name of the region within the country the store is in. | West, Northeast |
| Store State | The name of the state or province the store is in. | California, Alberta |
| Store City | The city the store is in. | San Jose, New York |
| Store Name | The name of the store. | Branch 173 |

TABLE 23

Customer

| Attribute Name | Attribute Description | Sample Values |
|---|---|---|
| Customer Country | The name of the country the customer is in. | USA, Canada, Mexico |
| Customer Region | The name of the region within the country the customer is in. | West, Northeast |
| Customer State | The name of the state or province the customer is in. | California, Alberta |
| Customer City | The city the customer is in. | San Jose, New York |
| Customer Name | The name of the customer. | John Doe, Jane Doe |

TABLE 24

Product

| Attribute Name | Attribute Description | Sample Values |
|---|---|---|
| Product Group | The name of a group of products. A more general set of products than product line. | Communications, electronics |
| Product Line | The name of a set of products that represent a line of products. | Cell phone, stereo, VCR |
| Product Name | The name of the specific product. | Turbo quadrophonic stereo 2001, VCR 3000 |

Business Intelligence tools and applications that deal with data in the relational database may issue all sorts of queries against the relational tables. Using the multidimensional metadata that matches the cube model definition, tools and applications are generally performing aggregations based on the granular data in the tables. There are four broad categories of queries that are seen depending on the type of tools and applications being used. The four broad categories include: drilldown, reports, extracts, and drillthrough.

Drilldown refers to the set of queries that are navigating through the aggregated data starting at the highest levels and drilling down into more detailed data. For example, a user is using a spreadsheet based application. Initially, the overall revenue for all regions and time might be displayed. The user then drills down into a hierarchy, such as region, to see revenue by state or drills into time to see revenue by quarter and month. Based on the user's interaction, the application generates a set of drilldown queries against the relational database.

Reports refer to queries that are generated to produce data (e.g., defined by a report designer) that matches slices of the cube model. Unlike the drilldown queries, which start at the top of the hierarchies, report queries, initially, can be the request for data at a particular level or slice (e.g. sales figures for the West region for all products). Then, there may be a drill up for more summary level data or drilldown for more detailed data based on user interactions.

Extracts refer to queries that are generated against the relational database for the purpose of populating an external data store or cache. For example, Multidimensional OLAP (MOLAP) products typically have a data load process which build and refresh the MOLAP data structures based on data that matches a particular slice in the cube model. An example of this is the Essbase™ multidimensional database. Essbase™ runs SQL queries against a relational database to aggregate the data and stores aggregations within its own proprietary data store.

Another type of OLAP system is called Hybrid OLAP (HOLAP). Typically, HOLAP uses two storage systems to store data for a single logical cube. The higher (summary) levels of the cube are stored in a proprietary data store, while lower level data remain in relational base tables. For example, the Essbase™ multidimensional database from Hyperion Solutions provides a mechanism to navigate out of a MOLAP cube and drill down into the relational database, which allows users to see detailed data that does not exist in the MOLAP cube. Drillthrough refers to queries generated by the HOLAP products when a user navigates across from the external data store to the relational database.

B.2 Drilldown Query Example

Figure 22:
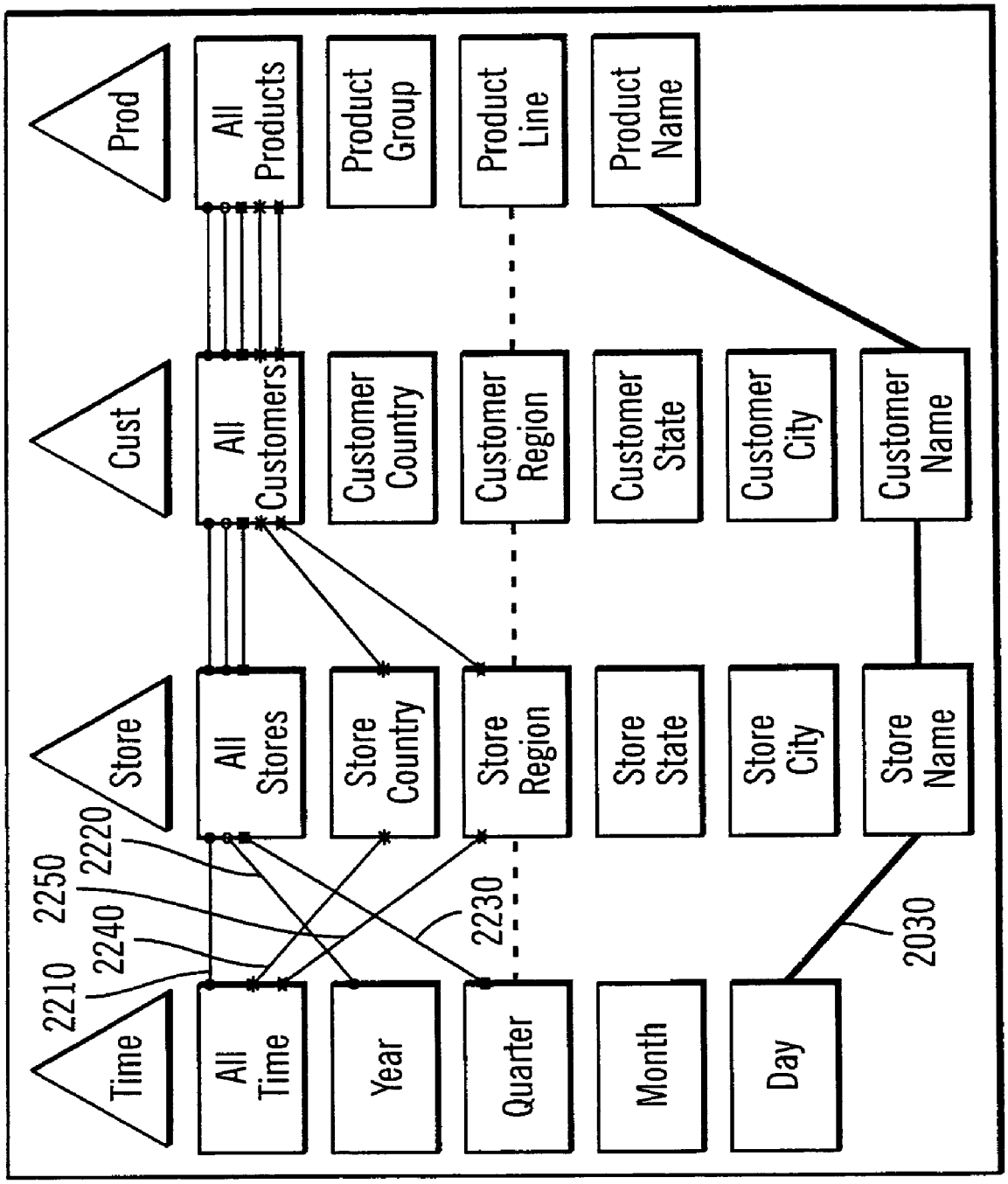
FIG. 22 illustrates slices of a cube in accordance with certain implementations of the invention.

The following queries in this section are example queries that may be used if a spreadsheet with OLAP add-in was used to drill down into lower level data from the top of the hierarchies. In particular, the following query displays revenue for all years:
select sum(revenue) as "revenue"
from sales;
The following query displays revenue for each year:
select year, sum(revenue) as "revenue"
from sales, time
where sales.timeid=time.timeId
group by year;
The following query displays revenue for each quarter of the year 2000:
select year, quarter, sum(revenue) as "revenue"
from sales, time
where sales.timeid=time.timeId
and year=2000
group by year, quarter;
The following query displays revenue for each country:
select StoreCountry, sum(revenue) as "revenue"
from sales, store
where sales.storeid=store.storeid
group by StoreCountry;
The following query displays revenue for each region within the United States:
select StoreCountry, StoreRegion, sum(revenue) as "revenue"
from sales, store
where sales.storeid=store.storeid
and StoreCountry='USA'
group by StoreCountry, StoreRegion;

FIG. 22 illustrates the slices of the cube the queries in this section are referencing in accordance with certain implementations of the invention. The slices are:
[All Time, All Stores, All Customers, All Products] 2210,
[Year, All Stores, All Customers, All Products] 2220,
[Quarter, All Stores, All Customers, All Products] 2230,
[All Time, Store Country, All Customers, All Products] 2240, and
[All Time, Store Region, All Customers, All Products] 2250.

A summary table with the slice [Quarter, Store Region, Customer Region, Product Line] would improve the performance of all these queries as well as any other query that drilled down to no further than the third level in each hierarchy. Building additional slices above this slice might improve query performance further at the expense of additional space and build time.

B.3 Report Query Example

Report queries can be for any slices in a cube model. Suppose three queries are executed and then read the following slices:
[All Time, Store State, All Customers, Product Line]
[Year, Store Country, Customer Country, Product Group]
[Month, Store State, Customer State, Product Line]

Figure 23:
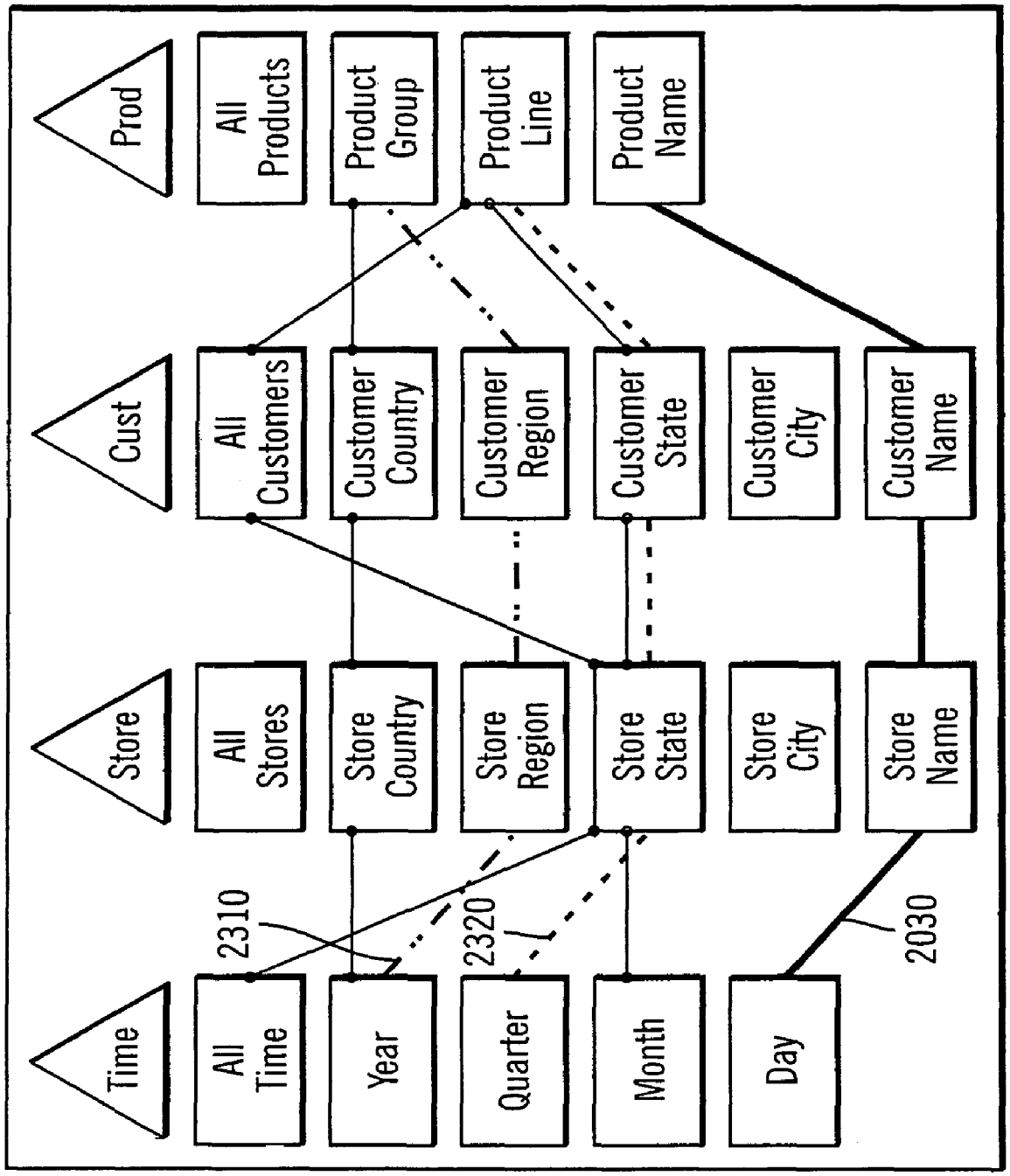
FIG. 23 illustrates summary table slices in accordance with certain implementations of the invention.

FIG. 23 illustrates summary table slices 2310, 2320 in accordance with certain implementations of the invention. Suppose the following summary table slices were built:
[Year, Store Region, Customer Region, Product Group] 2310
[Quarter, Store State, Customer State, Product Line] 2320

The first query could be routed to the second summary table slice. The second query could be routed be routed to the first summary table slice. The third query, however, could not be handled by either preaggregated slice. Instead the RDBMS 110 would aggregate from the base data.

B.4 Extract Query Example

Figure 24:
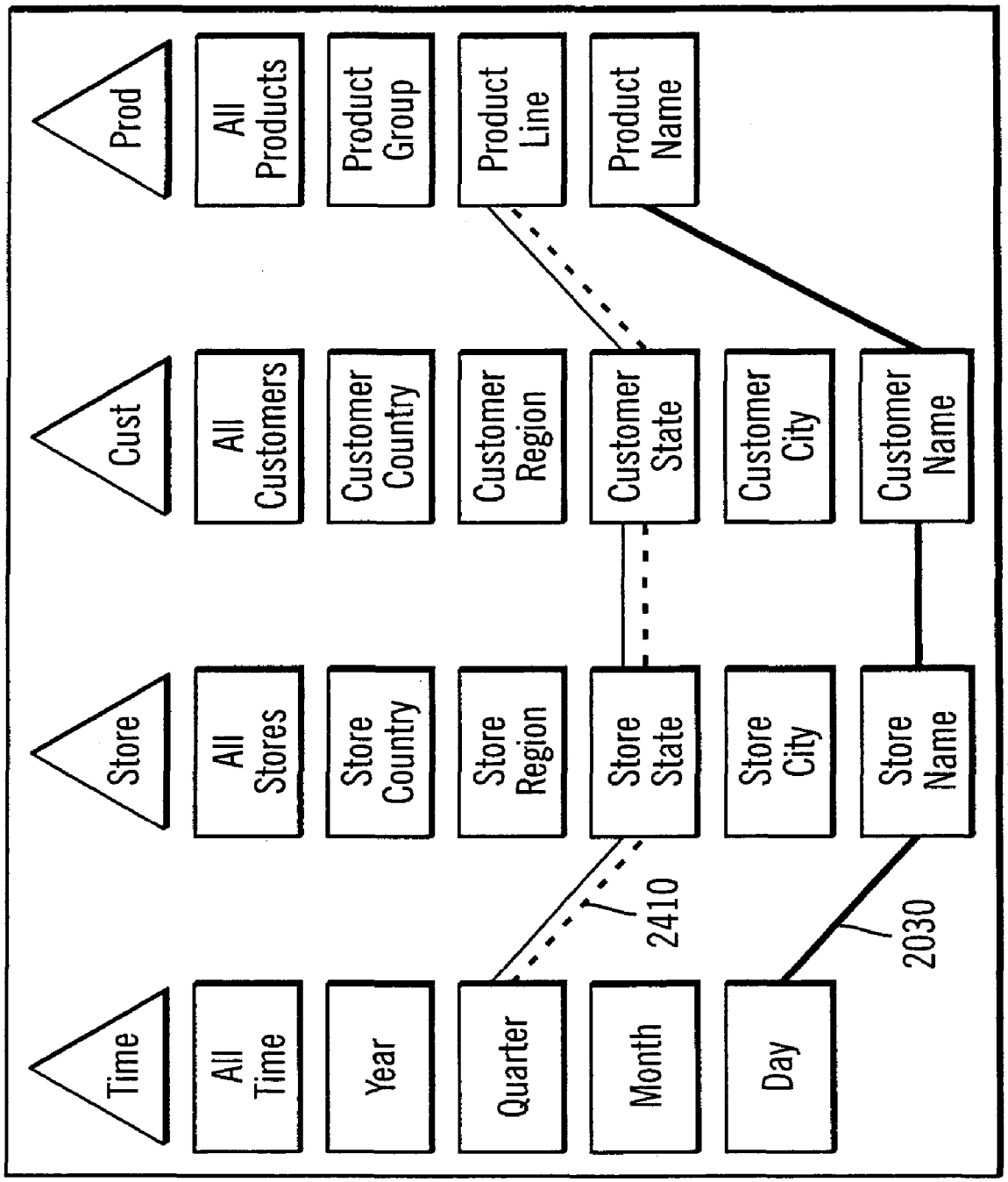
FIG. 24 illustrates an extract that might be done in accordance with certain implementations of the invention.
Figure 25:
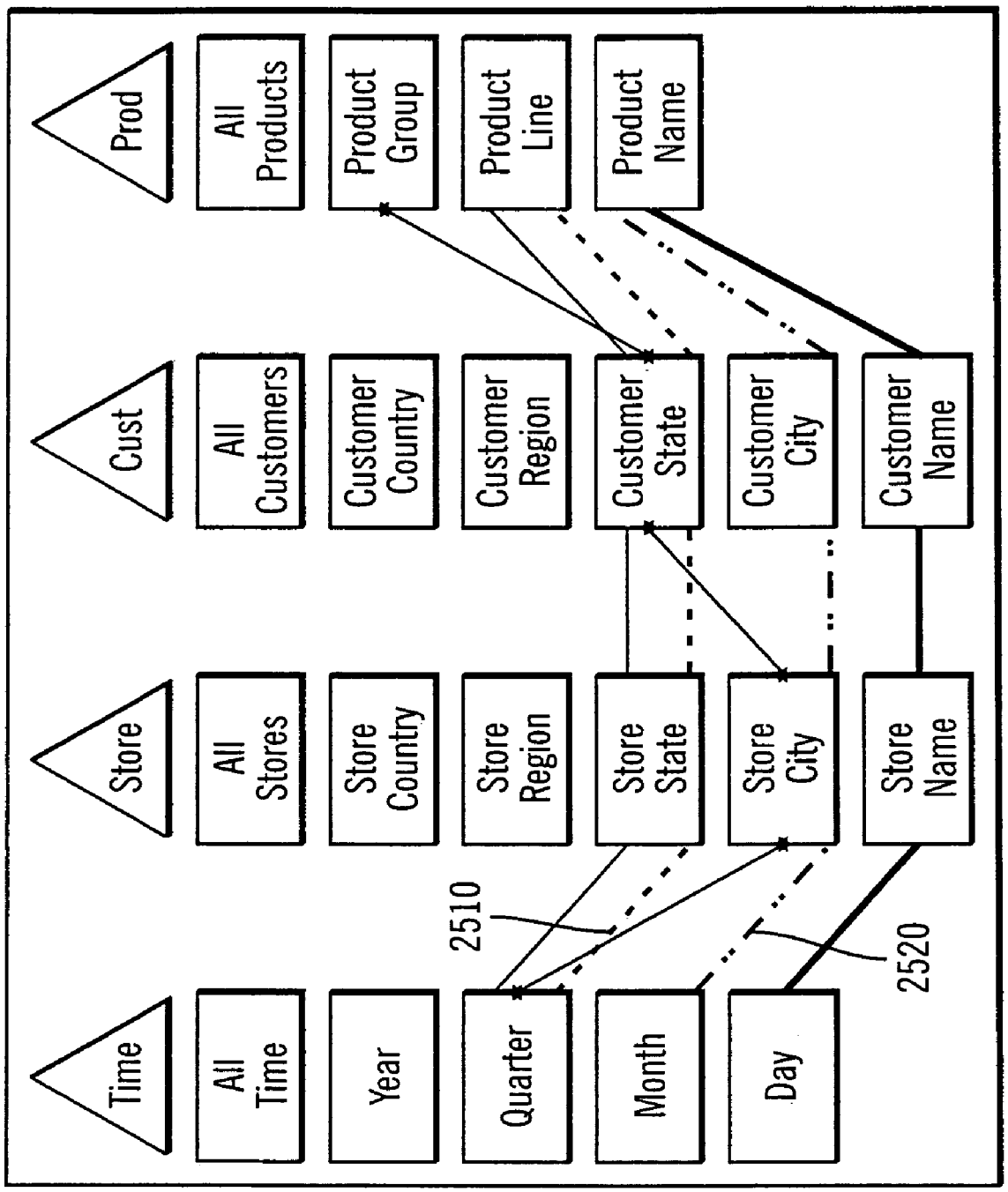
FIG. 25 illustrates a summary table slice in accordance with certain implementations of the invention.

Extract queries are generated by OLAP tools to pull data into an external data store (e.g. MOLAP database). Although multiple level of the data can be loaded into the external data store, typically the extract queries read data from relational database that matches the bottom level of the external data store. FIG. 24 illustrates an extract that might be done in accordance with certain implementations of the invention. A middle level slice provides the level of data that can be used to populate the MOLAP cube. In this example, both the extract query and the bottom level of the MOLAP cube are: [Quarter, Store State, Customer State, Product Line] 2410.

An improvement to extract performance would be achieved by building slice 2410 in a summary table. This would allow the extract to be completely satisfied by reading the summary table rather than reading the base tables and doing dynamic aggregations.

B.5 Drillthrough Query Example

In HOLAP products, a cube is a logical representation of data from the MOLAP data structure as well as data directly read or calculated from the relational database tables. MOLAP cubes are generally smaller in size for optimizing query performance and lowering the cost of maintenance. In such logical cubes, data at the lower levels of the hierarchies can reside in the relational database, while higher level data is extracted into a MOLAP data structure. When a user drills down from a level within the MOLAP data structure into the relational part of the logically cube, SQL queries are generated against the relational database to retrieve data. The Essbase™/DB2® OLAP relational partition feature is an example of this.

Suppose a user is looking at the following grid in relational partitions:
Time dimension at the quarter level (2000, Qtr-1).
Store dimension at the state level (USA, West, California).
Customer dimension at the state level (USA, East, New York).
Product dimension at the group level (Electronics).
Measures dimension is "revenue".

Suppose also that the user wants to drill-down on California to the city level. The following query may be generated for this drill-down:
select
    Year, Quarter,
    StoreCountry, StoreRegion, StoreState, StoreCity,
    CustomerCountry, CustomerRegion, CustomerState,
    ProductGroup,
    sum(revenue)
from
    Sales, Time, Store, Customer, Product
where
    Sales.TimeId=Time.TimeId
and Sales. StoreId=Store. StoreId
and Sales.CustomerId=Customer.CustomerId
and Sales.ProductId=Product.ProductId
and (Year=2000 and Quarter=1)
and (StoreCountry='USA' and StoreRegion='West' and
    StoreState='California')
and (CustomerCountry='USA' and CustomerRegion='West'
    and CustomerState='California')
and (ProductGroup='Electronics')
group by Year, Quarter,
    StoreCountry, StoreRegion, StoreState, StoreCity,
    CustomerCountry, CustomerRegion, CustomerState,
    ProductGroup;
Since this query drills below the store state level, the OLAP tools would require the relational RDMBS 110 to read and aggregate the base tables.

C. Advisor

C.1 Introduction

Implementations of the invention provide an advisor component 122, which exploits the multidimensional metadata in a database catalog for a specified cube model metadata object and recommends summary tables and indexes to be created in order to optimize queries. Implementations of the invention improve the performance of a relational database management system (RDBMS) used by OLAP systems. OLAP systems perform analysis of data that typically comes from relational databases. The advisor component 122 improves the performance of OLAP systems when the OLAP systems issue queries against the relational database. Furthermore, traditional non-OLAP systems that issue aggregation style queries can also see performance improvements.

OLAP systems issue multidimensional queries. These queries may request data to be aggregated at various levels of the dimension hierarchies. The RDBMS 110 reads the data and aggregates the data to the appropriate level. Frequently most of the time is spent reading and aggregating the data, rather than returning the data.

Relational databases provide summary tables in which data can be aggregated at particular levels and made persistent. If a query requests data from that level the RDBMS 110 can directly read the data rather than reading and aggregating large quantities of lower level data. If queries refer to data that is in higher levels of the hierarchies than that already aggregated, the RDBMS 110 can frequently still make use of the existing aggregation. The performance improvements by exploiting summary tables to store pre-calculated aggregates can be great. However, determining the most cost effective summary tables to be created can be a complex and time consuming task for a person.

Implementations of the invention provide an automatic technique for recommending which summary tables should be created. The advisor component 122 exploits multidimensional metadata, database statistics, sampling, diskspace limitations, time limitations, and multidimensional regions to be optimized to make recommendations. In addition users can provide hints to optimize queries for their particular OLAP system.

The advisor component 122 can simultaneously improve the performance of multiple OLAP systems from different vendors, as well as queries, issued by non-OLAP products, unlike prior art solutions that optimize a particular OLAP system. Although some OLAP systems require that queries be issued against an OLAP engine rather than a relational database, with implementations of the invention, traditional SQL queries may be issued against the relational database, either directly or via a product that generates SQL queries. Moreover, the advisor component 122 provides a mechanism to improve Decision Support Systems (DSS) performance at the relational database level.

By leveraging multidimensional metadata in a relational database, a smaller set of optimization objects (e.g., materialized aggregates, indexes, etc.) are created and maintained to improve performance for one or more subject specific cubes. Implementations of the invention reduce data redundancy in storing aggregated data, as well as, improve efficiency for refreshing a summary table when granular data from which the summary table was generated is updated.

Improving the relational database as a platform for OLAP systems allows database administrators to optimize performance within the relational database for both proprietary OLAP systems and SQL based applications.

An optimization component of the OLAP multidimensional metadata system 100 improves the performance of OLAP style SQL queries issued by various vendor products. Performance is improved by exploiting, for example, multi-dimensional metadata, summary tables (which are a specialized form of materialized views), multi-dimensional clustering (MDC) indexes, clustered indexes, regular indexes, and database catalog statistics. The optimization component may be implemented as operations of the OLAP multidimensional metadata system 100 application programming interface (API), which passes requests and responses as XML documents.

Table 25 describes some optimization operations in accordance with certain implementations of the invention.

TABLE 25

| Operation | Description |
|---|---|
| Advise | Recommends summary tables that will improve query performance for a cube model. |
| List | List summary tables associated with a cube model. |
| Drop | Drop summary tables associated with a cube model. |
| Statistics | Statistics help with selection of which aggregations (e.g., slices and regions) to put into summary tables. Statistics may be provided about slices and regions, such as: row width (i.e., tables are not wider than the tablespace they are put in); size (e.g., estimated) (i.e., the larger an aggregation the more costly it is); row count (e.g., estimated) (i.e., the larger an aggregation the more costly it is); number of columns; whether a slice/region is logically stacked (derived from) another slice/region; estimated time to populate (refresh) the summary table; whether |

TABLE 25-continued

| Operation | Description |
|---|---|
| | refresh immediate could be used if a summary table contained this aggregation; and estimate of query improvement.<br>Most conventional performance advisors are geared for unsophisticated users and do not allow users the flexibility of controlling what gets done or else are geared for sophisticated users and are unusable by regular users. Implementations of the invention provide an advisor component 122 that supports a range of users from "just make my queries faster" to "I want to tell you the advisor precisely what needs to be faster and have you give me the analyst the necessary statistics so I can decide what to aggregate". |

Table 26 describes some objects (e.g., C++ objects) used for optimization in accordance with certain implementations of the invention.

TABLE 26

| Object | Description |
|---|---|
| Advise | An operation that recommends summary tables and indexes given a set of input criteria. |
| Summary table | Represents a summary table. It contains a set of slices and ROLLUP slices representing the aggregations to be done and a set of index objects. |
| Slice | The slice object represents a subset of a cube model obtained by using one level attribute for each hierarchy. In SQL terminology, this would be grouping by each specified level attribute plus any other level attributes higher in its hierarchy. The ROLLUP is a special variant in which ROLLUPs of the hierarchy attributes are done rather than just grouping. |
| Level | A level represents an attribute within a particular hierarchy of a dimension. |
| Index | Represents a database index. Variations include MDC index, clustered index and regular indexes. |
| SQLGen | Represents a SQL engine that understands cube models and slices. The SQLGen object works on a given cube model and can generate a SQL statement that represents one or more slices passed in a generate SQL call. Another use of SQLGen is to generate variations of these queries to assist the advisor component 122 in making recommendations. These queries include, for example, sampling data from the base tables and estimating row counts and widths more efficiently. |

Figure 26A:
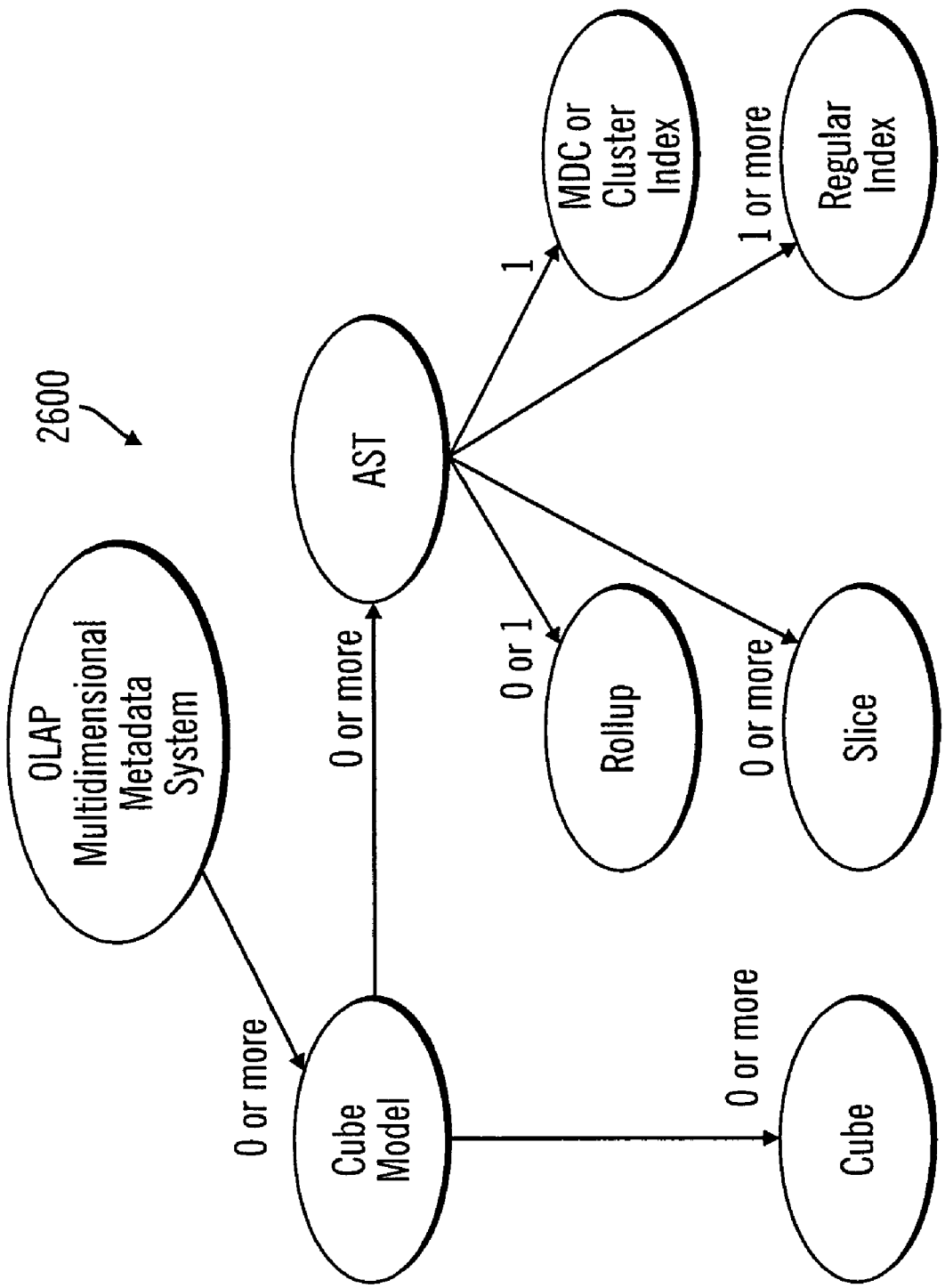
FIG. 26A illustrates relationships between some objects in accordance with certain implementations of the invention.
Figure 26B:
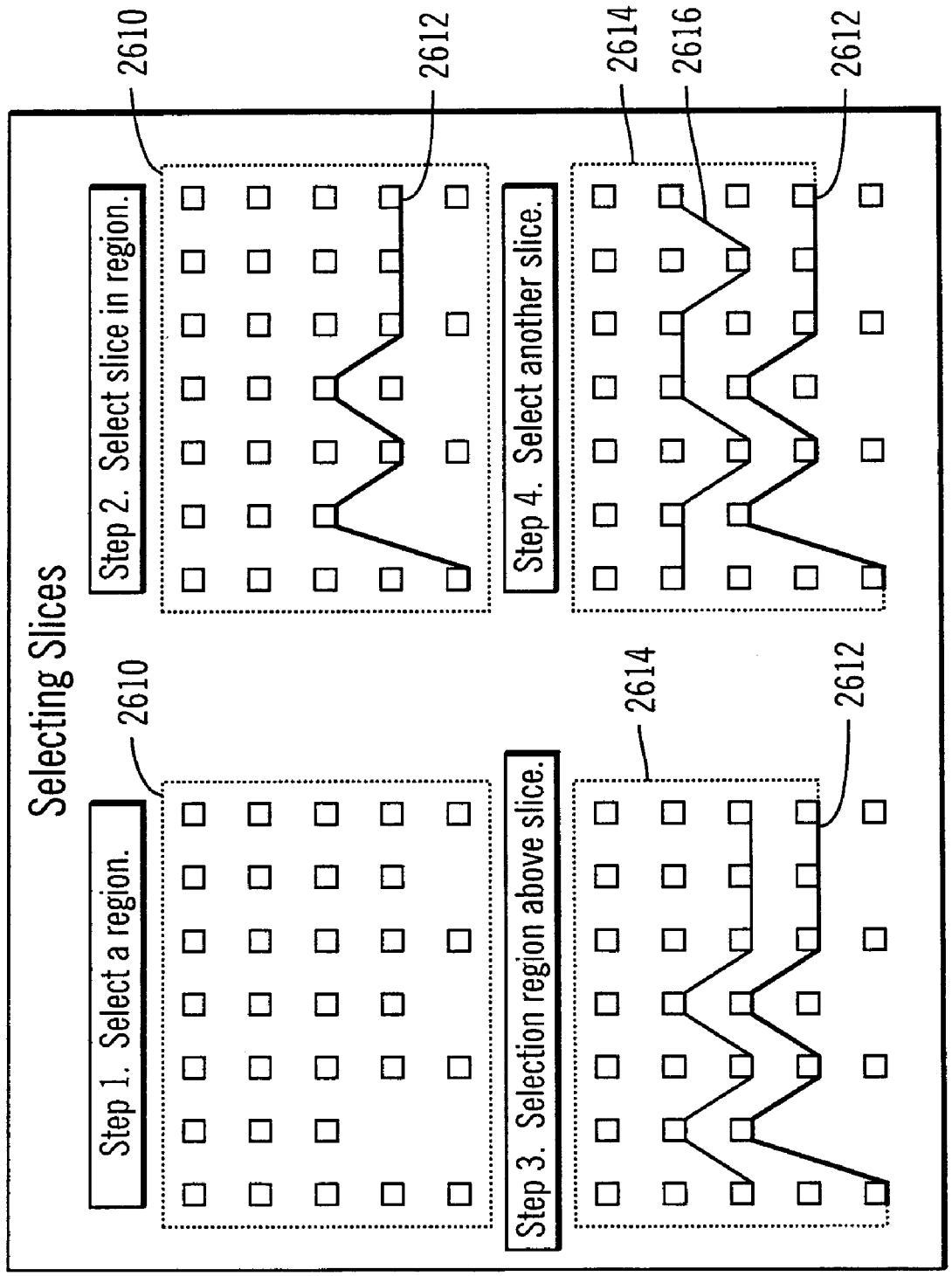
FIGS. 26B and 26C illustrate slices and ROLLUP slices in accordance with certain implementations of the invention.
Figure 26C:
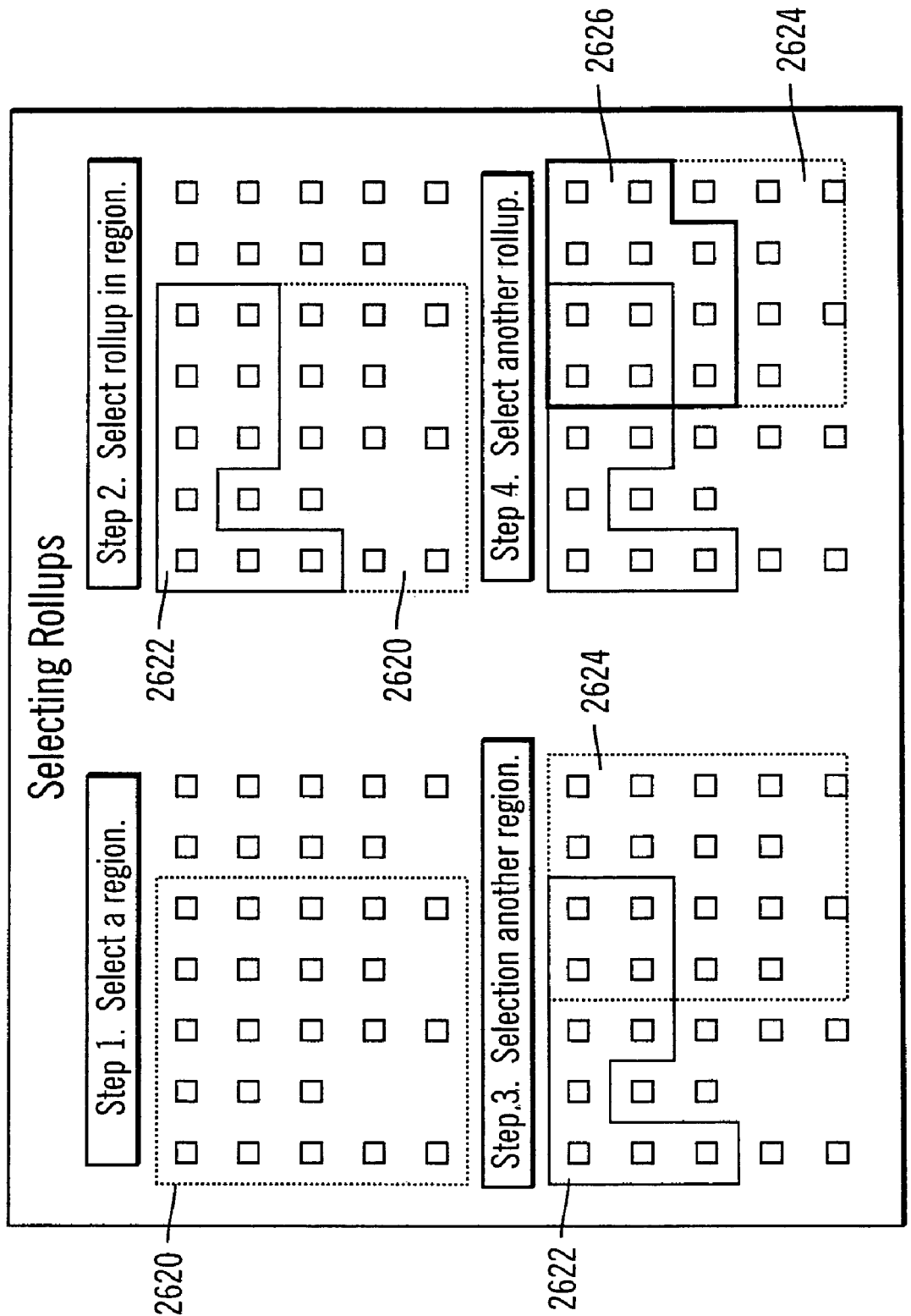

FIG. 26A illustrates relationships between some objects in accordance with certain implementations of the invention. For example, the OLAP multidimensional metadata system may include zero or more cube model metadata objects. For each cube model metadata object, there may be zero or more cube metadata objects. For each cube model metadata object, there may be zero or more summary tables. For each summary table, there may be zero or more ROLLUPs, zero or more slices, one MDC or clustering index, and one or more regular indexes. FIGS. 26B and 26C are discussed below C.2 Advise Operation In certain implementations, the advise operation is implemented as advisor component 122. The advise operation recommends summary tables that should be built to improve query performance for a specified cube model. Additional arguments guide the advise operation by specifying the type of queries to be issued and restricting the diskspace that should be used. The advise operation returns SQL that, if executed, will create summary tables and indexes. In addition, SQL is returned that, if executed, will refresh the summary table to keep the summary table in synch with changes made to the base tables. In certain implementations, the user or application that calls the advise operation executes the SQL.

C.2.1 Advise Request

Table 27 describes advise request components in accordance with certain implementations of the invention.

TABLE 27

| Name | XML element | Values | Description |
|---|---|---|---|
| cubeModelRef | XML string | | Cube model to optimize. |
| drilldown | XML string [optional] | Yes/No | Specifies if drilldown style queries that typically access the top slices of the model will be issued. |
| report | XML string [optional] | Yes/No | Specifies if report style queries that can reference any slice of the model will be issued. |
| extract | XML string [optional] | Yes/No | Specifies if extract style queries will be issued. An example would be extracting data into a MOLAP store. |
| drillthrough | XML string [optional] | Yes/No | Specifies if drillthrough queries will be issued. An example would be using drilling from hybrid into a database. |
| tablespaceName | XML string [optional] | | Tablespace to put the summary tables in. |
| indexspaceName | XML string [optional] | | Tablespace to put the summary table indexes in. |
| diskspaceLimit | XML double [optional] | | Diskspace (in bytes) available for the summary tables and their indexes. Allows users to make tradeoffs between query performance and diskspace. Specifying 0 means unlimited. Default is unlimited. |
| timeLimit | XML integer [optional] | | The amount of time (in seconds) that may be used in making recommendations. This allows users to tradeoff time between the optimization stage and query performance. This is useful since at some point the advisor component 122 will be unable to come up with better recommendations no matter how much time it spends on analysis. Specifying 0 means unlimited. Default is unlimited. |
| sampling | XML string [optional] | Yes/No | Specifies if data sampling should be done of the base tables of the cube model. Sampling can improve the recommendations but will increase the time for the |

TABLE 27-continued

| Name | XML element | Values | Description |
|---|---|---|---|
| | | | advisor component 122 to run. If sampling is not allowed, then the advisor component 122 makes recommendations based on database statistics. Sometimes users have a small replica of the original data. They can tweak the database statistics to make it look as though the tables are the same size as the original tables and then specify that sampling should not be done. The advisor component 122 will then make recommendations based on the database statistics. |
| refresh | XML string [optional] | immediate or deferred | Specifies whether the RDBMS 110 will refresh the summary tables immediately when the base tables change in order to ensure they are synchronized or defer the update. The refresh script varies based on the choice made here. For example, refresh deferred means the user specifies when the summary tables are to be refreshed. For refresh immediate, the user may or may not need to run the refresh script (it depends on how the user updates the base tables). In any case, the refresh script for the immediate case does a simple refresh which the RDBMS 110 will do "incrementally" (i.e., update the aggregations that were affected by changes to the base tables, which is faster than building complete aggregations). In certain implementations, a refresh from cursor options provides a faster refresh. |
| hints | XML element [optional] | | User provides additional information to the advisor component 122 to improve the recommendations. For example, the user specifies regions (slices and ROLLUPs) of the cube model that guide the advisor component 122 in its optimization. Regions can be specified as required, suggested or ignored. Those specified as required will be created. Those specified as suggested will be treated as defining which portions of the cube model is most important to optimize. Those specified as ignore specify that a portion of a cube model is in the MOLAP data store so there |

TABLE 27-continued

| Name | XML element | Values | Description |
|------|-------------|--------|-------------|
| | | | is no need to optimize that portion within the relational database. Experienced DBAs can specify regions to more precisely control what data is summarized. For example, the DBA could specify how deep in a hierarchy it is necessary to optimize. The advisor component 122 will still recommend indexes. In certain implementations, specification of the hybrid pivot attributes which are always included in hybrid queries are allowed. In certain implementations, the hints are a set of XML elements, in which each XML element references a slice or region and has an attribute indicating whether the slice or region was required or recommended. |

The following is a sample advise request in XML:

```
<?xml version="1.0" encoding="UTF-8" ?>
- <olap:request xmlns:olap="http://www.ibm.com/olap"
    xmlns:xsi="http://www.w3.org/2001/XMLSchema-instance"
    xmlns:xsd="http://www.w3.org/2001/XMLSchema"
    version="8.1.2.1.0"> -
    <advise diskspaceLimit="75000" timeLimit="300" sampling="yes"
        refresh="immediate" drilldown="yes" report="yes"
        drillthrough="no"
        extract="no" tablespaceName="TS_TABLES"
        indexspaceName="TS_TABLES"> <cubeModelRef
        name="SalesModel"
        schema="MDSAMPLE"/>
    </advise>
</olap:request>
```

C.2.2 Advise Response

Table 28 describes advise response components in accordance with certain implementations of the invention.

TABLE 28

| Status | XML element | Return code, type, and message for operation |
|--------|-------------|----------------------------------------------|
| info | XML element | Provides additional details of advise operation to provide users an understanding of key decisions made by the advisor component 122. This may show conditions that caused some parts of the model to not be optimized or additional information about what optimizations were done. |
| returnCode | XML integer | Return code for operation. |
| returnMessage | XML string | Return message for operation. |
| queryImprovement | XML integer | An estimate of how much query performance will be improved if the recommended summary tables are created. In certain implementations, this is an approximation. |
| diskspace | XML integer | An estimate of total diskspace required for the recommended summary tables and indexes. |
| SQL | XML element | SQL to create and populate a summary table and create indexes on it. User or application executes the SQL. |
| refreshSQL | XML element | SQL to refresh the summary tables to synchronize them with base tables that have been updated. Refresh may not be applicable for refresh immediate summary tables (depending on how users update the base tables). |
| improvedRegion | XML element | This shows the regions that will see a performance improvement. If there are multiple slices for a virtual cube then the region that will improve is from the bottom slice generated to the top of the cube. A complicating factor is that non-distributive functions such as STDDEV will only be improved in the ROLLUP case, not the slice case. The optimized regions will be specified as a set of slices. |
| aggregations | XML element | The slices and regions that will be preaggregated in order to optimize queries. [slice] [week (time)] [city (market)] [SKU (product)] [diskspace] [region] [all-quarter (time)] [all-region (market)] [all-category (product)] [diskspace] |

The following is a sample advise response in XML, which provides the user with feedback about what aggregations were recommended in OLAP metadata terms. The advise response summarizes the recommended SQL from the perspective of an OLAP user rather than a SQL user.

```
- <olap:response xmlns:olap="http://www.ibm.com/olap"
    xmlns:xsi="http://www.w3.org/2001/XMLSchema-instance"
    xmlns:xsd="http://www.w3.org/2001/XMLSchema"
    version="8.1.2.1.0">
- <advise>
    <status id="0" text="Operation completed successfully. No
        errors were encountered."
    type="informational" />
- <info>
    <message id="7401" text="The DB2INFO.MQT0000000041T01
        summary table is
recommended. It is estimated to have 100 rows, 55KB table size and
5KB index size." />
    <message id="7401" text="The DB2INFO.MQT0000000041T02
        summary table is
recommended. It is estimated to have 8 rows, 4KB table size and
1KB index size." />
    <message id="7406" text="The PART dimension does not
        have any hierarchies that can
be optimized by the Optimization Advisor. The recommendations
will not optimize for
```

-continued

```
any attributes from this dimension." />
    </info>
    <recommendation queryImprovement="55"
    diskspace="65108"/>
- <sql>
- <![CDATA[
--
-- ********************************************************
-- * Script to create/refresh summary tables.
-- *
-- * Cube model schema: MDSAMPLE
- * Cube model name: SalesModel
- * Diskspace limit: 75000
-- * Time limit: 300
-- * Sampling: Yes
-- * Drill down: Yes
-- * Report: Yes
-- * Drill through: No
-- * Extract: No
-- * Refresh type: Refresh immediate
-- * Tablespace name: TS_TABLES
- * Indexspace name: TS_TABLES
-
-- ********************************************************
DROP TABLE DB2INFO.MQT0000000041T01;
DROP TABLE DB2INFO.MQT0000000041T02;
UPDATE COMMAND OPTIONS USING c OFF;
CREATE SUMMARY TABLE DB2INFO.MQT0000000041T01 AS
(SELECT
SUM(T2."COGS") AS "COGS",
SUM(T2."MARKETING"+T2."PAYROLL") AS "EXPENSE",
SUM(T2."MARKETING") AS "MARKETING",
SUM(T2."PAYROLL") AS "PAYROLL",
SUM(T2."SALES"-(T2."COGS"+
(T2."MARKETING"+T2."PAYROLL")))AS
"PROFIT",
SUM(T2."SALES") AS "SALES",
COUNT(*) AS "COUNT",
T5."REGION" AS "REGION",
T5."DIRECTOR" AS "DIRECTOR",
T6."FAMILY" AS "FAMILY",
T6."FAMILYNAME" AS "FAMILYNAME",
T3."SKU" AS "SKU",
T3."CAFFEINATED" AS "CAFFEINATED",
T3."OUNCES" AS "OUNCES",
T3."PKGTYPE" AS "PKGTYPE",
T3."SKUNAME" AS "SKUNAME",
T4."YEAR" AS "YEAR"
FROM
"MDSAMPLE"."MARKET" AS T1,
"MDSAMPLE"."SALESFACT" AS T2,
"MDSAMPLE"."PRODUCT" AS T3,
"MDSAMPLE"."TIME" AS T4,
"MDSAMPLE"."REGION" AS T5,
"MDSAMPLE"."FAMILY" AS T6
WHERE
T1."STATEID"=T2."STATEID" AND
T3."PRODUCTID"=T2."PRODUCTID"AND
T4."TIMEID"=T2."TIMEID" AND
T1."REGIONID"=T5."REGIONID" AND
T3."FAMILYID"=T6."FAMILYID"
GROUP BY
T5."REGION",
T5."DIRECTOR",
T6."FAMILY",
T6."FAMILYNAME",
T3."SKU",
T3."CAFFEINATED",
T3."OUNCES",
T3."PKGTYPE",
T3."SKUNAME",
T4."YEAR")
DATA INITIALLY DEFERRED
REFRESH IMMEDIATE
IN "TS_TABLES"
INDEX IN "TS_TABLES"
NOT LOGGED INITIALLY;
COMMENT ON TABLE DB2INFO.MQT0000000041T01 IS
'AST created for cube
```

-continued

```
model MDSAMPLE.SalesModel';
REFRESH TABLE DB2INFO.MQT0000000041T01;
CREATE INDEX DB2INFO.IDX0000000041T0101 ON
DB2INFO.MQT0000000041T01("FAMILY",
"SKU");
CREATE INDEX DB2INFO.IDX0000000041T0102 ON
DB2INFO.MQT0000000041TO1("REGION ");
RUNSTATS ON TABLE DB2INFO.MQT0000000041T01 AND
INDEXES ALL;
CREATE SUMMARY TABLE DB2INFO.MQT0000000041T02 AS
(SELECT
SUM(T2."COGS") AS "COGS",
SUM(T2."MARKETING"+T2."PAYROLL") AS "EXPENSE",
SUM(T2."MARKETING") AS "MARKETING",
SUM(T2."PAYROLL") AS "PAYROLL",
SUM(T2."SALES"-(T2."COGS"+
(T2."MARKETING"+T2."PAYROLL")))AS
"PROFIT",
SUM(T2."SALES") AS "SALES",
COUNT(*) AS "COUNT",
T1."YEAR" AS "YEAR",
T1."QUARTER" AS "QUARTER"
FROM
"MDSAMPLE"."TME" AS T1,
"MDSAMPLE"."SALESFACT" AS T2
WHERE
T1."TIMEID"=T2."TIMEID"
GROUP BY
T1."YEAR",
T1."QUARTER")
DATA INITIALLY DEFERRED
REFRESH IMMEDIATE
IN "TS_TABLES"
INDEX IN "TS_TABLES"
NOT LOGGED INITIALLY;
COMMENT ON TABLE DB2INFO.MQT0000000041T02 IS
'AST created for cube
model MDSAMPLE.SalesModel';
REFRESH TABLE DB2INFO.MQT0000000041T02;
CREATE INDEX DB2INFO.IDX0000000041T02C ON
DB2INFO.MQT0000000041T02("QUARTER") CLUSTER;
REORG TABLE DB2INFO.MQT0000000041T02;
RUNSTATS ON TABLE DB2INFO.MQT0000000041T02 AND
INDEXES ALL;
COMMIT;
    ]]>
    </sql>
- <refreshSql>
- <![CDATA[
--
-- ********************************************************
-- * Script to create/refresh summary tables.
- *
-- * Cube model schema: MDSAMPLE
- * Cube model name: SalesModel
- * Diskspace limit: 75000
-- * Time limit: 300
-- * Sampling: Yes
-- * Drill down: Yes
-- * Report: Yes
-- * Drill through: No
-- * Extract: No
-- * Refresh type: Refresh immediate
-- * Tablespace name: TS_TABLES
- * Indexspace name: TS_TABLES
--
-- ********************************************************
UPDATE COMMAND OPTIONS USING c OFF;
REFRESH TABLE DB2INFO.MQT0000000041T01;
REFRESH TABLE DB2INFO.MQT0000000041T02;
COMMIT;
    ]]>
    </refreshSql>
    </advise>
    </olap:response>
```

C.3 Advise Logic

C.3.1 Advise Logic Details

FIGS. 27A-27E illustrates logic implemented in the advisor component 122 in accordance with certain implementations of the invention. In FIG. 27, control begins at block 2710 with the advisor component 122 reading a request for advice (e.g., an XML request). The parameters, such as cube model name and processing limits, are saved into an advise C++ object. In block 2712, the advisor component 122 validates that the cube model can be optimized. Parts of the cube model metadata are checked to make sure there is enough information available for the advise component 122 to make a recommendations. In addition, the underlying database objects that comprise the cube model are checked to ensure that if a recommendations is made, the RDBMS 110 will be able to exploit the summary tables. For example, in certain implementations, the advisor component 122 ensures that there are constraints associated with any joins.

In block 2714, the advisor component 122 reads cube model metadata from, for example, one or more database catalogs. This includes metadata for any objects that are logically part of the cube model, including, for example, facts, dimensions, hierarchies, attributes, measures, and cubes. In block 2716, the advisor component 122 analyzes the metadata. The metadata is analyzed to assist the optimizations. In certain implementations, the presence of non-distributed measures or nullable attributes prevents the use of refresh immediate.

In block 2718, the advisor component 122 determines one or more measure sets. The measures are analyzed to determine if they are symmetric or asymmetric. All symmetric measures are put in one measure set. For each group of asymmetric measures with the same dimensionality an additional measure set is created. Each measure set is optimized separately. The resources provided in the request are apportioned across the measure sets based on their perceived priority. In certain implementations, the symmetric measures are given more resources. In certain implementations, the distributive measures are put in their own measure set and given more resources. In certain other implementations, measures used frequently are placed into a high priority measure set based on usage information or appearance in cubes of the cube model.

In block 2720, the advisor component 122 selects the next measure set to be a current measure set, starting with a first measure set. In block 2722, the advisor component 122 determines one or more summary tables to create for the current measure set. In block 2724, the advisor component 122 determines one or more indexes to create on the one or more summary tables. In block 2726, the advisor component 122 determines whether there are more measure sets. If so, processing continues to block 2720 to select the next measure set, otherwise, processing continues to block 2728. In block 2728, the advisor component 122 generates SQL to create the one or more summary tables and indexes. In block 2730, the advisor component 122 returns a response (e.g., writes an XML response). The response contains, for example, the recommended SQL as well as additional information about the optimization that was done.

Figure 27A:
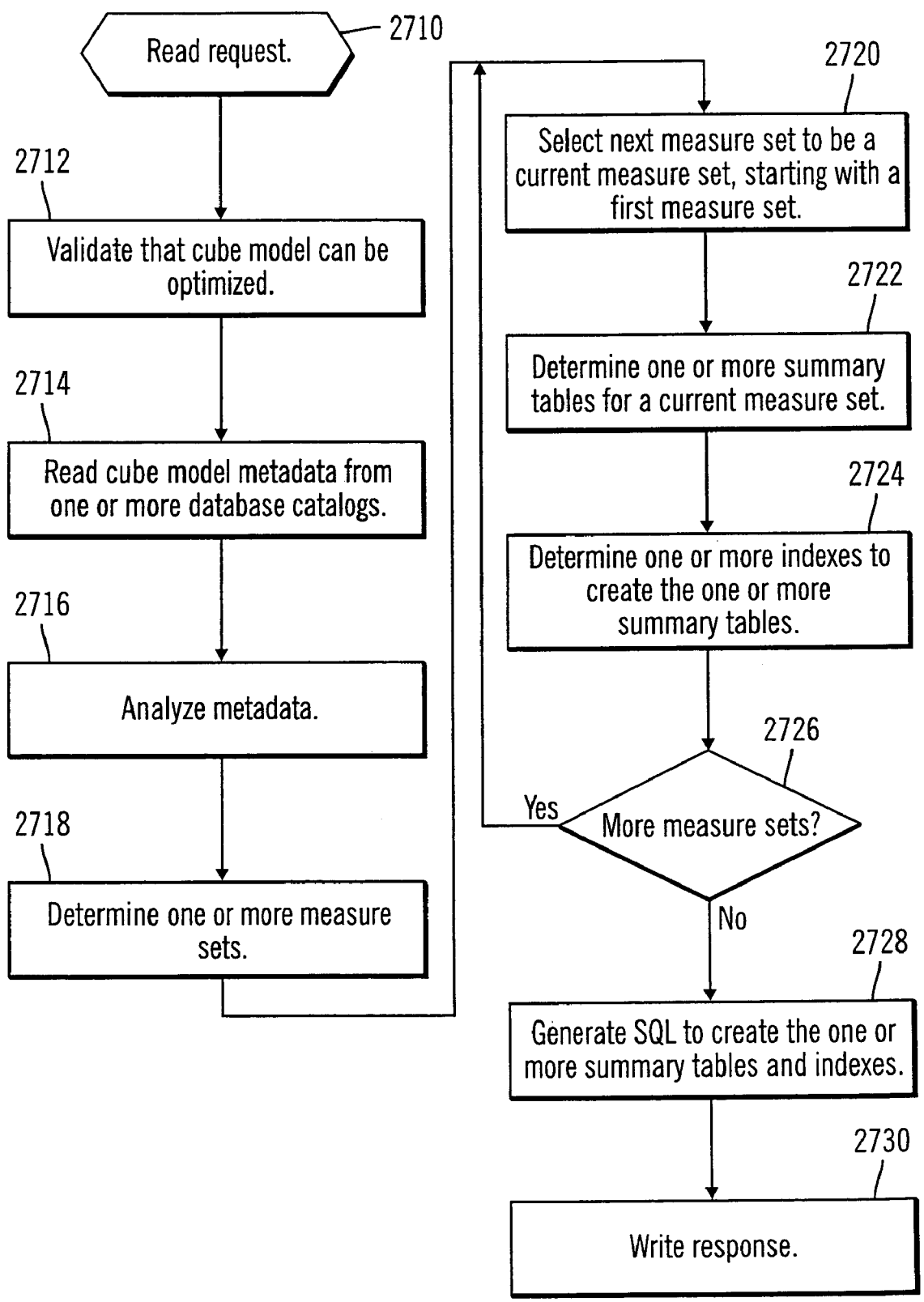
FIGS. 27A-27E illustrates logic implemented in the advisor component in accordance with certain implementations of the invention.
Figure 27B:
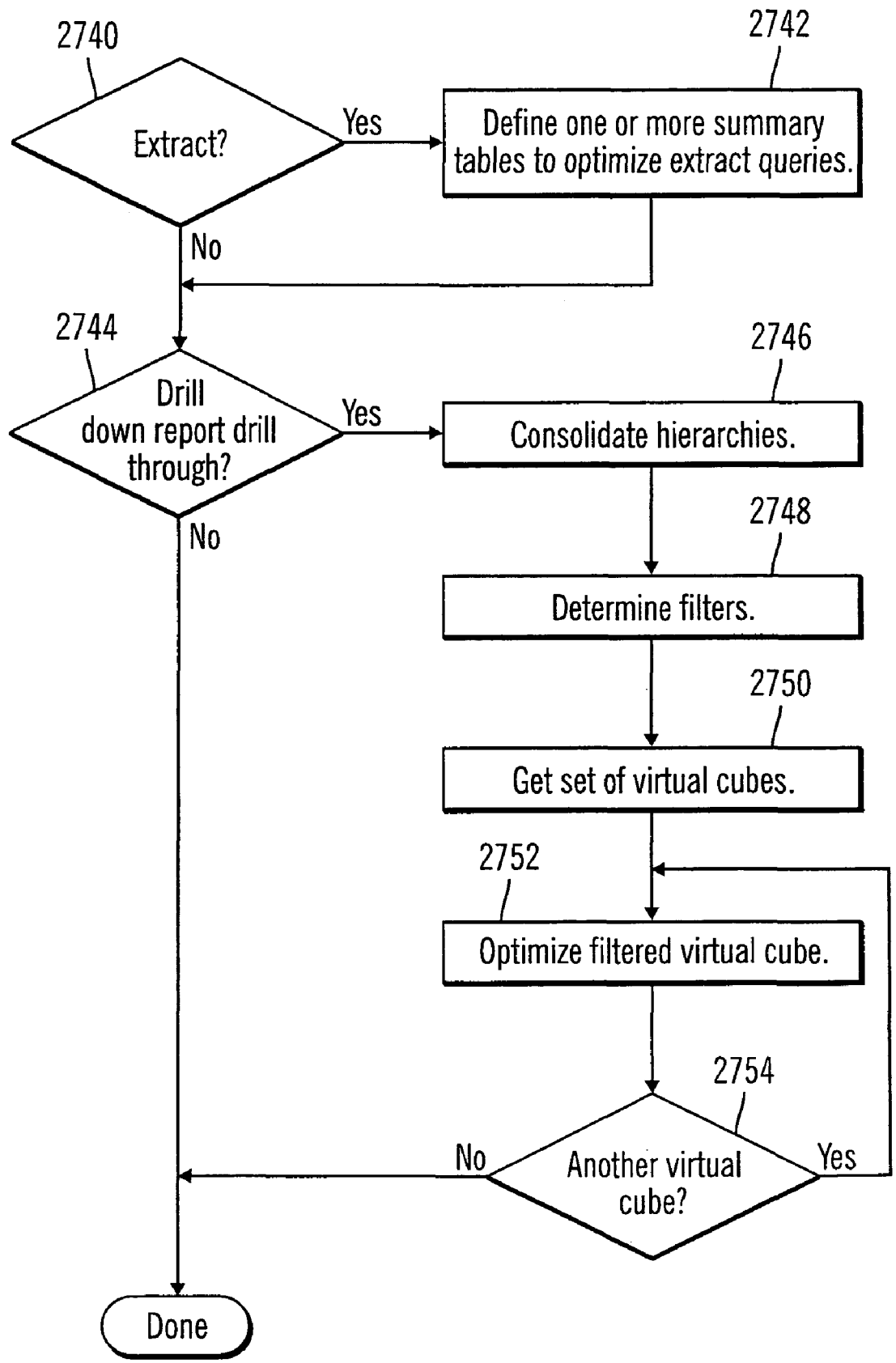

FIG. 27B illustrates logic for determining one or more summary tables in accordance with certain implementations of the invention. The optimization is driven in part by the type of queries intended to be run. Extract queries are optimized separately from the other type of queries. When more than one of the four types of queries is selected, then the advisor component 122 simplifies the optimization. If both drilldown and report are selected, then optimization is done as if just drilldown was selected. If either drilldown or report is selected, then drillthrough is ignored. If both extract and drillthrough are selected, then extract is ignored.

In FIG. 27B, control begins at block 2740 with the advisor component 122 determining whether an extract query is to be run. If so, processing continues to block 2742, otherwise, processing continues to block 2744. In block 2742, the advisor component 122 defines one or more summary tables to optimize the extract query.

In block 2744, the advisor component 122 determines whether a drilldown query, a report query, or a drillthrough query is to be run. If so, processing continues to block 2746, otherwise, processing is done. In block 2746, the advisor component 122 consolidates hierarchies. If any dimensions have multiple hierarchies, then an attempt is made to consolidate these hierarchies to reduce the number of virtual cubes that are optimized. In block 2748, the advisor component 122 determines filters. It is determined whether there are any filters that increase or decrease the optimization of a region of a virtual cube. For drillthrough queries, the optimization is restricted to the region of the cube model defined by cubes. In certain implementations, filters are derived from workload usage history.

In block 2750, the advisor component 122 gets a set of virtual cubes. In block 2752, the advisor component 122 optimizes one of the filtered virtual cubes, starting with a first virtual cube. In block 2754, the advisor component 122 determines whether there is another virtual cube to process. If so, processing loops back to block 2752, otherwise, processing is done.

That is, each virtual cube in a set of virtual cubes is optimized. The number of virtual cubes is determined by the number of hierarchies remaining after the hierarchy consolidation step. In certain implementations, the resources available are divided equally among the virtual cubes. In certain other implementations, more resources are provided to the virtual cubes that are larger, which are deemed more important because there are cubes defined or based on usage history. The advisor component 122 loops through each virtual cube performing the appropriate optimization.

Figure 27C:
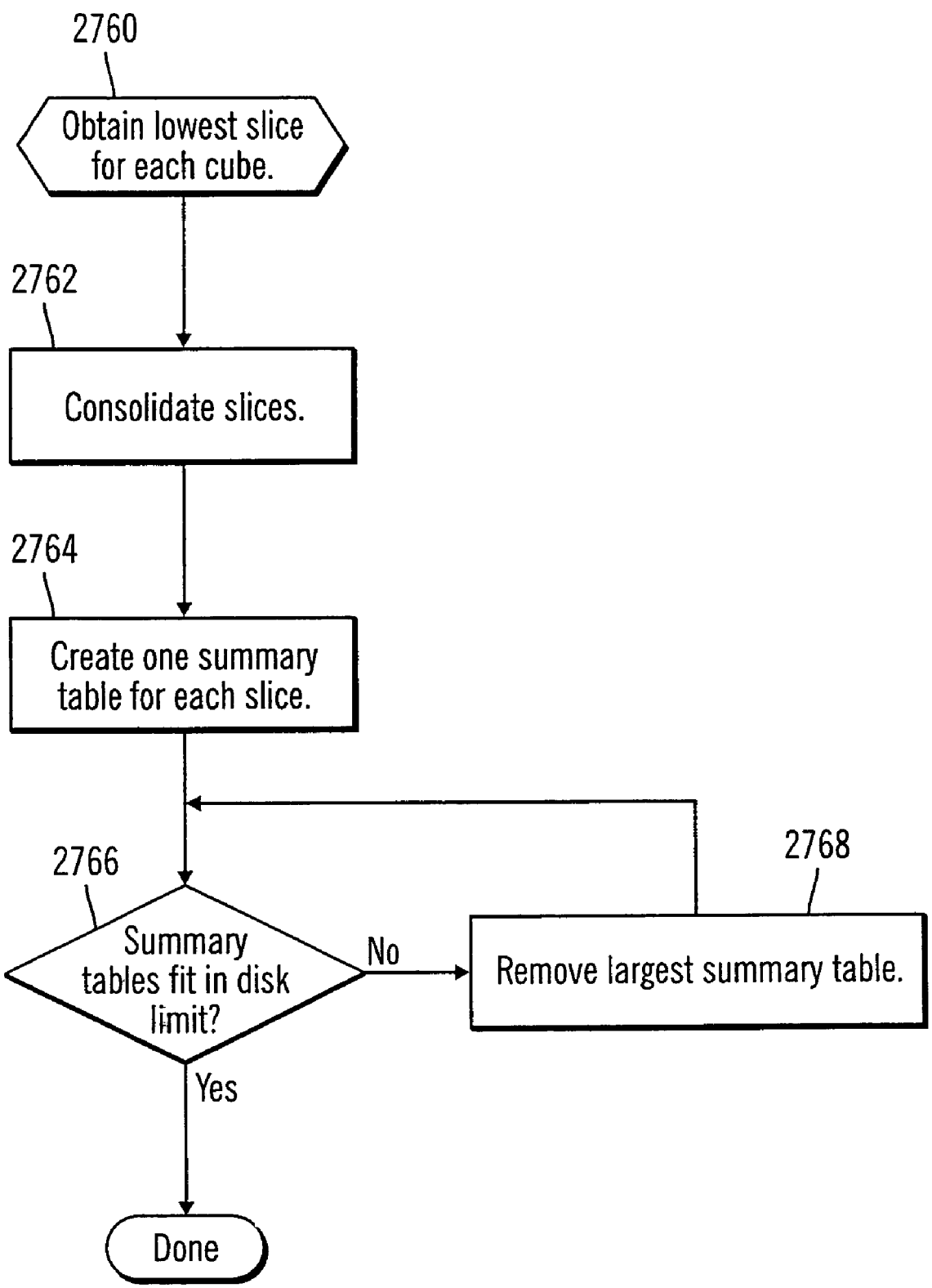

FIG. 27C illustrates logic for optimization of extract queries in accordance with certain implementations of the invention. In certain implementations, the advisor component 122 initially verifies that there are cubes associated with the cube model. If there are no such cubes, then the advisor component 122 reports an error.

In FIG. 27C, control begins at block 2760 with the advisor component 122 obtaining a lowest slice (i.e., a bottom slice) for each cube based on the cube model. In certain implementations, for an extract query, the advisor component 122 analyzes the details of the cubes created for the cube model and generates slice candidates. For each cube, a slice candidate is created from the lowest level of each cube hierarchy in the cube.

In block 2762, the advisor component 122 consolidates slices. Any duplicate slice candidates are removed. In certain implementations, slices are consolidated if they are a subset of other slices. Slice consolidation can also be done by creating a lower level slice that can satisfy two or more other candidate slices.

In block 2764, the advisor component 122 makes one summary table for each slice. That is, each remaining slice becomes a summary table. In block 2766, the advisor component 122 determines whether the summary tables fit in the disk limit. If there is a diskspace limit, for each summary table, the amount of diskspace used is estimated. If so, processing is done, otherwise, processing continues to block 2768. In block 2768, the advisor component 122 removes the largest summary table, and processing loops back to block 2766. In certain implementations, metadata is used to distinguish between regular cubes (e.g., Essbase™ cubes and hybrid cubes) so that better optimization may be done for drillthrough queries. In certain implementations, the advisor component 122 also estimates improvement based on the recommended summary tables remaining on the list.

Figure 27D:
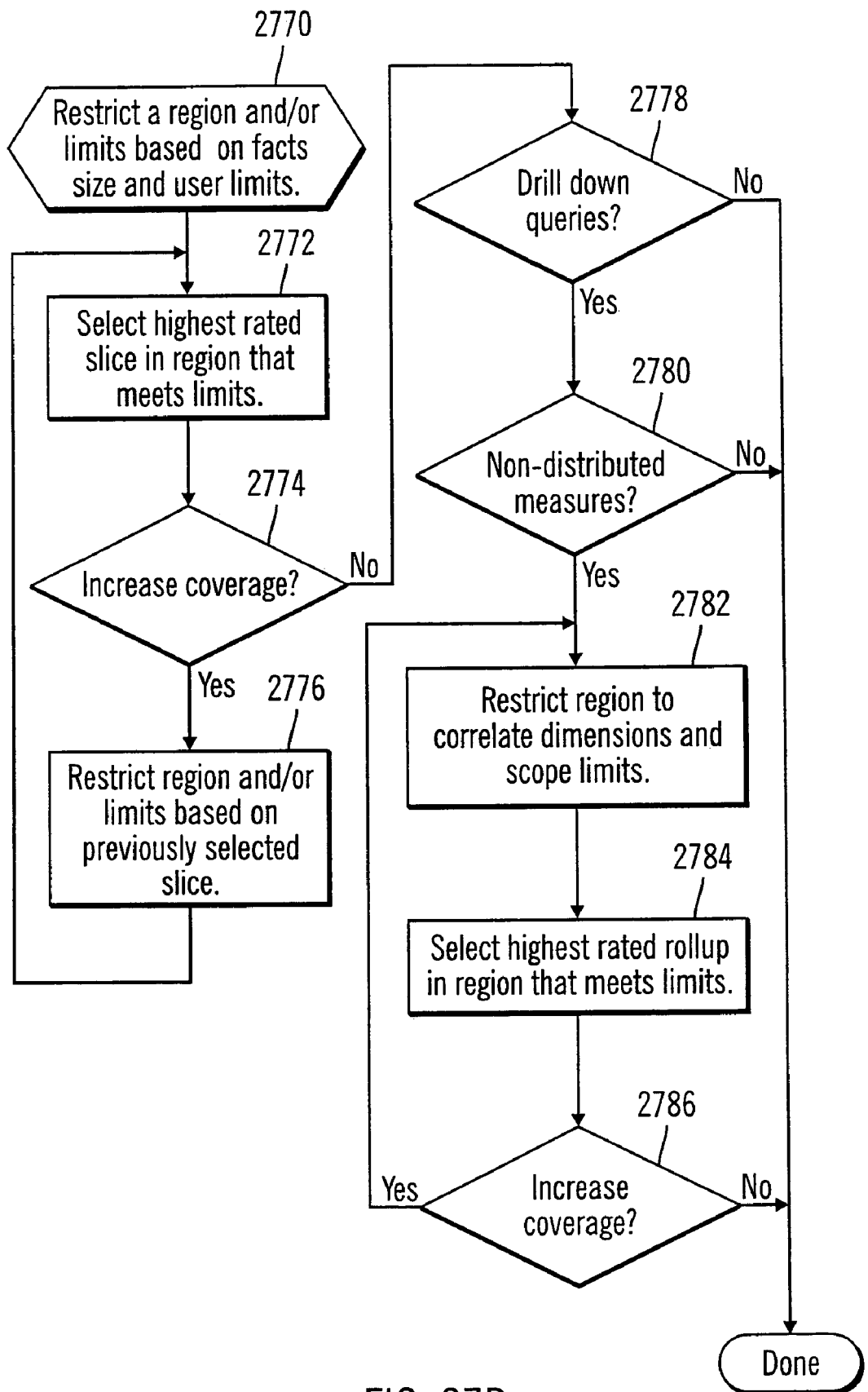

FIG. 27D illustrates logic for optimization of a virtual cube in accordance with certain implementations of the invention. The optimization of a virtual cube involves selecting the appropriate set of slices and, optionally, rollups. Slices are selected for any query type. Rollups are used if drilldown queries were specified and there are non-distributed measures. Slices are more efficient because they require less space and aggregation computation. However, queries containing non-distributive measures can only be rerouted if there is an exact match. So when necessary, the more expensive rollups are used.

One technique for selecting slices is to pick stacked slices. An alternative technique is to select crossing slices. FIG. 27D illustrates logic for selecting stacked slices merely for illustration of one technique, however, it is to be understood that the invention may be practiced with other techniques for selecting slices without departing from the scope of the invention. When evaluating slices and rollups one consideration is whether the slices and rollups meet predefined limitations. These limitations, which are checked in several places in the logic include, for example: 1) limits imposed by the user, such as disk space restrictions; 2) advisor limits, such as row limits to ensure slices are sufficiently different in size to make their existence worthwhile; and, 3) system limits, such as the maximum number of columns that can be in a table.

In FIG. 27D, control begins at block 2770 with the advisor component 122 restricting a region and/or limits based on facts size and user limits. In block 2772, the advisor component 122 selects the highest rated slice in the region that meets the limits. In block 2774, the advisor component 122 determines whether there should be an increase in coverage. If so, processing continues to block 2776, otherwise, processing continues to block 2778. In block 2776, the advisor component 122 restricts the region and/or limits based on a previously selected slice. FIGS. 26B and 26C illustrate slices and ROLLUP slices in accordance with certain implementations of the invention. For example, in FIG. 26B, a region 2610 is selected, a slice 2612 in the region 2610 is selected, a region 2614 above the slice 2612 is selected, and another slice 2616 is selected.

In particular, a slice is selected by selecting a region of the cube model that the slice must reside in, establishing limits that restrict the slice (e.g., diskspace and row count), and iterating through the slices within the region looking for the highest rated slice that meets the limits until there is sufficient coverage. The amount of slices required is dependent on several factors, including, for example, the size of the base tables and how optimized the queries are to be. On the initial pass, the region to be optimized is the entire virtual cube. The diskspace limit is set based on the user provided value. The row limit is set to be 10× less than the number of fact rows. The logic iteratively drills down one level at a time. For each drill, the possible slices are rated and the highest rated slice selected. The looping stops when no more levels can be drilled because the limits have been reached or the bottom slice of the region has been selected. On subsequent passes, the region is restricted to the subset of the virtual cube that is at or above the previously selected slice. The limits for diskspace and row count are set to a value (10×-100×) less than the previously selected slice. Once sufficient coverage has been provided the loop exits.

In block 2778, the advisor component 122 determines whether there are drilldown queries. If so, processing continues to block 2780, otherwise, processing is done. In block 2780, the advisor component 122 determines whether there are non-distributed measures. If so, processing continues to block 2782, otherwise, processing is done. In block 2782, the advisor component 122 restricts the region to correlated dimensions and scope limits. In block 2784, the advisor component 122 selects the highest rated rollup in the region that meets the limits. In block 2786, the advisor component 122 determines whether there should be an increase in coverage. If so, processing loops back to block 2772, otherwise, processing is done. For example, in FIG. 26C, a region 2620 is selected, a rollup 2622 in the region 2622 is selected, another region 2624 is selected, and another rollup 2626 in the region 2624 is selected.

Drilldown queries may require faster response times than report queries, so more slices may be recommended for them. When drillthrough queries are specified, only lower slices are selected and crossing slices may be more optimal. For drilldown queries, if there are non-distributive measures, then one or more rollups may be generated. Rollups can be very computationally complex and are constrained to a small number of dimensions. If the cube model has many dimensions, then several rollups may be created, each on a different subset of dimensions. When creating rollups, a set of dimensions that are highly correlated are selected. This means dimensions that tend to appear in queries together. This may be determined by looking at the dimensions contained in cubes or by usage metrics. A region is specified to cover a set of correlated dimensions. Then, the best rated rollup that meets limits and is within the region is selected. The process repeats, selecting additional sets of related dimensions to be regions and selecting the best rollup within the region. The processing stops when either resources have been exhausted or sufficient coverage provided.

In certain implementations, for drillthrough queries, the advisor component 122 will first attempt to select a slice that corresponds to the bottom of the region to be optimized. If this slice meets the diskspace restriction, then this slice will be used. Additional crossing slices will be chosen from candidate slices with the highest dimensional cardinality. In certain implementations, metadata is used to distinguish between pure multidimensional OLAP (MOLAP) and hybrid (HOLAP) cubes so that better optimization can be done of drillthrough queries.

Figure 27E:
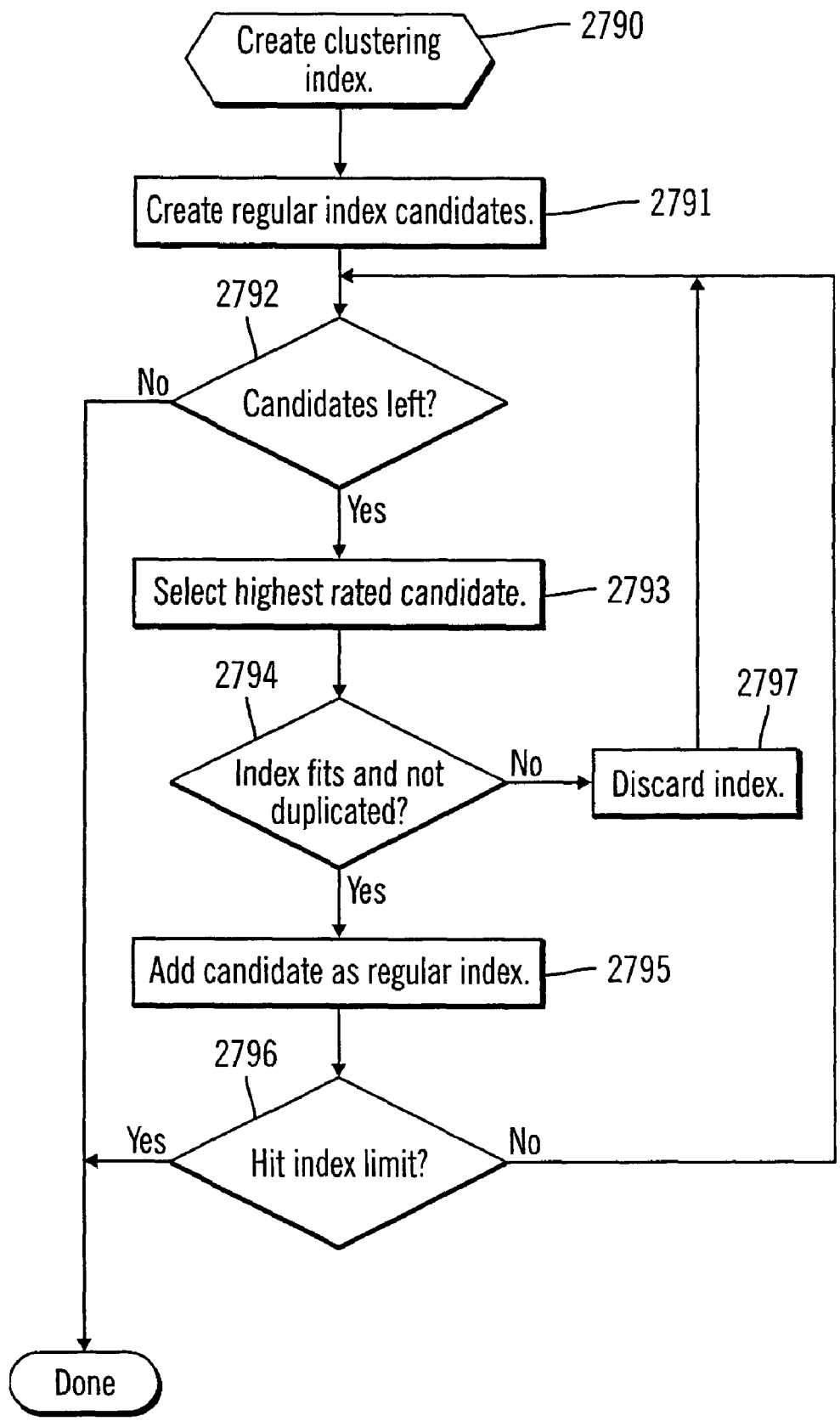
Figure 28A:
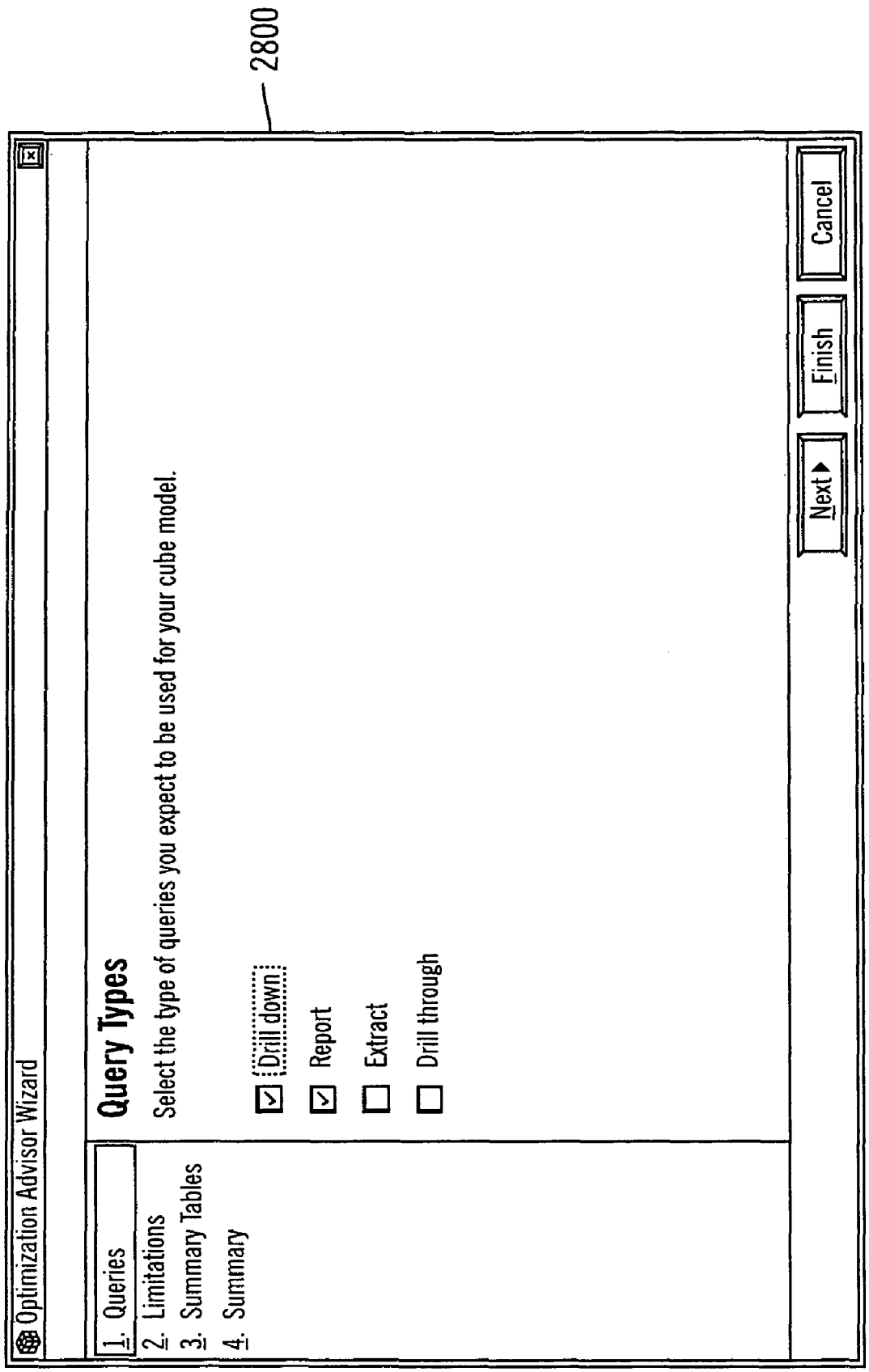
FIGS. 28A-28D illustrate a user interface that may be used to create a request to the advisor component in accordance with certain implementations of the invention.
Figure 28B:
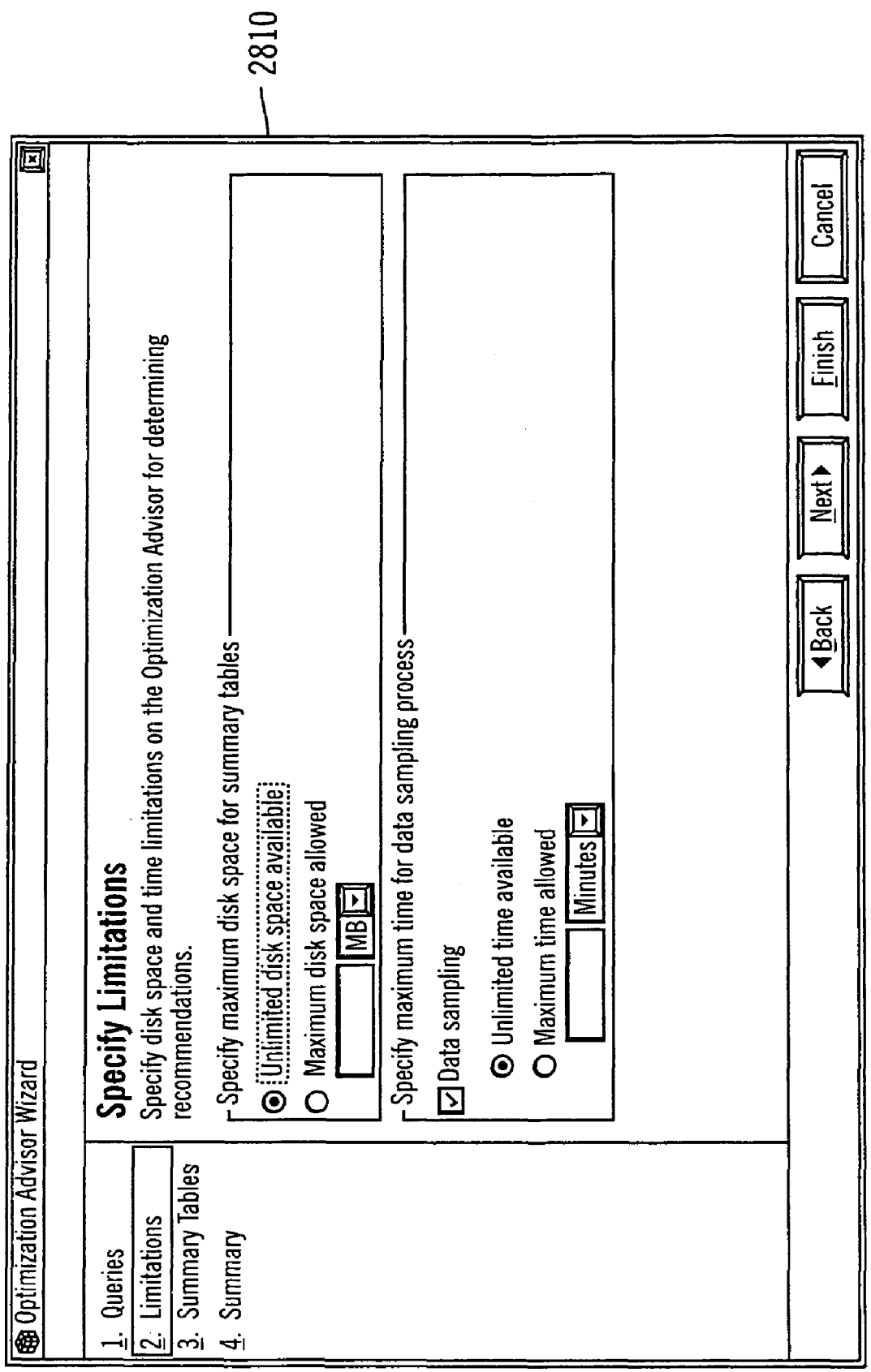
Figure 28C:
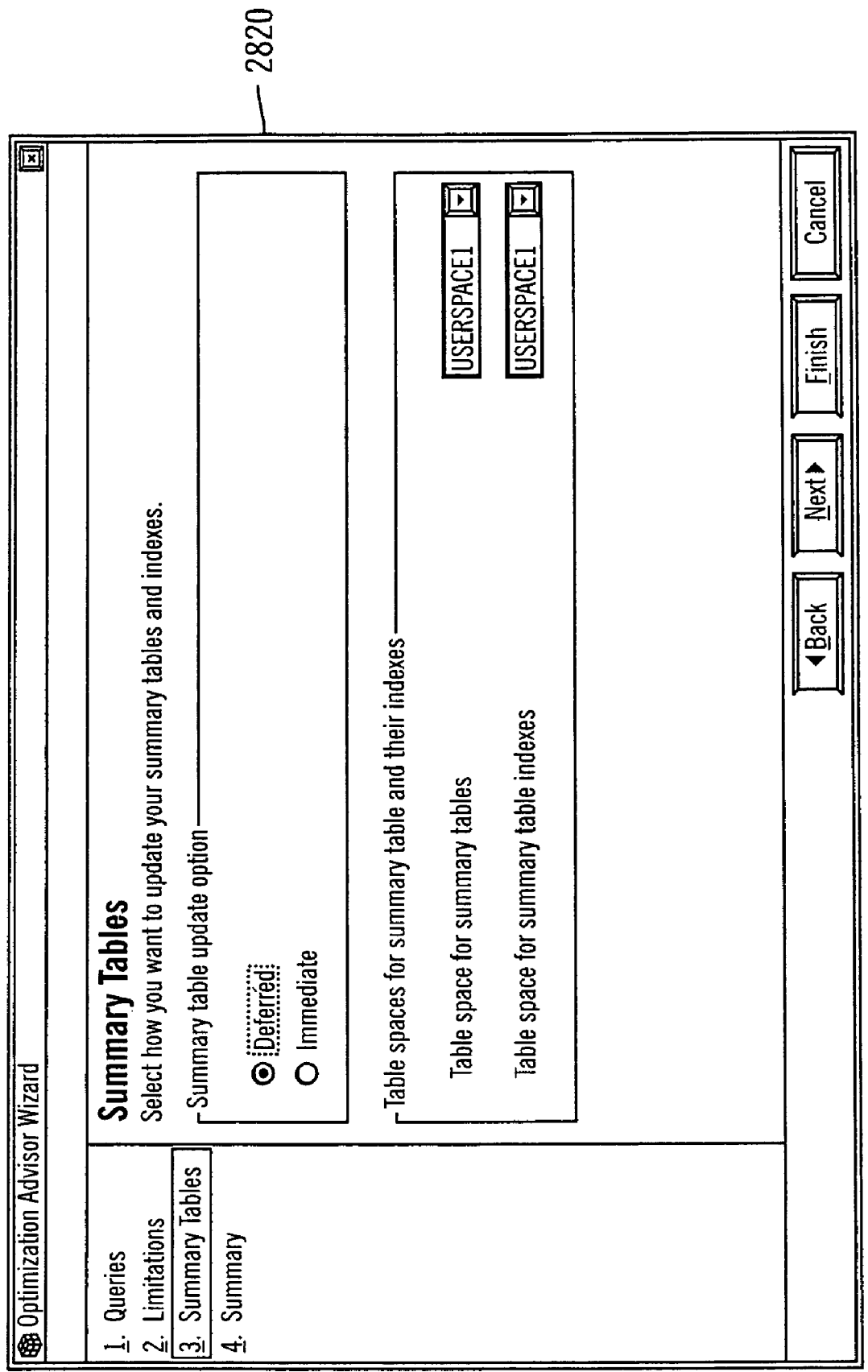
Figure 28D:
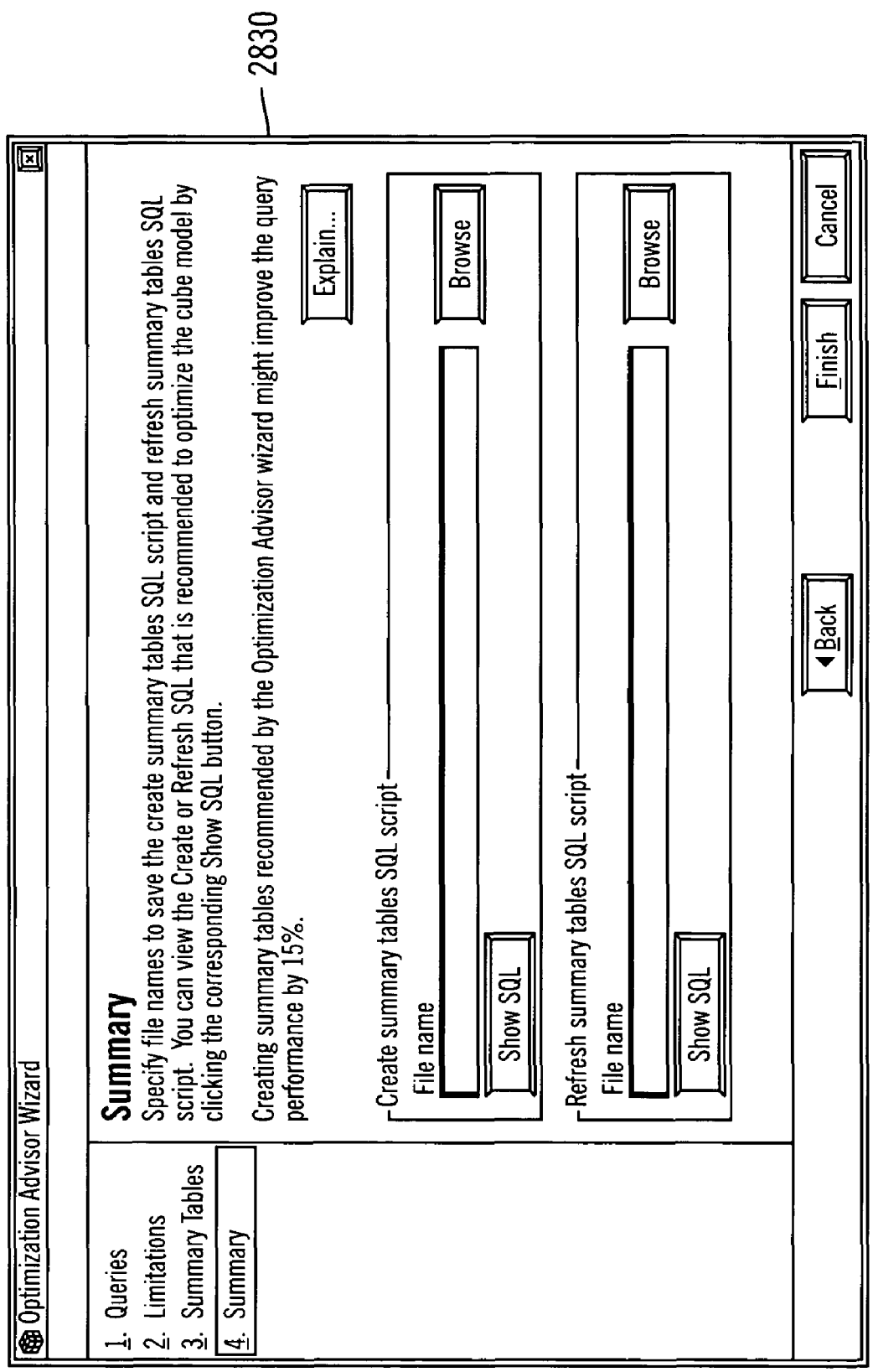

FIG. 27E illustrates logic for defining one or more indexes for the one or more summary tables in accordance with certain implementations of the invention. Creating one or more indexes consists of two parts: creating the clustering index and creating the regular (non-clustering) indexes.

In FIG. 27E, control begins at block 2790 with the advisor component 122 creating a clustering index. As for creating the clustering index, in certain implementations, a hierarchy index is created from one of the hierarchies to serve as the clustering index. If possible, a hierarchy from the Time dimension is used. If there is more than one hierarchy fitting this criteria, then the Time dimension hierarchy with the highest cardinality is used. If there is no Time dimension, then the hierarchy with the highest cardinality, compared to any of the other hierarchies in the cube model. If the clustering index fits within the diskspace limit allotted for the indexes, then this is used as a clustering index for the summary table. In certain implementations, if the selected clustering index does not fit in the index diskspace limit, no clustering index is defined.

In block 2791, the advisor component 122 creates regular index candidates. In block 2792, the advisor component 122 determines whether there are any candidates left. If so, processing continues to block 2793, otherwise, processing is done. In block 2793, the advisor component 122 selects the highest rated candidate. In block 2794, the advisor component 122 determines whether the index fits and is not a duplicate of the clustering index or other index selected for the summary table. If so, processing continues to block 2795, otherwise, processing continues to block 2797 and the index is discarded. In block 2795, the advisor component 122 adds the candidate as a regular index. In block 2796, the advisor component 122 determines whether the index limit has been reached. If so, processing is done, otherwise, processing loops back to block 2792.

As for creating normal indexes, hierarchy indexes are created out of each of the hierarchies represented in the summary table to form a list of potential indexes for the summary table. From the list of potential indexes, indexes are selected for the summary table. In certain implementations, all of the indexes are hierarchy indexes, and the indexes that are selected are the ones with the highest cardinality on the bottom level. If the estimated index size fits within the index diskspace limit, and is not a duplicate of the clustering index or any other indexes selected for the summary table, then the index is added as a regular index, otherwise, the index is discarded and another index is selected. As many indexes as can fit within the index diskspace limit are selected for the summary table. In certain implementations, a maximum of four indexes are selected.

FIGS. 28A-28D illustrate a user interface that may be used to create the XML request to the advisor component 122 in accordance with certain implementations of the invention. In user interface 2800, a user may select one or more query types from the list consisting of: drilldown, report, extract, and drillthrough. In user interface 2810, a user may specify limitations, such as maximum diskspace or maximum time for data sampling process. In user interface 2820, may indicate how summary tables are to be updated and specify table spaces for summary tables and their indexes. In user interface 2830, a user may specify file names to save the create summary tables SQL script and the refresh summary tables SQL script. In user interface 2830, there is a button for explain that will show information about the processing that was done and the resulting aggregations.

The following table 29 lists the metadata objects and for each shows how the metadata object affects the optimization process in accordance with certain implementations of the invention.

TABLE 29

| Object | Affect on Optimization |
| --- | --- |
| Cube Model | The object that is being optimized. |
| Join | Joins generally do not impact the optimization. The required joins will be included in the generated SQL. The number of joins eliminated may be considered as part of the evaluation of determining the cost of the queries without the presence of the summary table. |
| Facts | Individual measures are considered within the facts. |
| Dimension | Dimensions and their hierarchies determine the virtual cubes which are optimized. Time dimensions are given preferential treatment and are considered good candidates for clustered indexes and are given priority when selecting aggregations. |
| Hierarchy | Hierarchies are useful in the optimization process. The number and depth of the hierarchies has a large affect on the complexity of optimizing and how complex the resulting recommended summary tables are. The time required to develop recommendations increases when there are more hierarchies or deeper hierarchies because this increases the number of possible slices that must be considered. The advisor component 122 attempts to consolidate multiple hierarchies within a dimension. When the advisor component 122 is unable to do so, then the advisor component 122 optimizes a larger number of virtual cubes. Network hierarchies are transformed into regular hierarchies. Recursive hierarchies are ignored. |
| Attribute Relationship | Use to determine which additional attributes should be brought into the summary table. |
| Attribute | Attribute widths and nullability are used to calculate summary table and index widths. Attribute widths and nullability are used to rate the desirability of including the attribute in an aggregation. If there are nullable attributes, then each summary table will contain a single one-slice aggregation. |
| Measure | Measure widths and nullability are used to calculate summary table widths. The aggregations used in measures are analyzed to determine what type of aggregations to do. Categories of measures include symmetric versus asymmetric and distributive versus non-distributive. Each of these affects subsequent optimization. If all measures are distributive, then a small number of slice aggregations are created. If there are non-distributive measures, then a large number of contiguous slices (rollups) will be recommended. |
| Cube | If optimizing for extract queries, then the cubes are used to determine which slice needs to be optimized. If optimizing for drillthrough queries, the cube is used as a filter to restrict which portions of the cube model to optimize. The cube can also be used to provide hints about which dimensions and measures are closely correlated because they are referenced from the same cube. |
| Cube Facts | Use to rate the relative importance of measures. Measures that appear in multiple cubes are rated higher. |
| Cube Dimension | Use to rate the correlation between dimensions. Dimensions that appear in the same cubes are considered to be synergistic and are considered a higher priority to have in the same summary table. |
| Cube Hierarchy | Use to determine the slices that should be defined for extract queries. Map to regular hierarchies. |

C.3.2 Aggregate Consideration

Figure 29:
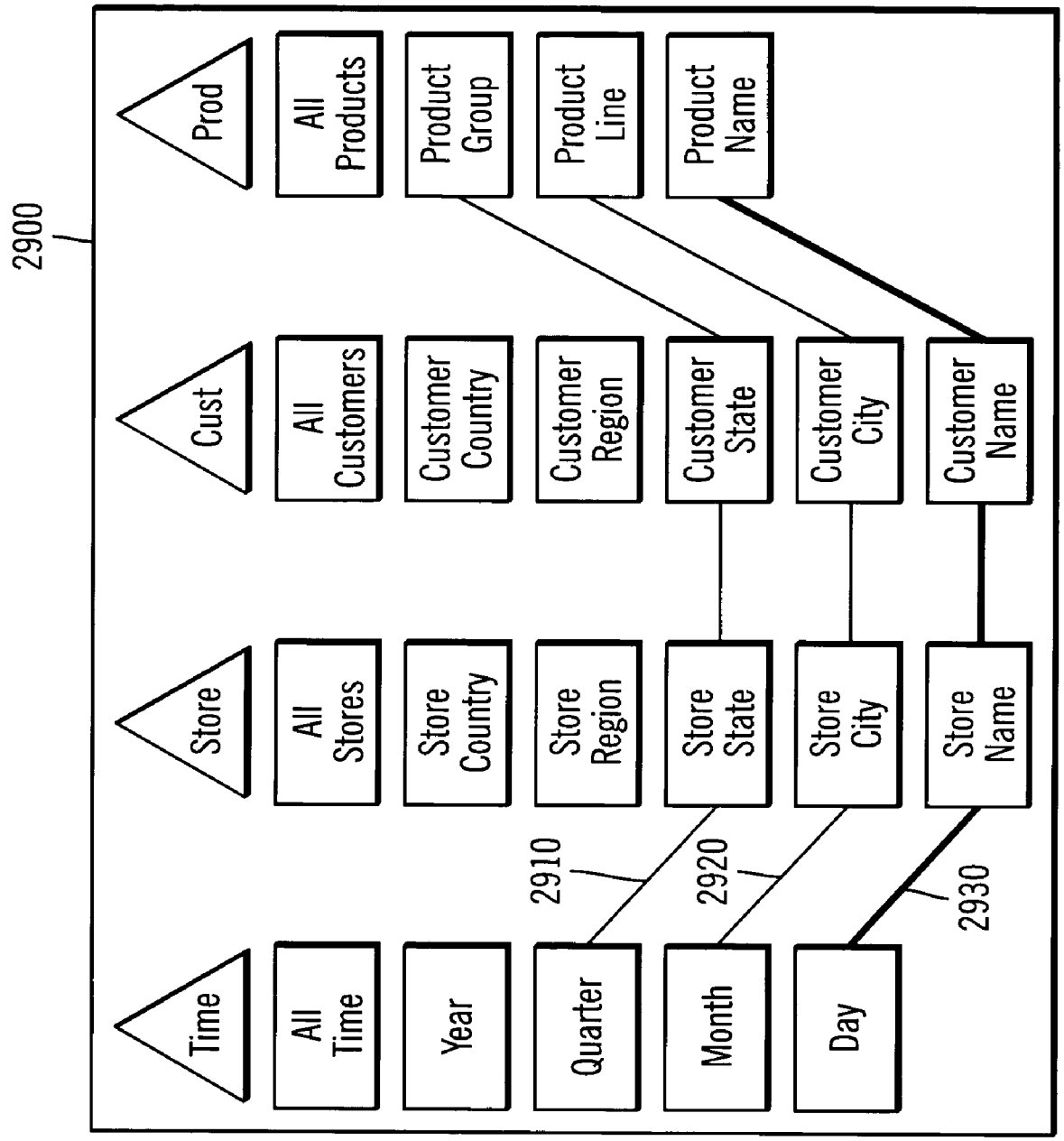
FIG. 29 illustrates a representation of a cube in accordance with certain implementations of the invention.

The number of potential aggregate slices in a cube model can be enormous. A slice is defined as selecting one level from each dimension hierarchy. FIG. 29 illustrates a representation of a cube 2900 in accordance with certain implementations of the invention. The cube 2900 illustrated in FIG. 29 has 4 dimensions that contain 5, 6, 6, 4 levels respectively (including the top "all" level). That means cube 2900 has 720 possible slices (5*6*6*4). This number grows rapidly as the number of dimensions increases. For models that have over 15 dimensions, it is common to have over 1,000,000 potential slices. Thus, it is efficient to minimize both the number of slices included in list of summary tables and the number of slices analyzed to determine if they should be included in the list of summary tables.

Since RDBMS 110 can dynamically aggregate from one slice to one that is logically higher, not all slices need to be included in the list of summary tables. Consider the slices shown in FIG. 29. There are two slices 2910, 2920 indicated by thin lines. Additionally, the thick line 2930 represents the grain of the datamart. The quarter-store state-customer state-product group slice is at or above the month-store city-customer city-product line slice. This allows the RDBMS 110 to build the slices faster because one can be built from the other. This may be referred to as "stacking." A stacked slice can be aggregated from a lower slice.

Figure 30:
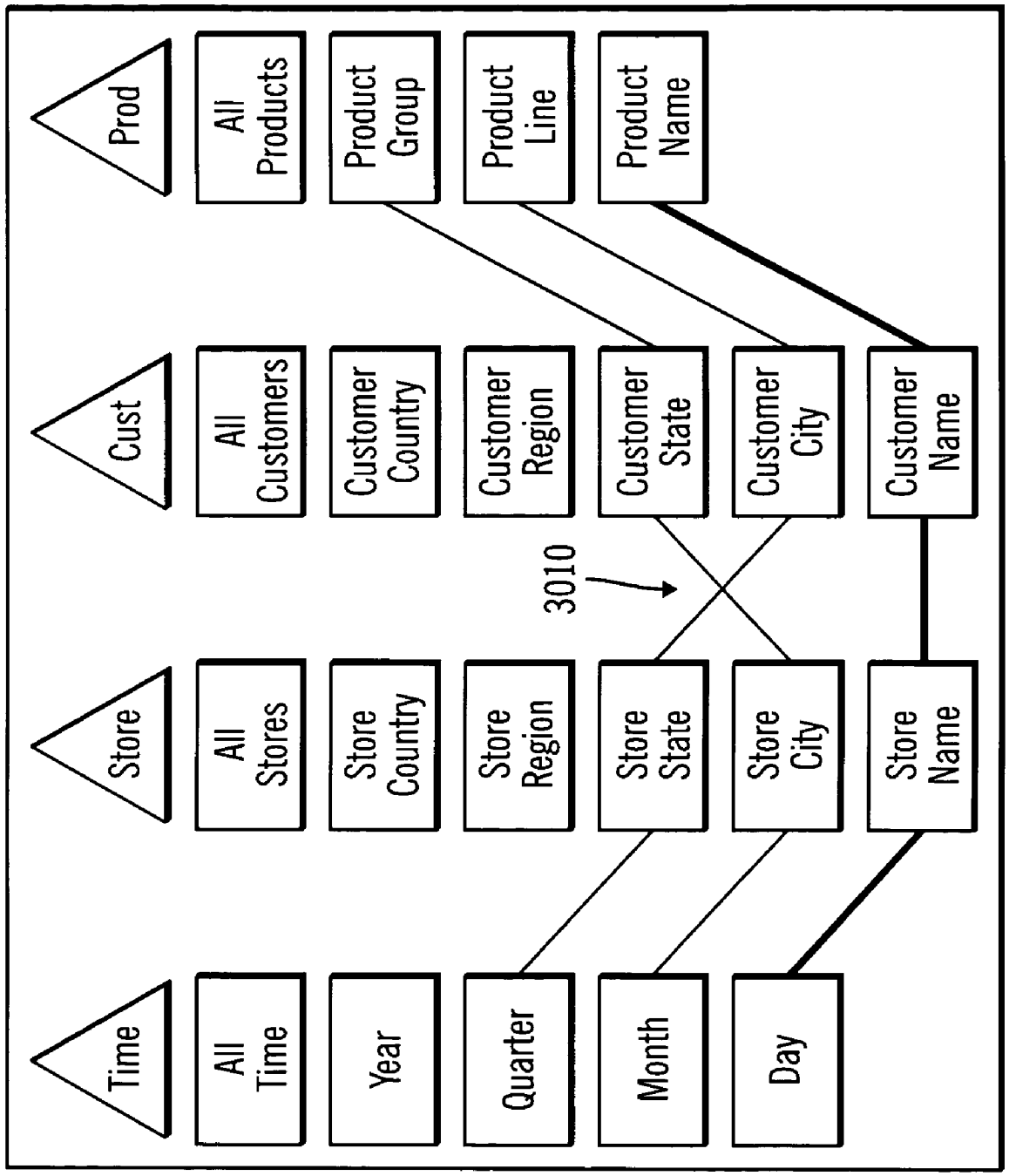
FIG. 30 illustrates a cube in which slices cross each other in accordance with certain implementations of the invention.

FIG. 30 illustrates a cube in which slices cross each other in accordance with certain implementations of the invention. In FIG. 30, there are crossing lines 3010 between the slices. Neither slice can be built from the other. The slice that uses store state needs to build from store city but the slice that has store city also includes customer state, which would be built from customer city. The advisor component 122 avoids recommending summary table slices such as these because it increases the cost of creating and maintaining the summary tables. Furthermore, by focusing on non-crossing slices the advisor component 122 is able to dramatically reduce the number of slices that could be built and even the number that are analyzed.

The number of non-crossing slices is much less than the number of total possible slices. The possible slices increase based on the product of the levels in the dimensions. The number of non-crossing slices is equal to the number of levels that can be drilled to plus one. The number of drillable levels in each dimension is the number of non-all levels. For the example illustrated in FIG. 30, there are 18 non-crossing slices (4+5+5+3+1).

The advisor component 122 analyzes slices to identify slices to be in the list of recommended summary tables. The advisor component 122 attempts to provide reasonable recommendations quickly. The technique used by the advisor component 122 is to move one level down at a time. That is, the advisor component 122 considers the slices that it could drill to and rates each of these candidate slices. The advisor component 122 will drill to the highest rated candidate. So with four dimensions, the advisor component 122 might compare the four slices that are possible by drilling down one level. Once the advisor component 122 decides to "drill-down" a level, the advisor component 122 no longer considers the higher levels in that hierarchy. By only considering non-crossing slices, the number of slices that are analyzed by the advisor component 122 is substantially reduced. However, it is useful to look at more than the minimum non-crossing slices so that in selecting one slice for a summary table, several slices are considered and compared from a performance perspective, which includes comparing estimated size and other metrics.

The advisor component 122 calculates the space required for slices that should be considered. A cost (e.g., diskspace and build time) is assigned for each slice. Additionally, a benefit (e.g., estimate of query improvement) is assigned for each slice. Moreover, a number of members per level is determined. Sparsity ratings are determined. The advisor component 122 then determines if multiple slices should be put into a summary table or if there should be one slice per summary table. Moreover, in certain implementations, the advisor component 122 avoids generating too many summary tables since when there are many candidate summary tables (e.g., 20 or more), compile time increases. The advisor component 122 makes use of specific information within the database catalog, including, for example, statistics. The advisor component 122 generates summary tables that contain ROLLUP slices if the cube model contains non-distributive measures, such as standard deviation. The advisor component 122 ensures that the lowest aggregation built is above the grain of the base tables. This can be done by estimating the row counts of the base slice and candidate slices. Moreover, the advisor component 122 does not build a slice that corresponds to the grain of the warehouse. The advisor component 122 ignores dimensions that do not have hierarchies.

The following illustrate formulas used to estimate certain metrics:

Possible slices=(# levels in dim1* . . . * # levels in dimN)
Slices considered<=# dimensions*(# drill levels in dim1+ . . . +# drill levels in dimN)
Non-crossing slices=(# drill levels in dim1+ . . . +# drill levels in dimN)

C.3.3 Aggregate Size Estimations

The following illustrates a formula used to estimate the size of the summary table:

Summary Table Size=(Summary Table Row Size)*(Number of Rows in Summary Table)

To obtain the summary table Row Size, a PREPARE (supported by RDBMS 110) of the summary table is performed to select statement to get the columns of the summary table. The lengths of each of the summary table columns is summed to get the size of one summary table row.

There are several alternatives for estimating the number (#) of rows in the summary table. In certain implementations, a sampling of the one or more fact tables and the summary table query is used to get a sample of the summary table, and the full amount is extrapolated by multiplying the result by 1/(sampling rate).

In certain implementations, the sampling statement is performed for the summary table at increasing sampling rates. The trend of the sampling results at increasing rates is used to try to extrapolate the result of the summary table statement at 100% sampling. For example, suppose a 1% sample results in 10,000 rows and a 10% sample results in 30,000 rows. The 10× increase in sampling data resulted in a 3× increase in rows. If the trend continues, then assume that going from 10% to 100% sampling (another 10×increase) will result in another 3× increase in rows. In certain implementations, this will not be a linear relationship, and, most likely when going from 0.01% to 0.1% to 1% to 10% to 100% (each of which is a 10× increase in sampled rows), the increase in the aggregated rows will tend to flatten. So in the first increase of sampling, the aggregated row count might increase 7×, but by the last summary table interval, the aggregated row count might only increase 2×.

In certain implementations, a further improvement is to adjust the estimate based on where the slice is in the hierarchies. The higher a slice in the hierarchies, the more rapidly an estimated row count approaches the actual row count. The summary table select statement can be prepared by the relational database to get the estimated number of rows of the summary table. This value may be adjusted based on position of the levels in the summary table.

If the summary table consists of only 1 slice, the maximum cardinality of the summary table can be calculated by determining the cardinalities of each dimension at the level of the summary table slice and multiplying the cardinalities together. The actual number of rows of a summary table usually will not be the maximum cardinality. So an estimate of the number of summary table rows may be determined by creating a multiplier for the maximum cardinality, based on the levels of the slice and their position in the hierarchies of the cube model, and the number of rows in the base fact table.

There are several techniques for improving the efficiency of sampling. For example, when creating the sampling statement for the summary table, the measures in the sampling statement are not included. The result of the measures from the sample are not needed, only the count of rows resulting from the sampling statement. This reduces the amount of processing that needs to be done during the sampling statement. Also, a sample of the data taken from the base tables may be put into a temporary table, which can then be reused. This may be faster than having to resample from the base tables multiple times.

In certain implementations, the slice max cardinality is obtained by multiplying the max cardinalities of the levels; level max cardinality is obtained by multiplying the max cardinalities of the attributes; and, from the top of the hierarchy to the attribute specified by level, the attribute max cardinality is read from database statistics.

The advisor component 122 provides an explanation of why it choose the recommendations. The following are sample messages that the advisor component 122 may return as explanations: 1) Summary tables have not been defined as refresh immediate because the model contains non-distributive measures; 2) Database statistics were not available for some tables or columns; 3) Dimension &1 had &2 hierarchies consolidated into &3 hierarchies; and, 4) Clustered index was defined by selecting the highest cardinality columns.

C.3.4 Multiple Hierarchies

Dimensions can contain multiple hierarchies. If a cube model has dimensions with multiple hierarchies, then the cube model contains multiple virtual cubes. A virtual cube is a unique combination of dimension hierarchies. If there are five dimensions with 1, 1, 2, 1, 3 hierarchies respectively then there are 1*1*2*1*3=6 virtual cubes. This complicates the optimization since aggregates built for one virtual cube may not be able to be used by another virtual cube. Therefore, a separate summary table is built for each virtual cube.

To maximize the sharing of aggregates among virtual cubes, optimization consolidates hierarchies. In certain implementations, the optimization process is performed by the advisor component 122. Consolidation of hierarchies is done by comparing the attributes from multiple hierarchies within the same dimension. An attempt is made to replace multiple hierarchies with a single virtual hierarchy that contains an appropriate set of attributes from each hierarchy. This ensures the summary table can satisfy any of the hierarchies. There are a number of relationships that can exist between hierarchies. Table 30 provides some examples where Hn (with n being equal to an integer or character for use as an identifier) refers to a hierarchy.

TABLE 30

| Hierarchy Scenario | Optimization |
| --- | --- |
| H1 and H2 have no attributes in common<br>H1 = calendarYear, calendarMonth, calendarDay<br>H2 = fiscalYear, fiscalMonth, fiscalWeek | Since there are no attributes in common, there is no consolidation. The hierarchies will remain separate and the advisor component 122 will process the hierarchies as separate virtual cubes. |
| H2 is subset from H1 by removing lowest level attribute<br>H1 = Country, State, City, Customer | These hierarchies can be merged into a new hierarchy:<br>Hx = Country, State, City, Customer.<br>The new hierarchy Hx satisfies |

TABLE 30-continued

| Hierarchy Scenario | Optimization |
| --- | --- |
| H2 = Country, State, City | both hierarchies H1 and H2. Since the attributes country, state, and city were used in multiple hierarchies they will be rated higher when selecting aggregations. |
| H2 and H3 are subsets of H1<br>H1 = year, quarter, month, day<br>H2 = year, quarter, month<br>H3 = year, month | These hierarchies H1, H2, and H3 can be merged into a new hierarchy Hx = year, quarter, month, day. This hierarchy Hx satisfies all hierarchies.<br>Since year and month attributes appear in all three hierarchies H1, H2, and H3, the advisor component 122 considers it high priority to put the common attributes in the summary table. |
| H1 and H2 have a common attribute at the lowest level<br>H1 = Country, State, City, CustomerId<br>H2 = CustomerGroup, CustomerType, CustomerId | These hierarchies can be merged into a new hierarchy, but since the shared attribute is at the bottom of the hierarchy, the cardinality might be so high that it would make the summary table too large. The advisor component 122 will determine whether to consolidate this hierarchy based on the cardinality of the hierarchies if they were merged compared to the cardinality of the facts. |
| H1 and H2 have the same attribute as the top level<br>H1 = year, quarterOfYear, monthOfYear, dayOfMonth<br>H2 = year, weekOfYear, dayOfWeek | Since the only attribute the hierarchies have in common is at the top level, consolidating may not be useful. So, the hierarchies are not consolidated and are processed as separate virtual cubes. |

If the hierarchies contain the same attributes, but in the opposite order, and if there are non-distributive measures, then ROLLUP slices may be generated instead of consolidating hierarchies.

C.3.5 Symmetric Vs Asymmetric Measures

Measures can be classified as symmetric, when a single aggregation function is applied to all dimensions, or asymmetric, when multiple aggregation functions are applied. If the cube model only contains symmetric measures, a simple select statement is able to calculate such measures. Likewise, the optimization will use a simple select statement to optimize all the measures. If the cube model has asymmetric measures, a multi-step select is performed for each set of compatible measures. For this type of measure, the innermost select statement can be optimized by creating a summary table that matches the asymmetric measure. If the innermost select statement is aggregating a very small number of dimensions, compared to the number of dimensions in the cube model, this approach may be too expensive.

In certain implementations, the incompatible measures may be combined by restructuring aggregation steps so that they are compatible (which is also referred to as "nesting"). Initially, a set of measures are accessed. The next measure in the set of measures is selected, starting with one (e.g., the first). It is determined whether the measure is compatible with previous measures. For the first measure processed, the determination is that the measure is compatible (as there are no previous measures for the first measure). If the measure is not compatible, it is determined whether one or more measures may be rewritten so that the selected measure is compatible with the previous measures. If one or more measures may be rewritten, one or more measures are rewritten. Then, it is determined whether there is another measure to be processed, and, if so, the next measure is processed. If there are no more measures, the rewritten measures are processed to generate a SQL statement for retrieving multidimensional information. If the selected measure is not compatible with previous measures, and cannot be rewritten, the measures are joined with another technique.

Symmetric and asymmetric measures are further described in the above cross-referenced application entitled "METHOD, SYSTEM, AND PROGRAM FOR SPECIFYING MULTIDIMENSIONAL CALCULATIONS FOR A RELATIONAL OLAP ENGINE, which is incorporated herein by reference in its entirety. In particular, the advisor component 122 addresses key problems in calculating multiple measures with a single SQL statement (i.e., symmetry of a measure, distributiveness of aggregation functions involved, and order dimensions appear in the aggregation script).

C.3.6 Network Hierarchies

In network hierarchies, any organization of attributes could be formed during query time, when the user is generating reports. Because of this nature, there is no parent-child relationship defined among the hierarchy attributes. The technique used to optimize this type of hierarchy is to create arbitrary parent-child relationships, and then use the same techniques for regular (i.e., non-network) hierarchies. To do that, two factors are taken into consideration: the cardinality of each attribute and the functional dependency among these attributes. It is desired to have low cardinality attributes towards the top of the hierarchy and also have functionally dependent attributes towards the top. Once this order is defined, the optimization for the hierarchy is performed as if this was a regular hierarchy.

C.3.7 Rating Slices

When considering several alternative slices, the slices are rated to determine which is the better candidate. In certain implementations, one or more of the following criteria are used to evaluate slices: 1) coverage, 2) space, 3) width, 4) column count, 5) nullability, 6) time, 7) usage history, 8) usage assumed, and 9) threshold.

As for coverage, a benefit of a slice is that if the slice is included in a summary table, then queries that use distributive measures can be satisfied by the summary table, provided the query is at or above the slice. This leads to the concept of coverage which is the number of slices of a virtual cube that are covered by a particular slice. The top slice (all levels in each hierarchy) only covers a single slice (the all slice). The bottom slice, which includes the lowest level of each hierarchy, covers all slices.

As for space, part of the cost of a slice is the diskspace required for the aggregations. As for width, the tablespace specified for the summary table determines the maximum row width. This is relevant when hierarchies have many large attribute relationships as the slices may become constrained by width before space.

As for column count, the number of columns may be considered, since there is a certain amount of fixed processing per column. As for nullability, columns that are nullable are considered less desirable. There is some overhead for dealing with nullable columns. Nullable columns also eliminate the possibility of using refresh immediate summary tables. As for time, the time dimension is considered an important dimension. A high percentage of queries are expected to use attributes from the time dimension.

As for usage history, if metrics are available that provide information about the usage patterns of slices, then usage history can be considered. Slices that provide coverage for frequently used queries would be rated higher. As for usage assumed, if no usage history is available, then the usage is surmised based on the types of queries. For example, drill-down queries will use the higher level slices far more often than lower level slices. Report style queries on the other hand tend to hit slices fairly evenly. Drillthrough queries tend to not access the upper level slices.

As for threshold, when the size or width limits are approached, the rating may be adjusted to weight these more heavily. In other words, when there is plenty of space available using more is not a critical issue. But if 90% of the space has been used, then additional usage is minimized.

When optimizing a virtual cube, there is a specified amount of diskspace available. In addition, the optimization is constrained by the width of the tablespace. As the code drills deeper into the cube model considering additional slices, the ability to drill deeper is constrained by how much space and width remain. Once either the space or width limits are reached then no more slices can be considered.

The following provide formulas for certain metrics:

Rating=(CoveragePoints+SizePoints+WidthPoints+OtherPoints)/3

CoveragePoints=Percent of slice combinations covered by this slice

SizePoints=Percent of diskspace still available

WidthPoints=Percent of tablespace width still available

OtherPoints=Additional points awarded for other characteristics such as being time dimension and non-nullable columns.

C.4 Index Strategy

An indexing strategy of the advisor component 122 consists of two parts: creating the clustering index and creating the non-clustering ("normal") indexes.

Several alternative strategies have been designed to determine an optimal index strategy for a summary table. A performance evaluation is done to identify one strategy as the optimal technique or to determine whether different techniques should be applied, depending on the cube model. There is a clustered index for each summary table. In addition there are several additional indexes.

C.4.1 Clustering Index

A clustered index is created on a subset of the attributes included in the summary table. A clustering index helps to keep the data in the table clustered according to the index, which can significantly reduce the number of I/Os on queries that hit that clustered index. Currently, a hierarchy index is created from one of the hierarchies to serve as the clustering index. In certain implementations, a hierarchy from the Time dimension is used because users typically drill by the Time dimension. If there is more than one hierarchy for the Time dimension, then the Time dimension hierarchy with the highest cardinality is used. If there is no Time dimension, then a hierarchy with the highest cardinality, compared to any of the other hierarchies in the cube model, is selected. Attributes can also be included from different hierarchies and different levels. Table 31 describes criteria used to determine which attributes to include in the clustered index in accordance with certain implementations of the invention.

TABLE 31

| Criteria | Description |
| --- | --- |
| High cardinality | Attributes with many discrete values allow the RDBMS 110 to quickly eliminate most rows from consideration. |

TABLE 31-continued

| Criteria | Description |
| --- | --- |
| Low correlation with other attributes | Including attributes that have low correlation with other attributes reduces rows quickly. |
| Top of a hierarchy | The higher up a hierarchy that an attribute is, the more likely that a rewritten query will include the attribute. This makes it more likely the index can be used. |
| Even distribution of data | If an attribute has data distributed evenly across its discrete values, then query performance should be more consistent than if the data is badly skewed. |
| Narrow width | If all other factors have been considered and it is necessary to decide between competing attributes, then the attribute that is narrower is selected to conserve space. |
| Time | Time attributes might be good candidates when the data will be extracted in new increments by time. |

In certain implementations, attributes are ordered in the index as follows: highest cardinality to lowest cardinality and upper levels of hierarchies to those in lower levels of hierarchies.

If the clustering index fits within the diskspace limit allotted for the indexes, then the clustering index is used for the summary table. In certain implementations, if the clustering index does not fit within the diskspace limit allotted for the indexes, then no clustering index is used.

C.4.2 Composite Index

A slice index is a composite index that includes attributes from different hierarchies. A slice index can be viewed as a horizontal index that is somewhat similar to a slice. For example, if a summary table contains dimensions for product, location and time, then a composite index might be built that includes the product line, state, and month attributes. The slice index follows the same criteria for attribute selection as the clustered index. Slice indexes are selected to complement the clustered index and to further enhance optimization.

A hierarchy index is a composite index that includes attributes from the same hierarchy. For each dimension hierarchy included in the summary table, a composite index is built. The attributes in the composite index are in the same order as they are in the hierarchy. For example, a hierarchy index created on the Time dimension could have its index columns in the following order: Year, Quarter, Month. Since there can be many dimensions, it the number of hierarchy indexes may be limited. The hierarchies that are the best candidates are those whose attributes have high cardinalities and low correlation.

Hierarchy indexes are created out of each of the hierarchies represented in the summary table to form a list of potential indexes for the summary table. From the list of potential indexes, indexes for the summary table are selected. In certain implementations, all of the indexes are hierarchy indexes, and the indexes that are selected are the ones with the highest cardinality, compared to any of the other hierarchies in the cube model.

If the estimated index size of a hierarchy index fits within the index diskspace limit, and is not a duplicate of the clustering index or any other indexes selected for the summary table, then the hierarchy index is added as an index. Otherwise, the hierarchy index is discarded and the next hierarchy index on the list of potential indexes is selected for a determination of whether the estimated index size fits within the index diskspace. In certain implementations, as many indexes as can fit within the index diskspace limit are selected for the summary table, up to a maximum of four.

C.4.3 Estimating Index Size

The index size estimate is based on the average size of the attributes used as index keys and the estimated number of rows in the summary table (which is explained in C.3.5 below). The following formula may be used to estimate index size:

(average index key size+8)*number of rows*2.

C.4.4 Index Rating

There are many different metrics to measure the effectiveness of an index. One metric could be an estimate of the cost of using the index. This can be determined by estimating what portion of the table will typically be read if a particular index exists. The following table 32 illustrates sample columns and some characteristics in accordance with certain implementations of the invention. Table 33 illustrates use of some sample indexes in accordance with certain implementations of the invention.

TABLE 32

| Column Name | Cardinality | Distribution |
| --- | --- | --- |
| Sex | 2 | Even |
| Age Group | 10 | Skewed |
| Year | 5 | Even |
| Quarter | 4 | Even |
| Month | 12 | Even |
| Cities | 100 | Skewed |
| Product | 1000 | Skewed |

TABLE 33

| Index Rating Index Columns | Leaf Cardinality | Rows Read | Notes |
| --- | --- | --- | --- |
| no index | 1 | 100.00% | With no index, the RDBMS 110 reads all rows and then applies predicates. |
| Sex | 2 | 50.00% | If predicate is on sex, the RDBMS 110 reads approximately half the rows. The RDBMS 110 may still perform a table scan. |
| Age Group | 10 | 10.00% | |
| Sex + Age Group | 2 * 10 | 5.00% | |
| Cities | 100 | 1.00% | One row in 100 is read. |
| Product | 1000 | 0.10% | |
| Product + Age Group | 1000 * 10 | 0.01% | One row in 1000 is read. |

Some factors which can be used to determine the effectiveness of a clustering index include, for example, calculating (#summary table rows)/(estimated index cardinality) to get an estimated average number of rows per index entry. A number is set (based on the number of summary table rows per page and tablespace prefetch size) to indicate a minimum number of useful rows fetched during one prefetch before it becomes advantageous to use prefetching. An index may be a useful clustering index if the average number of rows per index entry is at least above this number. So a very high cardinality index, with only one row per index entry, may not be a good clustering index. On the other hand, an index with one row per index entry might make a good non-clustering index because it reduces the number of rows searched so quickly. Among multiple possible indexes in which the average rows per index entry are above this defined number, the indexes with higher cardinality may make better clustering indexes, since the higher cardinality eliminates more rows from consideration.

Possible considerations for rating both clustering and non-clustering indexes include, for example, 1) rating indexes with time dimension attributes higher than other indexes; 2) even distribution of data among the index entries; and, 3) using the query type being optimized to determine what kind of indexes to use. In particular, data is often loaded in by time, which will make it easier to keep data clustered on time attributes. Also, queries often constrain on time, making it desirable to index time attributes. As for even distribution of data among the index entries, this can be approximated by sampling the distribution of data on the index keys and looking at the average and standard deviation of the sample. As for the query type being optimized being used to determine what kind of indexes to use, hierarchy indexes may be good for drilldown queries.

C.4.5 Additional Considerations

In certain implementations, there are a maximum of 16 columns in an index, and the width of the index does not exceed the database limit for index width. Performance may be improved by including the same attribute(s) in multiple indexes, but varying the order.

In certain implementations, some hierarchies have attributes whose values depend on other attributes. For example, for the hierarchy [year,quarter,month,day] the month value is January-March for the 1 st quarter, April-June for the 2nd quarter, etc.

In certain implementations, any attributes having a cardinality of one may not be included in the index, since queries on that attribute will not reduce the number of rows read.

In certain implementations, the advisor component 122 also considers creating indexes on the base fact and dimension tables. That is, it may be better to use the diskspace provided by the user to define indexes on the base tables rather than additional summary table aggregations. These indexes on the base tables can complement the summary tables that have been created, optimizing slices of the cube model which are not optimized by the summary tables.

In certain implementations, columns most often known are placed first in an index, assuming the columns have sufficient cardinality to be useful.

C.5 Referential Integrity

Most customers do not enforce referential integrity through the database due to the expense of the RDBMS 110 doing the additional checking. Most customers enforce integrity through the data warehouse process, if at all. In particular, having the referential integrity definitions can improve query performance for Decision Support Systems (DSS). In certain implementations in which the invention is implemented on a DB2® UDB RDBMS, a new informational constraint offered by the DB2® UDB RDBMS is used. The new information constraint allows a customer to promise the data is clean so the RDBMS 110 does not need to do any referential integrity checking, yet the RDBMS 110 will still perform semantic optimization.

The semantic optimization that the RDBMS 110 is able to perform is due to the fact that a query can take advantage of a summary table, even if the query refers to a subset of the tables involved in the summary table. Referential integrity allows the RDBMS 110 to determine that the absence of some tables and joins will not change the results of the measures. For instance, consider the scenario of FIG. 21 and a summary table created at a level described by dashed line 2110. This summary table will include tables and joins for all dimensions in the cube model. An example incoming query may be represented by line 2010 and will only reference tables and joins for the Store and Product dimensions at the Store State level and Product Line level, respectively. The query represented by line 2010 does not reference tables and joins for the Time and Customer dimensions once the query is at the All level. In this scenario, the RDBMS 110 determines, by using the referential integrity information, that the query can use the summary table, since the missing joins and tables will not affect the result of the measures.

C.6 Database Catalog Statistics

In certain implementations, the database optimizer of the RDBMS 110 uses statistics directly (such as using cardinalities in determining which columns to include in indexes), indirectly (by preparing SQL statements and getting estimated row counts returned by the database optimizer who uses the statistics to get the estimate), and sometimes not at all (such as when we use sampling). That is, the database optimizer of RDBMS 110 may use statistics contained in its database catalogs to make optimization decisions, such as whether to use a summary table or which index to use.

The advisor component 122 may use the statistics to recommend when a summary table should be reorganized or otherwise modified.

There are several design considerations for using database catalog statistics. The statistics associated with attributes may be read and used in determining which slices and indexes to create. If statistics are unavailable, then the advisor component 122 makes conservative assumptions, such as the column being low cardinality with equal distribution of values.

In a partitioned database, the statistics are an approximation obtained by multiplying the statistics for one node by the number of nodes. If statistics are unavailable, then a default cardinality may be assumed or sampling is performed. There are two reasons statistics could be unavailable for an attribute. One reason is if the RUNSTATS utility has not been run, and this would be unexpected as there are severe performance consequences of not having statistics. The second reason would be if the attribute is an expression.

There are two cardinalities of the attributes. There is the cardinality of the dimension table column and the cardinality of the aggregated data obtained by joining the fact and dimension tables. For example, the product name column in the product dimension table might have 20,000 products listed, but if the fact table only references 12,000 products, then the cardinality for products in the summary table will be 12,000. In general these values should be comparable. An exception to this might be Time, since there may be 1000 days in the time dimension but the initial data load only loads one day of data in the fact table.

Cardinality can be obtained, for example, in three ways: from database statistics, sampling, and from multidimensional metadata. The advisor component 122 may determine the cardinality of some attributes based on functions used by the attributes, such as time functions. For example, the month function by definition has a cardinality of 12.

Table 34 shows the statistics that are available and how they can be used in accordance with certain implementations of the invention.

TABLE 34

| Information | Column | Usage |
|---|---|---|
| Table Statistics | TABNAME | Shows the total number of rows in tables. This can be used to determine how many rows are in the fact or dimension tables. |
| Column Statistics | COLCARD | Number of distinct values in the column. |
| Column Distribution Statistics | AVGCOLLEN | Average column length. In certain implementations, this may be used to help in estimating the size of summary tables and making decisions about which attributes to include in the index. |

C.7 SQL Statement Generation

The summary table recommendations from the advisor component 122 are SQL scripts, composed of SQL statements. The main SQL statements are the creation of summary tables and the creation of indexes. The creation of a summary table is part of a SQL query. When creating a summary table, the RDBMS 110 receives the name of the summary table and an indication of the type of maintenance type to be used. The SQL query used to populate the contents of the summary table is generated by the SQL query generation component, described in the next section. The create index statements are created based on the internal representation of the recommended indexes. A translation of the internal representation to the RDBMS 110 is performed here.

C.7.1 SOL Query Generation

In the advisor component 122, SQL query generation is used to create summary tables and to perform sampling of data. Sampling of data is used while investigating the size of arbitrary slices in a cube model.

In certain implementations, the generation of SQL queries is performed by an advisor SQLGen component 3100, which is part of the advisor component 122, using a SQLGen object (listed in table 26), which works as a SQL generation engine that understands cube model and slice objects. The advisor SQLGen component 3100 takes into consideration the type of environment in which the SQL query is going to be used, such as type of summary table. The input 3110, 3120 and output 3130 of the advisor SQLGen component 3100 is illustrated according to a first scenario in FIG. 31.

Figure 31:
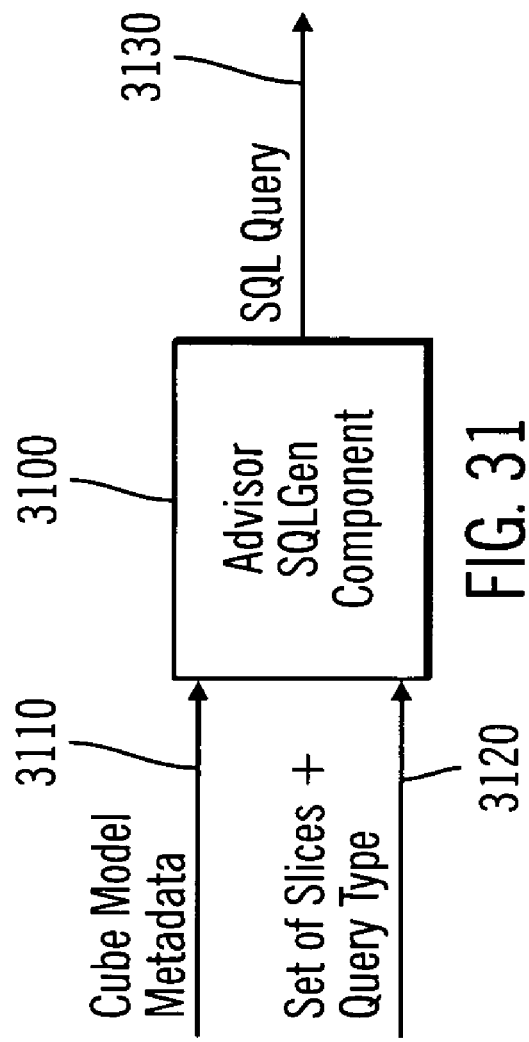
FIG. 31 illustrates input and output of an advisor component in a first scenario, in accordance with certain implementations.

In FIG. 31, the input parameters are (1) the cube model metadata 3110, set once for a SQLGen object, and (2) a given set of slice objects along with the query type 3120. Each slice can also be a ROLLUP defined from a given level up to the top of the cube model. The query type can be DEFERRED or IMMEDIATE, according to the context in which the SQL query string will be used. The output 3130 is a SQL query.

Figure 32:
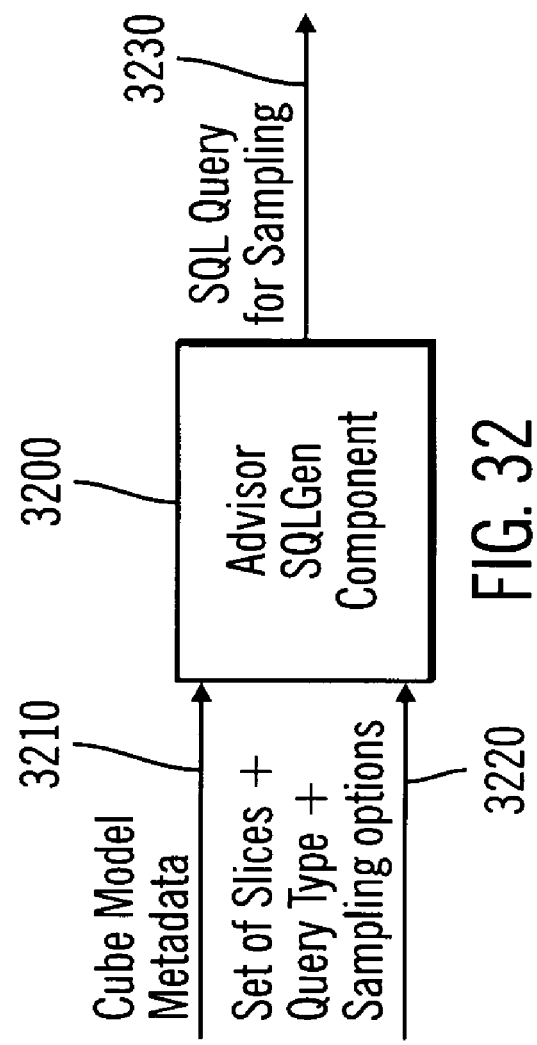
FIG. 32 illustrates input and output of an advisor component in a second scenario, in accordance with certain implementations.

The second scenario illustrates the use of an advisor SQLGen component 3200, which is part of the advisor component 122 in certain implementations, to generate SQL Queries for sampling. The input parameters 3210, 3220 are very similar to the parameters on the first scenario. However, in the second scenario (FIG. 32), sampling options are also passed as input 3220. The SQL Query 3230 generated is used for sampling purposes, in the process of estimating the size of candidate slices.

In both scenarios, the SQL query generated will reflect the set of slices given as parameter: For each slice, a grouping set is created in the SQL query. For each hierarchy mentioned in the slices, all attributes are included from the top of the hierarchy down to the attribute mentioned in the slice. For slices marked as ROLLUP, a SQL ROLLUP is used per hierarchy, for the same set of attributes. For SQL query calls, all measures in the facts of the cube model are also included in the SQL query.

For multi-slice or ROLLUP input parameters, special grouping columns are included in the query for each nullable attribute. This allows the database optimizer of RDBMS 110 to find the correct slice in a summary table. For SQL queries generated for query type IMMEDIATE, a count column is included for each nullable measure. Also, a measure corresponding to a COUNT (*) is included for the IMMEDIATE type. This allows the RDBMS 110 to incrementally maintain the summary table.

The SQLGen object will selectively include measures in the SQL statement that is generated. In order to save space and computation time during the creation of the summary tables, the SQLGen component will filter out measures that can be derived from other measures of the cube model. For instance, if a measure A is represented by SUM(X)/SUM(Y), and the cube model includes measures B=SUM(X) and C=SUM(Y), the SQLGen component will not include measure A in the SQL statement for the summary table, since the RDBMS 110 can dynamically calculate measure A during the processing of the query.

IBM, DB2, ZIOS, and AIX are trademarks of International Business Machines Corporation in the United States and/or other countries. Windows is a trademark of Microsoft Corporation in the United States and/or other countries. Solaris and JDBC are trademarks of Sun Microsystems in the United States and/or other countries. Linux is a trademark of Linus Torvalds in the United States and/or other countries. HP-UX is an Open Group UNIX 95 branded product in the United States and/or other countries. Pilot Suite is a trademark of Pilot Software in the United States and/or other countries. Express is a trademark of Oracle Corporation in the United States and/or other countries. Essbase is a trademark of Hyperion Solutions Corporation in the United States and/or other countries. TM1 is a trademark of Applix, Inc. in the United States and/or other countries.

Additional Implementation Details

The described techniques for improving performance of database queries may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which preferred embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Implementations of the invention provide a model based performance advisor. Alternative implementations of the invention include, for example: 1) capturing query workload based information into metadata and extending the advisor component 122 to consider this workload history; 2) extending the advisor component 122 to generate synthetic query workloads based on the metadata and query choices; and, 3) extending the advisor component 122 to produce recommendations of aggregations and to pass the queries that represent these aggregations to a workload based advisor.

The logic of FIG. 27 describes specific operations occurring in a particular order. In alternative implementations, certain of the logic operations may be performed in a different order, modified or removed. Moreover, steps may be added to the above described logic and still conform to the described implementations. Further, operations described herein may occur sequentially or certain operations may be processed in parallel, or operations described as performed by a single process may be performed by distributed processes.

The logic of FIG. 27 was described as being implemented in software. This logic may be part of the operating system of the host systems or an application program. In yet further implementations, this logic may be maintained in storage areas or in a read only memory or other hardwired type of device. The preferred logic may be implemented in hard disk drives or in programmable and non-programmable gate array logic.

Figure 33:
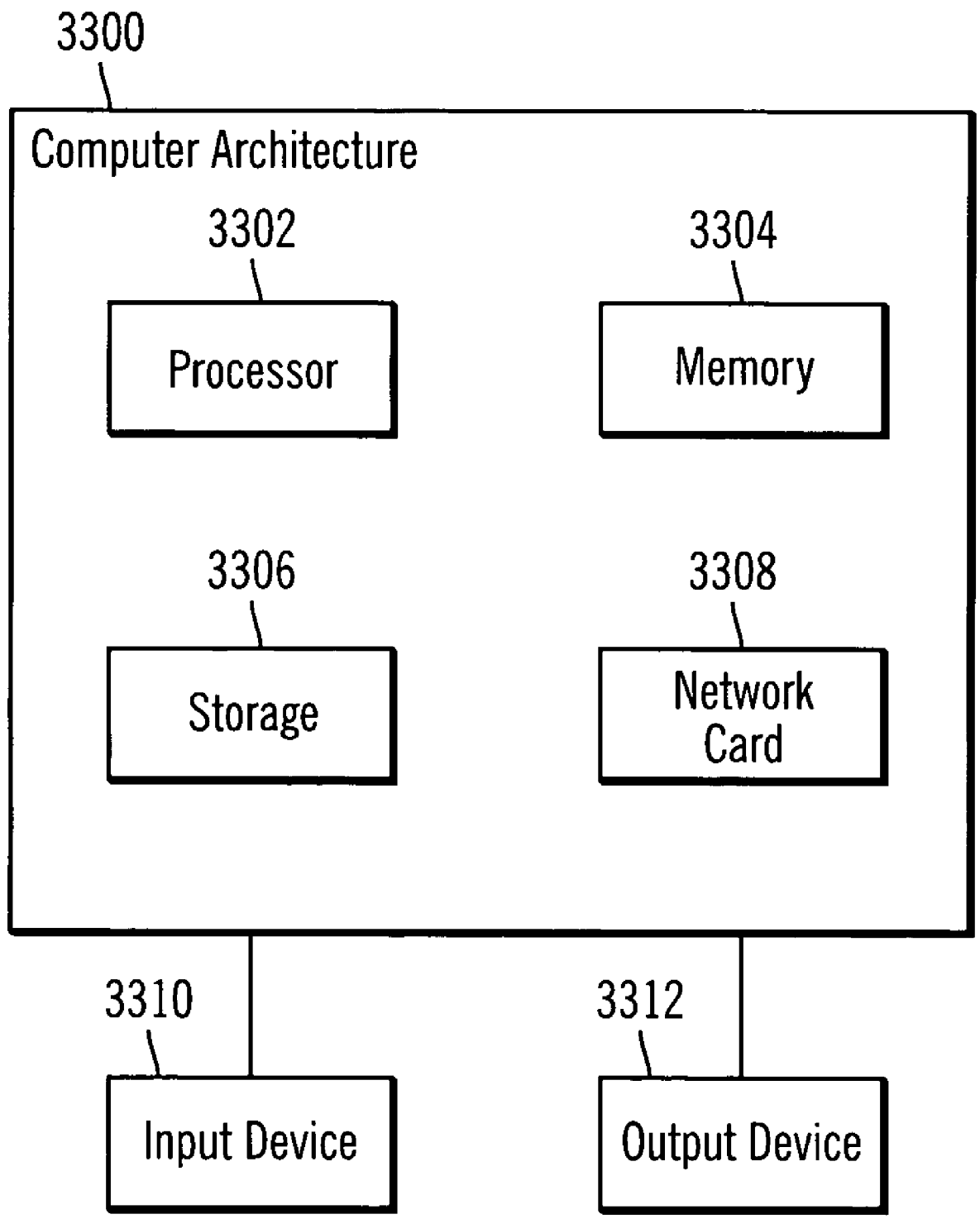
FIG. 33 illustrates one implementation of the architecture of the computer system of FIG. 1.

FIG. 33 illustrates one implementation of the architecture of the computer system 100. The computer system 100 may implement a computer architecture 3300 having a processor 3302 (e.g., a microprocessor), a memory 3304 (e.g., a volatile memory device), and storage 3306 (e.g., a non-volatile storage, such as magnetic disk drives, optical disk drives, a tape drive, etc.). The storage 3306 may comprise an internal storage device or an attached or network accessible storage. Programs in the storage 3306 are loaded into the memory 3304 and executed by the processor 3302 in a manner known in the art. The architecture further includes a network card 3308 to enable communication with a network. An input device 3310 is used to provide user input to the processor 3302, and may include a keyboard, mouse, pen-stylus, microphone, touch sensitive display screen, or any other activation or input mechanism known in the art. An output device 3312 is capable of rendering information transmitted from the processor 3302, or other component, such as a display monitor, printer, storage, etc.

The foregoing description of the preferred implementations of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for improving performance for SQL queries, comprising:
   receiving a request for advice in a computer having a processor regarding one or more summary tables to be built for a cube model metadata object, wherein the request specifies one or more types of queries intended to be issued for the cube model metadata object, and wherein the one or more types of queries include extract, drilldown, report, and drillthrough;
   obtaining multidimensional metadata associated with the cube model metadata object including measures;
   forming measure sets with the measures by creating one measure set with symmetric measures and, for each group of asymmetric measures with a same dimensionality, creating an additional measure set;
   for each of the measure sets,
      identifying one or more summary tables recommended to be built based on the obtained multidimensional metadata and based on the one or more types of queries intended to be issued, wherein identifying the one or more summary tables further comprises:
         rating a cost of creating a slice within one of the summary tables based on an estimated number of rows in the slice, an estimated size of the slice, a maximum row width of the slice, a number of columns in the slice, and an amount of time required to build the slice; and
      identifying one or more indexes recommended to be created for the one or more summary tables based on the obtained multidimensional metadata; and
   generating one or more statements to be executed to create the recommended one or more summary tables and the recommended one or more indexes.

2. The method of claim 1, wherein identifying the one or more summary tables is based on at least one of database statistics, sampling, diskspace limitations, time limitations, and multidimensional regions to be optimized.

3. The method of claim 1, wherein identifying the one or more indexes is based on at least one of database statistics, sampling, diskspace limitations, time limitations, and the generated one or more summary tables.

4. The method of claim 1, wherein at least one of the SQL queries is submitted by an on-line analytical processing system.

5. The method of claim 1, further comprising:
   consolidating multiple hierarchies within each dimension; and
   replacing one or more of the consolidated multiple hierarchies with one or more virtual hierarchies that contain a set of attributes from one or more of the consolidated multiple hierarchies.

6. The method of claim 1, further comprising:
   defining a virtual hierarchy for each network hierarchy within the cube model metadata object, wherein each virtual hierarchy includes attributes from an associated network hierarchy in a selected order.

7. The method of claim 1, wherein identifying the one or more summary tables further comprises:
   identifying the one or more summary tables without derivative measures.

8. The method of claim 1, wherein identifying the one or more summary tables further comprises:
   rating effectiveness of a slice based on what coverage is provided by the slice and how much performance would improve with the use of the slice.

9. The method of claim 1, further comprising:
rating a subset of two or more slices including a combination of zero or more non-crossing slices and two or more crossing slices from a set of candidate slices.

10. The method of claim 1, wherein the request for advice identifies the cube model metadata object and indicates that drilldown queries are to be issued and further comprising:
determining cost effective slices for the drilldown queries by calculating cost effectiveness of a current slice starting from a highest level of each hierarchy in one or more dimensions and rating one or more combinations of slices one level below a current level from each of the hierarchies until a predefined limitation has been reached, wherein rating gives preference to higher level slices, wherein the drilldown queries are generated in response to user interaction.

11. The method of claim 1, wherein the request for advice identifies the cube model metadata object and indicates that report queries are to be issued and further comprising:
determining cost effective slices for the report queries by calculating cost effectiveness of a current slice starting from a highest level of each hierarchy in one or more dimensions and rating one or more combinations of slices one level below a current level from each of the hierarchies until a predefined limitation has been reached, wherein rating gives preferences to lower level slices, wherein the report queries are generated in response to user interaction.

12. The method of claim 1, wherein the request for advice identifies the cube model metadata object and indicates that drillthrough queries are to be issued and further comprising:
determining cost effective slices for the drillthrough queries by calculating cost effectiveness of a current slice starting from a highest level of each hierarchy in one or more dimensions and rating one or more combinations of slices one level below a current level from each of the hierarchies until a predefined limitation has been reached, wherein rating gives preferences to lower level slices, wherein the drillthrough queries are generated when a user navigates from an external data store to a relational database.

13. The method of claim 1, wherein the request for advice identifies the cube model metadata object and indicates that extract queries are to be issued and further comprising:
receiving one or more regions to optimize for the extract queries, wherein the extract queries are generated against a relational database to retrieve data for populating an external data store;
for each region, identifying a bottom slice; and
consolidating bottom slices of the one or more regions based on cost of the bottom slice identified for each region.

14. The method of claim 1, wherein the cube model metadata object includes one or more sets of asymmetric measures, wherein each set of asymmetric measures includes one or more slices, and further comprising:
for each set of compatible asymmetric measures, selecting one or more slices that match an inner-most select statement of a multi-step select statement.

15. The method of claim 1, further comprising:
building a clustering index for a summary table by using columns of one or more hierarchies and factoring in one or more of estimated index cardinality, average number of rows per index entry, estimated data distribution of index entries, the inclusion of time attributes, and the one or more types of queries being optimized.

16. The method of claim 1, further comprising:
building non-clustering indexes for a summary table by using columns of one or more hierarchies and selecting indexes based on one or more of estimated index cardinality, estimated data distribution of index entries, the inclusion of time attributes, and the one or more types of queries being optimized until the combined sizes of the indexes for the summary table exceed a user specified size limit or the number of indexes for the summary table reaches a defined limit.

17. The method of claim 1, further comprising:
when at least one measure in a set of measures uses a non-distributive function, determining cost effective slices by evaluating the set of measures to determine whether a set of slices is needed in the summary table to optimize a region of the cube model metadata object.

18. The method of claim 1, wherein identifying the one or more summary tables further comprises:
rating effectiveness of a region based on what coverage is provided by the region and how much performance would improve with the use of the region.

19. The method of claim 1, wherein identifying the one or more summary tables further comprises:
rating a cost of creating a region within one of the summary tables based on an estimated number of rows in the region, an estimated size of the region, a maximum row width of the region, a number of columns in the region, and an amount of time required to build the slice.

20. An article of manufacture comprising a computer readable storage medium storing a program for improving performance for SQL queries, wherein the program when executed by a processor on a computer causes operations to be performed, the operations comprising:
receiving a request for advice regarding one or more summary tables to be built for a cube model metadata object, wherein the request specifies one or more types of queries intended to be issued for the cube model metadata object, and wherein the one or more types of queries include extract, drilldown, report, and drillthrough;
obtaining multidimensional metadata associated with the cube model metadata object including measures;
forming measure sets with the measures by creating one measure set with symmetric measures and, for each group of asymmetric measures with a same dimensionality, creating an additional measure set;
for each of the measure sets,
identifying one or more summary tables recommended to be built based on the obtained multidimensional metadata and based on the one or more types of queries intended to be issued, wherein the operations for identifying the one or more summary tables further comprise:
rating a cost of creating a slice within one of the summary tables based on an estimated number of rows in the slice, an estimated size of the slice, a maximum row width of the slice, a number of columns in the slice, and an amount of time required to build the slice; and
identifying one or more indexes recommended to be created for the one or more summary tables based on the obtained multidimensional metadata; and
generating one or more statements to be executed to create the recommended one or more summary tables and the recommended one or more indexes.

21. The article of manufacture of claim 20, wherein identifying the one or more summary tables is based on at least one of database statistics, sampling, diskspace limitations, time limitations, and multidimensional regions to be optimized.

22. The article of manufacture of claim 20, wherein identifying the one or more indexes is based on at least one of database statistics, sampling, diskspace limitations, time limitations, and the generated one or more summary tables.

23. The article of manufacture of claim 20, wherein at least one of the SQL queries is submitted by an on-line analytical processing system.

24. The article of manufacture of claim 20, the operations further comprising:
consolidating multiple hierarchies within each dimension; and
replacing one or more of the consolidated multiple hierarchies with one or more virtual hierarchies that contain a set of attributes from one or more of the consolidated multiple hierarchies.

25. The article of manufacture of claim 20, wherein the operations further comprise:
defining a virtual hierarchy for each network hierarchy within the cube model metadata object, wherein each virtual hierarchy includes attributes from an associated network hierarchy in a selected order.

26. The article of manufacture of claim 20, wherein the operations for identifying the one or more summary tables further comprise:
identifying the one or more summary tables without derivative measures.

27. The article of manufacture of claim 20, wherein the operations for identifying the one or more summary tables further comprise:
rating effectiveness of a slice based on what coverage is provided by the slice and how much performance would improve with the use of the slice.

28. The article of manufacture of claim 20, the operations further comprising:
rating subset of two or more slices including a combination of zero or more non-crossing slices and two or more crossing slices from a set of candidate slices.

29. The article of manufacture of claim 20, wherein the request for advice identifies the cube model metadata object and indicates that drilldown queries are to be issued and wherein the operations further comprise:
determining cost effective slices for the drilldown queries by calculating cost effectiveness of a current slice starting from a highest level of each hierarchy in one or more dimensions and rating one or more combinations of slices one level below a current level from each of the hierarchies until a predefined limitation has been reached, wherein rating gives preference to higher level slices, wherein the drilldown queries are generated in response to user interaction.

30. The article of manufacture of claim 20, wherein the request for advice identifies the cube model metadata object and indicates that report queries are to be issued and wherein the operations further comprise:
determining cost effective slices for the report queries by calculating cost effectiveness of a current slice starting from a highest level of each hierarchy in one or more dimensions and rating one or more combinations of slices one level below a current level from each of the hierarchies until a predefined limitation has been reached, wherein rating gives preferences to lower level slices, wherein the report queries are generated in response to user interaction.

31. The article of manufacture of claim 20, wherein the request for advice identifies the cube model metadata object and indicates that drillthrough queries are to be issued and wherein the operations further comprise:
determining cost effective slices for the drillthrough queries by calculating cost effectiveness of a current slice starting from a highest level of each hierarchy in one or more dimensions and rating one or more combinations of slices one level below a current level from each of the hierarchies until a predefined limitation has been reached, wherein rating gives preferences to lower level slices, wherein the drillthrough queries are generated when a user navigates from an external data store to a relational database.

32. The article of manufacture of claim 20, wherein the request for advice identifies the cube model metadata object and indicates that extract queries are to be issued and wherein the operations further comprise:
receiving one or more regions to optimize for the extract queries, wherein the extract queries are generated against a relational database to retrieve data for populating an external data store;
for each region, identifying a bottom slice; and
consolidating bottom slices of the one or more regions based on cost of the bottom slice identified for each region.

33. The article of manufacture of claim 20, wherein the cube model metadata object includes one or more sets of asymmetric measures, wherein each set of asymmetric measures includes one or more slices, the operations further comprising:
for each set of compatible asymmetric measures, selecting one or more slices that match an inner-most select statement of a multi-step select statement.

34. The article of manufacture of claim 20, the operations further comprising:
building a clustering index for a summary table by using columns of one or more hierarchies and factoring in one or more of estimated index cardinality, average number of rows per index entry, estimated data distribution of index entries, the inclusion of time attributes, and the one or more types of queries being optimized.

35. The article of manufacture of claim 20, the operations further comprising:
building non-clustering indexes for a summary table by using columns of one or more hierarchies and selecting indexes based on one or more of estimated index cardinality, estimated data distribution of index entries, the inclusion of time attributes, and the one or more types of queries being optimized until the combined sizes of the indexes for the summary table exceed a user specified size limit or the number of indexes for the summary table reaches a defined limit.

36. The article of manufacture of claim 20, wherein the operations further comprise:
when at least one measure in a set of measures uses a non-distributive function, determining cost effective slices by evaluating the set of measures to determine whether a set of slices is needed in the summary table to optimize a region of the cube model metadata object.

37. The article of manufacture of claim 20, wherein the operations for identifying the one or more summary tables further comprise:
rating effectiveness of a region based on what coverage is provided by the region and how much performance would improve with the use of the region.

38. The article of manufacture of claim 20, wherein the operations for identifying the one or more summary tables further comprise:

rating a cost of creating a region within one of the summary tables based on an estimated number of rows in the region, an estimated size of the region, a maximum row width of the region, a number of columns in the region, and an amount of time required to build the slice.

39. A system for improving performance for SQL queries, comprising:

a computer system having hardware logic for:

receiving a request for advice regarding one or more summary tables to be built for a cube model metadata object, wherein the request specifies one or more types of queries intended to be issued for the cube model metadata object, and wherein the one or more types of queries include extract, drilldown, report, and drillthrough;

obtaining multidimensional metadata associated with the cube model metadata object including measures;

forming measure sets with the measures by creating one measure set with symmetric measures and, for each group of asymmetric measures with a same dimensionality, creating an additional measure set;

for each of the measure sets, identifying one or more summary tables recommended to be built based on the obtained multidimensional metadata and based on the one or more types of queries intended to be issued, wherein for identifying the one or more summary tables, the hardware logic implements code for:

rating a cost of creating a slice within one of the summary tables based on an estimated number of rows in the slice, an estimated size of the slice, a maximum row width of the slice, a number of columns in the slice, and an amount of time required to build the slice; and identifying one or more indexes recommended to be created for the one or more summary tables based on the obtained multidimensional metadata; and generating one or more statements to be executed to create the recommended one or more summary tables and the recommended one or more indexes.

40. The system of claim 39, wherein identifying the one or more summary tables is based on at least one of database statistics, sampling, diskspace limitations, time limitations, and multidimensional regions to be optimized.

41. The system of claim 39, wherein identifying the one or more indexes is based on at least one of database statistics, sampling, diskspace limitations, time limitations, and the generated one or more summary tables.

42. The system of claim 39, wherein at least one of the SQL queries is submitted by an on-line analytical processing system.

43. The system of claim 39, wherein the hardware logic implements code for:

consolidating multiple hierarchies within each dimension; and replacing one or more of the consolidated multiple hierarchies with one or more virtual hierarchies that contain a set of attributes from one or more of the consolidated multiple hierarchies.

44. The system of claim 39, wherein the hardware logic implements code for:

defining a virtual hierarchy for each network hierarchy within the cube model metadata object, wherein each virtual hierarchy includes attributes from an associated network hierarchy in a selected order.

45. The system of claim 39, wherein for identifying the one or more summary tables, the hardware logic implements code for:

identifying the one or more summary tables without derivative measures.

46. The system of claim 39, wherein for identifying the one or more summary tables, the hardware logic implements code for:

rating effectiveness of a slice based on what coverage is provided by the slice and how much performance would improve with the use of the slice.

47. The system of claim 39, wherein the hardware logic implements code for:

rating a subset of two or more slices including a combination of zero or more non-crossing slices and two or more crossing slices from a set of candidate slices.

48. The system of claim 39, wherein the request for advice identifies the cube model metadata object and indicates that drilldown queries are to be issued and wherein the hardware logic implements code for:

determining cost effective slices for the drilldown queries by calculating cost effectiveness of a current slice starting from a highest level of each hierarchy in one or more dimensions and rating one or more combinations of slices one level below a current level from each of the hierarchies until a predefined limitation has been reached, wherein rating gives preference to higher level slices, wherein the drilldown queries are generated in response to user interaction.

49. The system of claim 39, wherein the request for advice identifies the cube model metadata object and indicates that report queries are to be issued and wherein the hardware logic implements code for:

determining cost effective slices for the report queries by calculating cost effectiveness of a current slice starting from a highest level of each hierarchy in one or more dimensions and rating one or more combinations of slices one level below a current level from each of the hierarchies until a predefined limitation has been reached, wherein rating gives preferences to lower level slices, wherein the report queries are generated in response to user interaction.

50. The system of claim 39, wherein the request for advice identifies the cube model metadata object and indicates that drillthrough queries are to be issued and wherein the hardware logic implements code for:

determining cost effective slices for the drillthrough queries by calculating cost effectiveness of a current slice starting from a highest level of each hierarchy in one or more dimensions and rating one or more combinations of slices one level below a current level from each of the hierarchies until a predefined limitation has been reached, wherein rating gives preferences to lower level slices, wherein the drillthrough queries are generated when a user navigates from an external data store to a relational database.

51. The system of claim 39, wherein the request for advice identifies the cube model metadata object and indicates that extract queries are to be issued and wherein the hardware logic implements code for:

receiving one or more regions to optimize for the extract queries, wherein the extract queries are generated against a relational database to retrieve data for populating an external data store;

for each region, identifying a bottom slice; and consolidating bottom slices of the one or more regions based on cost of the bottom slice identified for each region.

52. The system of claim 39, wherein the cube model metadata object includes one or more sets of asymmetric measures, wherein each set of asymmetric measures includes one or more slices, and wherein the hardware logic implements code for:

for each set of compatible asymmetric measures, selecting one or more slices that match an inner-most select statement of a multi-step select statement.

53. The system of claim 39, wherein the hardware logic implements code for:

building a clustering index for a summary table by using columns of one or more hierarchies and factoring in one or more of estimated index cardinality, average number of rows per index entry, estimated data distribution of index entries, the inclusion of time attributes, and the one or more types of queries being optimized.

54. The system of claim 39, wherein the hardware logic implements code for:

building non-clustering indexes for a summary table by using columns of one or more hierarchies and selecting indexes based on one or more of estimated index cardinality, estimated data distribution of index entries, the inclusion of time attributes, and the one or more types of queries being optimized until the combined sizes of the indexes for the summary table exceed a user specified size limit or the number of indexes for the summary table reaches a defined limit.

55. The system of claim 39, wherein the hardware logic implements code for:

when at least one measure in a set of measures uses a non-distributive function, determining cost effective slices by evaluating the set of measures to determine whether a set of slices is needed in the summary table to optimize a region of the cube model metadata object.

56. The system of claim 39, wherein for identifying the one or more summary tables, the hardware logic implements code for:

rating effectiveness of a region based on what coverage is provided by the region and how much performance would improve with the use of the region.

57. The system of claim 39, wherein for identifying the one or more summary tables, the hardware logic implements code for:

rating a cost of creating a region within one of the summary tables based on an estimated number of rows in the region, an estimated size of the region, a maximum row width of the region, a number of columns in the region, and an amount of time required to build the slice.

* * * * *